(12) United States Patent
Wu

(10) Patent No.: US 11,299,347 B2
(45) Date of Patent: Apr. 12, 2022

(54) MATERIAL TRANSPORTATION SYSTEM, TRANSPORTATION METHOD AND STORAGE APPARATUS

(71) Applicant: Shanghai Fortrend Technology Co., Ltd., Shanghai (CN)

(72) Inventor: Kung Wu, Taiwan (CN)

(73) Assignee: Shanghai Fortrend Technology Co., Ltd., Shanghai (CN)

( * ) Notice: Subject to any disclaimer, the term of this patent is extended or adjusted under 35 U.S.C. 154(b) by 292 days.

(21) Appl. No.: 16/596,781

(22) Filed: Oct. 9, 2019

(65) Prior Publication Data
US 2020/0115159 A1    Apr. 16, 2020

(30) Foreign Application Priority Data
Oct. 12, 2018 (CN) .......................... 201811191242.8

(51) Int. Cl.
*G06F 7/00* (2006.01)
*B65G 1/137* (2006.01)
*B65G 1/04* (2006.01)

(52) U.S. Cl.
CPC ......... *B65G 1/1373* (2013.01); *B65G 1/0464* (2013.01)

(58) Field of Classification Search
CPC ...... B65G 1/1373; B65G 1/0464; B65G 1/04; B65G 2201/0297; B65G 35/00;
(Continued)

(56) References Cited

U.S. PATENT DOCUMENTS

2007/0293978 A1* 12/2007 Wurman ............... C07C 253/34
                                                                700/213
2014/0102859 A1    4/2014 Aby-Eva
(Continued)

FOREIGN PATENT DOCUMENTS

CN        102785882        11/2012
CN        104220852        12/2014
(Continued)

OTHER PUBLICATIONS

"Office Action of China Counterpart Application," dated Aug. 27, 2019, p. 1-p. 6.

*Primary Examiner* — Yolanda R Cumbess
(74) *Attorney, Agent, or Firm* — JCIP Global Inc.

(57) ABSTRACT

The present invention provides a material transportation system, a material transportation method and a material storage apparatus. The material storage apparatus is provided with a movable storage rack, wherein the movable storage rack is configured for carrying a plurality of material boxes and can be separated from the material storage apparatus; and an automatic transportation apparatus can move freely along any route in any direction, wherein the automatic transportation apparatus is configured for carrying the movable storage rack. Moreover, the movable storage rack is sent to be in front of the material storage apparatus or transported from the material storage apparatus to a target storage position. The present invention simultaneously transports a plurality of material boxes between the material storage apparatuses and between the material storage apparatus and the processing equipment.

16 Claims, 35 Drawing Sheets

(58) Field of Classification Search
CPC .......... B65G 2201/0214; B65G 1/0492; B65G 1/0471; H01L 21/67703; H01L 21/6773; H01L 21/67736; H01L 21/67769; H01L 21/67733; H01L 21/67259
USPC .......................................... 700/213–218, 228
See application file for complete search history.

(56) References Cited

U.S. PATENT DOCUMENTS

| | | | | |
|---|---|---|---|---|
| 2015/0227140 | A1* | 8/2015 | Douglas ............... | G05D 1/0217 701/23 |
| 2018/0082162 | A1* | 3/2018 | Durham ................ | G06Q 50/28 |

FOREIGN PATENT DOCUMENTS

| | | |
|---|---|---|
| CN | 105540125 | 5/2016 |
| CN | 106379684 | 2/2017 |
| CN | 206955190 | 2/2018 |
| CN | 109230321 | 1/2019 |
| KR | 20050022635 | 3/2005 |
| KR | 20060077747 | 7/2006 |

\* cited by examiner

```
┌─────────────────────────────────────────┐
│ A first side wall sensor detects whether an │
│ automatic transportation apparatus reaches  │
│ an external area of a movable storage rack  │
└─────────────────────────────────────────┘
                    │ Yes
                    ▼
┌─────────────────────────────────────────┐
│ After receiving a signal of the first side  │
│ wall sensor, a controller controls an       │
│ automatic door to open and controls a       │
│ telescopic mechanism to execute the         │
│ extension action, and a supporting layer    │
│ reaches a fourth position from a first      │
│ position                                    │
└─────────────────────────────────────────┘
                    │
                    ▼
┌─────────────────────────────────────────┐
│ A limiting sensing assembly judges whether  │
│ the telescopic mechanism is extended in place│
└─────────────────────────────────────────┘
                    │ Yes
                    ▼
┌─────────────────────────────────────────┐
│ The controller controls a lifting mechanism │
│ to execute a rising action, and the         │
│ supporting layer reaches a third position   │
│ from the fourth position                    │
└─────────────────────────────────────────┘
                    │
                    ▼
┌─────────────────────────────────────────┐
│ The controller controls the telescopic      │
│ mechanism to perform a retraction action,   │
│ and the supporting layer reaches a second   │
│ position from the third position            │
└─────────────────────────────────────────┘
                    │
                    ▼
┌─────────────────────────────────────────┐
│ The limiting sensing assembly judges        │
│ whether the telescopic mechanism is         │
│ retracted in place                          │
└─────────────────────────────────────────┘
                    │ Yes
                    ▼
┌─────────────────────────────────────────┐
│ The controller controls the automatic door  │
│ to close, and controls the lifting mechanism│
│ to execute a falling action, and the        │
│ supporting layer reaches the first position │
│ from the second position                    │
└─────────────────────────────────────────┘
```

FIG. 23

MATERIAL TRANSPORTATION SYSTEM, TRANSPORTATION METHOD AND STORAGE APPARATUS

CROSS-REFERENCE TO RELATED APPLICATION

This application claims the priority benefit of China application serial no. 201811191242.8, filed on Oct. 12, 2018. The entirety of the above-mentioned patent application is hereby incorporated by reference herein and made a part of this specification.

TECHNICAL FIELD

The present invention relates to the technical field of semiconductor devices, and more particularly relates to a material storage apparatus, a material transportation system and a material transportation method.

BACKGROUND ART

In a production workshop pursuing high efficiency, the factory is generally divided into several production areas according to factors such as the production process of products, the environment requirements, the factory affairs requirements and the like. In the production process, semi-finished products must flow among different production areas in a crossing manner. In order to improve the production efficiency and the production stability, process engineers generally place the semi-finished products in each production area, and install automatic storage devices in a buffering area of production materials. Therefore, the production materials are ensured to flow correctly and rapidly, and major accidents such as the production halt caused by the material shortage of a production line due to unexpected situations such as human factors, equipment or factory affair maintenance and the like can be avoided. In a fully-automatic production workshop, in order to improve the transportation efficiency, the semi-finished products and the production materials are firstly batch arranged orderly in specially-designed carriers according to different batches and batch numbers. Then, through an automatic transportation means, the semi-finished products are automatically transported from the production area of a previous work section to the production area of a subsequent work section.

In a traditional semiconductor wafer factory, every 25 pieces of wafers are placed in an open cassette or a closed box such as a standard mechanical interface (SMIF) pod carrying 8-inch wafers or a front opening unit pod (FOUP) carrying 12-inch wafers. Moreover, these material boxes such as the cassettes, SMIF pods or FOUP are intensively stored separately in a large fully-automatic stocker. Generally, one stocker is disposed in each production area, and then by means of an automatic transportation system, the material boxes of the semi-finished products are automatically transported between the stockers through a central control system.

In the traditional semiconductor wafer factory, the material boxes are transported between the stockers or between the stockers and tools generally by virtue of an OHT system. For example, in an existing single-box track overhead traveling crane having a vertical lifting suspender mechanism, in the transportation process of the material boxes, the single-box track overhead traveling crane utilizes the vertical lifting suspender mechanism to pick and place the materials. The single-box track overhead traveling crane runs on the overhead track to transport the material boxes between the stockers or between the devices and the stockers. Each single-box track overhead traveling crane can carry one material box and transports the material boxes in order through the overhead track. After the single-box track overhead traveling crane reaches a workstation of the stocker or the tool, the material boxes are disposed onto the workstation of the tool or the stocker by virtue of a suspender of the vertical lifting suspender mechanism.

However, although the fully-automatic overhead traveling crane track system is mature in technology and is the standard configuration of the current semiconductor wafer factory, the traditional OHT system also has serious and insurmountable defects as follows.

First of all, due to the high-speed running of the material boxes in the OHT system, from the perspective of safety, the traditional OHT system generally adopts the one-way transportation design to prevent the serious collision accident caused by faults in control or mechanical failures.

Therefore, the design of the traditional OHT system must be closely matched with the factors of the wafer factory such as network layout of the devices, production process, the scale and number of storage tanks and the like. Otherwise, the handling efficiency of the OHT system will be affected. In order to well design the OHT system, at an initial stage of the factory construction, the future process plan, the productivity requirements and the factory layout of the entire wafer factory must be well planned. Undoubtedly, the initial design cost is greatly increased.

Moreover, for the wafer factory, once the production line is expanded, the process equipment is adjusted or the layout of the production line is re-optimized, the traditional OHT system will be difficult and expensive to modify, which will further severely limit the enterprise decision.

Moreover, in the traditional OHT system, the vertical lifting suspender mechanism picks and places the material boxes in a vertical lifting way, the vertical suspender is required to be aligned to a wafer box or the wafer box is required to be aligned to the workstation. Therefore, requirements for the position accuracy of the workstation of the devices are strict, and the optional change of the position is not allowed. In the traditional OHT system, the flexible updating of a local process or the device is limited, which results in the shortage of flexibility for updating the local process or device.

Secondly, since the traditional OHT system runs in one way, once a single-point failure occurs and cannot be solved for a long time, the serious traffic congestion will happen, resulting in sharp decrease of the transportation efficiency of the entire OHT system, and affecting the production of the entire wafer factory.

Furthermore, the designed carrying capacity of the single-box track overhead traveling crane in the OHT system is determined at the initial stage of the factory construction. When the technology is updated later and especially when the size and weight of the material box are changed, the OHT system must be upgraded synchronously, the OHT system is high in cost, has high requirement for the maintenance technology and is also high in daily maintenance expense. This consequently leads to the violent cost increment and time waste. Therefore, the flexibility in updating the OHT system is limited.

Finally, in the traditional OHT system, the single-box track overhead traveling crane is not suitable for transporting the heavy-weight and large-size material boxes, which further severely limits the application range of the traditional OHT system.

In summary, the advanced manufacturing requirements of the fully-automatic production line shall be considered at the initial stage of the construction of a new wafer factory, and the limitations of the traditional OHT system for the layout flexibility of the future products as well as the application limitation described above are also factors that must be considered. Therefore, the traditional OHT system is severely limited in the practical production and applications.

SUMMARY OF THE INVENTION

In order to overcome the above problems, the present invention aims at providing a material transportation system, a material transportation method and a material storage apparatus, thereby improving the flexibility of the material transportation in later adjustment and the application range, and reducing the design cost at the initial stage of the factory construction.

In order to achieve the above objective, the material transportation system of the present invention includes:
a material storage apparatus, wherein the material storage apparatus includes a movable storage rack. The movable storage rack is configured to hold a plurality of material boxes, and the movable storage rack can be separated from the material storage apparatus.

An automatic transportation apparatus which can move freely along any route in any direction; and the automatic transportation apparatus is configured to carry and transport the movable storage rack.

In one embodiment, the material transportation system further includes an automatic lifting translation mechanism, a first side wall sensor and a controller.

The first side wall sensor detects whether the automatic transportation apparatus reaches or leaves an external area of the movable storage rack, and transmits a signal to the controller if yes.

The automatic lifting translation mechanism is arranged on the bottom of the movable storage rack.

After receiving the signal of the first side wall sensor, the controller controls the automatic lifting translation mechanism to execute the rising action, so that the movable storage rack can be raised upwardly; and the controller controls the automatic lifting translation mechanism to execute the translation action, so that the movable storage rack is transported outwardly onto the automatic transportation apparatus or the movable storage rack is picked up from the automatic transportation apparatus and sent back into the material storage apparatus.

In one embodiment, the automatic lifting translation mechanism further includes:
a telescopic mechanism controlled by the controller to perform the extending action or the retracting action;
a lifting mechanism controlled by the controller to execute the rising action or the falling action; and
a plurality of limiting sensing assemblies configured for limiting an extension distance or retraction distance of the telescopic mechanism, judging whether the telescopic mechanism is extended or retracted in place, and transmitting a signal to the controller, and then controlling the lifting mechanism to perform the rising action or falling action by the controller.

In one embodiment, the telescopic mechanism is provided with a supporting layer supporting the movable storage rack; in a process of sending the movable storage rack out or in by the automatic lifting translation mechanism, the supporting layer goes through four positions:

a first position D1 is an original position of the supporting layer;
a second position D2 is a position that the supporting layer reaches above the original position;
a third position D3 is a position that the supporting layer reaches above the top of the automatic transportation apparatus; and
a fourth position D4 is a position that the supporting layer reaches below the top of the automatic transportation apparatus.

In one embodiment, the process of sending out the movable storage rack by the automatic lifting translation mechanism includes:
the controller controls the lifting mechanism to execute the rising action, and the supporting layer reaches the second position from the first position;
the controller controls the telescopic mechanism to perform the extending action, and the supporting layer reaches the third position from the second position;
the limiting sensing assemblies judge whether the telescopic mechanism is extended in place, and transmit the signal to the controller if yes;
the controller controls the lifting mechanism to execute the falling action, the supporting layer reaches the fourth position from the third position, and in the process that the supporting layer reaches the fourth position from the third position, the movable storage rack is supported after contacting the top of the automatic transportation apparatus; and the supporting layer is separated from the movable storage rack to move downwardly to the fourth position;
the controller controls the telescopic mechanism to execute the retracting action, and the supporting layer reaches the first position from the fourth position; and
the limiting sensing assemblies judge whether the telescopic mechanism is retracted in place, and transmit the signal to the controller if yes.

In one embodiment, the automatic lifting translation mechanism is nested in a fixed supporting body, and the fixed supporting body is configured for carrying the automatic lifting translation mechanism and for supporting the movable storage rack in a non-transportation process; and in the process that the controller controls the lifting mechanism to execute the rising action, and the supporting layer reaches the second position from the first position, the supporting layer contacts the bottom of the movable storage rack and jacks up the movable storage rack, and the supporting layer supports the movable storage rack to move up to the second position.

In one embodiment, the process of sending back the movable storage rack by the automatic lifting translation mechanism includes:
the controller controls the telescopic mechanism to execute the extending action, and the supporting layer reaches the fourth position from the first position;
the limiting sensing assemblies judge whether the telescopic mechanism is extended in place, and transmit the signal to the controller if yes;
the controller controls the lifting mechanism to execute the rising action, and the supporting layer reaches the third position from the fourth position; in the process that the supporting layer reaches the third position from the fourth position, the supporting layer contacts the bottom of the movable storage rack and jacks up the movable storage rack to continuously move up to the third position;
the controller controls the telescopic mechanism to perform the retracting action, and the supporting layer reaches the second position from the third position;

the limiting sensing assemblies judge whether the telescopic mechanism is retracted in place, and transmit the signal to the controller if yes; and the controller controls the lifting mechanism to execute the falling action, and the supporting layer reaches the first position from the second position.

In one embodiment, the automatic lifting translation mechanism is nested in a fixed supporting body, and the fixed supporting body is configured for carrying the automatic lifting translation mechanism and for supporting the movable storage rack in a non-transportation process; and in the process that the controller controls the lifting mechanism to execute the falling action, and the supporting layer reaches the first position from the second position, the bottom of the movable storage rack contacts and is supported by the top of the fixed supporting body, and the supporting layer is separated from the bottom of the movable storage rack to move downwardly to the first position.

In one embodiment, the material transportation system further includes an automatic door; the automatic door is arranged in an outer wall of the material storage apparatus corresponding to the movable storage rack;

after detecting that the automatic transportation apparatus reaches the exterior of the movable storage rack, the first side wall sensor transmits the signal to the controller, and the controller controls the automatic lifting translation mechanism to execute the rising action while also controlling the automatic door to open; and after detecting that the automatic transportation apparatus leaves the material storage apparatus, the first side wall sensor transmits the signal to the controller, and the controller controls the automatic lifting translation mechanism to execute the falling action while also controlling the automatic door to close.

In one embodiment, the top of the automatic transportation apparatus is also provided with a top sensor configured for detecting whether the top of the automatic transportation apparatus is empty and feeding back to the controller, and the controller controls the automatic lifting translation mechanism to start running according to a feedback result.

In one embodiment, before the automatic lifting translation mechanism begins to send out the movable storage rack, and when detecting that the top of the automatic transportation apparatus is empty, the top sensor transmits the signal to the controller, and the controller controls the automatic lifting translation mechanism to begin to send out the movable storage rack; and before the automatic lifting translation mechanism begins to send back the movable storage rack, and when detecting that the top of the automatic transportation apparatus is not empty, the top sensor transmits the signal to the controller, and the controller controls the automatic lifting translation mechanism to begin to send back the movable storage rack.

In some embodiments, the telescopic mechanism is provided with a telescopic driving assembly; the telescopic driving assembly is provided with a deformation driving mechanism and a deformable transportation component; the deformable transportation component is connected between the telescopic mechanism and the deformation driving mechanism; and when the telescopic mechanism is extended and retracted, the deformation driving mechanism is controlled by the controller to drive the deformable transportation component to perform the telescopic deformation so as to drive the telescopic mechanism to extend and retract.

In some embodiments, the deformation driving mechanism is controlled by the controller to drive the deformable transportation component to perform the bending deformation or to be restored from the deformation so as to drive the telescopic mechanism to retract or extend.

In some embodiments, the deformable transportation component at least includes a movable transportation rod and a guide transportation rod; the guide transportation rod is fixed; both ends of the movable transportation rod are respectively a first end and a second end; the first end of the movable transportation rod is rotatably connected onto the telescopic mechanism, and the second end of the movable transportation rod is movably connected onto the guide transportation rod, so that the second end of the movable transportation rod can move along the guide transportation rod so as to drive the first end of the movable transportation rod to move in the horizontal direction, and the first end of the movable transportation rod pushes the telescopic mechanism to extend outwardly or pulls the telescopic mechanism to retract inwardly.

In some embodiments, the gear meshing drive is adopted between the deformation driving mechanism and the guide transportation rod, and the second end of the movable transportation rod is movably connected with the guide transportation rod by virtue of threads; the deformation driving mechanism drives the guide transportation rod to rotate along a center axis through a gear, and the rotating threads on the guide transportation rod enable the second end of the movable transportation rod to move along the guide transportation rod.

In some embodiments, the second end is provided with a thread assembly; the thread assembly is fixed on the guide transportation rod; and threads of the thread assembly are in fit connection with the threads of the guide transportation rod.

In some embodiments, the threads on the guide transportation rod are outer threads, and the threads on the thread assembly are inner threads.

In one embodiment, the material transportation system further includes an automatic multi-arm transportation apparatus; the automatic multi-arm transportation apparatus can move freely along any route in any direction; and the automatic multi-arm transportation apparatus picks up and transports the material box in the material storage apparatus to a process chamber or picks up and transports the material box in the process chamber into the material storage apparatus.

In one embodiment, the automatic multi-arm transportation apparatus includes a plurality of mechanical arms, grippers, a plurality of carrier tables for carrying the material boxes and an automatic transportation table located on the bottoms of the plurality of mechanical arms;

the automatic transportation table is configured for realizing the movement of the automatic multi-arm transportation apparatus;

the grippers are configured for clamping the material boxes; and the material boxes are picked and placed by virtue of the multi-axis independent movement of the plurality of mechanical arms.

In one embodiment, a plurality of mechanical arms are connected through a movable shaft and include a vertical lifting arm and a plurality of horizontal rotating arms;

the vertical lifting arm is fixed on the automatic transportation table, one of the horizontal rotating arms is movably connected onto the vertical lifting arm, and the horizontal rotating arms move up and down along the vertical lifting arm; and the horizontal rotating arms are movably connected, each horizontal rotating arm rotates in a horizontal plane, and the rotational movement of each horizontal rotating arm does not interfere with each other.

In one embodiment, the grippers are provided with a driving motor and a plurality of movable clamping pieces; and the driving motor drives the movable clamping pieces to be changed in distance, so that the movable clamping pieces can correspondingly adjust the clamping distance. In one embodiment, the material storage apparatus further includes: a plurality of third storage receiving chambers configured for transporting the material boxes to the process chamber or receiving the material boxes transported from processing equipment;

a sensing door arranged in the side wall of the material storage apparatus corresponding to the third storage receiving chamber; and a bottom sensor arranged on the bottom of the third storage receiving chamber; the bottom sensor is configured for detecting whether the third storage receiving chamber has the material boxes and feeding back a detection result to the controller, and the controller controls the sensing door to open or close according to the feedback result.

In one embodiment, the side wall of the material storage apparatus below the third storage receiving chamber can also be provided with a second side wall sensor, the second side wall sensor is configured for detecting whether the automatic multi-arm transportation apparatus is located outside the third storage receiving chamber, and the controller controls the sensing door to open or close according to the detection result.

In order to achieve the above objective, the present invention further provides a material transportation method adopting the material transportation system, which includes:
step 01: detecting whether the automatic transportation apparatus reaches an external area of the movable storage rack or not; and executing step 02 if yes;
step 02: raising the movable storage rack upwardly;
step 03: sending the movable storage rack out of the material storage apparatus;
step 04: moving the movable storage rack downwardly and disposing the same on the automatic transportation apparatus; and
step 05: carrying, by the automatic transportation apparatus, the movable storage rack to move towards a target position.

In one embodiment, the bottom of the movable storage rack is also provided with the automatic lifting translation mechanism; the automatic lifting translation mechanism supports the movable storage rack through a supporting layer; the supporting layer can go through four positions; a first position is an original position of the supporting layer; a second position is a position that the supporting layer reaches above the original position; a third position is a position that the supporting layer reaches above the top of the automatic transportation apparatus; and a fourth position is a position that the supporting layer reaches below the top of the automatic transportation apparatus.

In the step 02, the automatic lifting translation mechanism raises the movable storage rack upwardly from the first position to the second position.

In the step 03, the automatic lifting translation mechanism moves the movable storage rack outwardly from the second position to the third position.

In the step 04, the automatic lifting translation mechanism lowers the movable storage rack downwardly; the supporting layer moves from the third position to the fourth position; and in this process, the movable storage rack contacts the top of the automatic transportation apparatus and is supported, and the supporting layer is separated from the movable storage rack to move downwardly to the fourth position.

In the step 05, the method further includes retracting the automatic lifting translation mechanism from the fourth position to the first position.

In one embodiment, the side wall of the material storage apparatus corresponding to the movable storage rack is further provided with an automatic door; in the step 02, the method further includes: opening the automatic door; and in the step 05, the method further includes detecting whether the automatic transportation apparatus leaves the material storage apparatus, and closing the automatic door if yes.

In one embodiment, the step 01 specifically includes detecting whether the automatic transportation apparatus reaches the external area of the movable storage rack, judging whether the top of the automatic transportation apparatus is empty, and executing the step 02 if both are yes.

In one embodiment, in the step 05, the method further includes judging whether the automatic lifting translation mechanism is retracted in place; and closing the automatic door if detecting that the automatic transportation apparatus leaves the material storage apparatus and the automatic lifting translation mechanism is retracted in place.

In order to achieve the above objective, the present invention further provides a material transportation method adopting the material transportation system, which includes:
step 01: detecting whether the automatic transportation apparatus reaches an external area of the movable storage rack; and executing step 02 if yes;
step 02: raising the movable storage rack from the automatic transportation apparatus;
step 03: sending the movable storage rack back into the material storage apparatus;
step 04: moving the movable storage rack downwardly and disposing the same in the material storage apparatus; and
step 05: enabling the automatic transportation apparatus to leave the material storage apparatus.

In one embodiment, the bottom of the movable storage rack is also provided with the automatic lifting translation mechanism; the automatic lifting translation mechanism supports the movable storage rack through a supporting layer; the supporting layer can go through four positions; a first position is an original position of the supporting layer; a second position is a position that the supporting layer reaches above the original position; a third position is a position that the supporting layer reaches above the top of the automatic transportation apparatus; and a fourth position is a position that the supporting layer reaches below the top of the automatic transportation apparatus.

In the step 02, firstly, the automatic lifting translation mechanism extends outwardly from the first position to the fourth position; secondly, the automatic lifting translation mechanism rises up, and the supporting layer reaches the third position from the fourth position, wherein in the process that the supporting layer reaches the third position from the fourth position, the supporting layer contacts the bottom of the movable storage rack and jacks up the movable storage rack to continuously move up to the third position;

in the step 03, the automatic lifting translation mechanism sends the movable storage rack back to the material storage apparatus from the third position to the second position; and in the step 04, the automatic lifting translation mechanism lowers the movable storage rack downwardly; the supporting layer reaches the first position from the second position;

and in this process, the movable storage rack reaches the original position and is supported, and the supporting layer is separated from the movable storage rack to move downwardly to the first position.

In one embodiment, the side wall of the material storage apparatus corresponding to the movable storage rack is also provided with an automatic door; in the step 02, the method further includes opening the automatic door; and in the step 05, the method further includes detecting whether the automatic transportation apparatus leaves the material storage apparatus, and closing the automatic door if yes.

In one embodiment, the step 01 specifically includes detecting whether the automatic transportation apparatus reaches the external area of the movable storage rack, judging whether the top of the automatic transportation apparatus is not empty, and if both are yes, executing the step 02.

In one embodiment, in the step 03, the method further includes judging whether the automatic lifting translation mechanism is retracted in place; and executing the step 04 if yes.

In order to achieve the above objective, the present invention further provides a material storage apparatus configured for storing materials, wherein the material storage apparatus is provided with the movable storage rack; and the movable storage rack is configured for carrying a plurality of material boxes, and the movable storage rack can be separated from the material storage apparatus.

In one embodiment, the bottom of the movable storage rack is provided with the automatic lifting translation mechanism configured for transporting the movable storage rack from the inside to the outside of the material storage apparatus or sending the movable storage rack into the material storage apparatus from the outside of the material storage apparatus.

In one embodiment, the top of the automatic lifting translation mechanism supports and contacts the bottom of the movable storage rack, and is configured for supporting the movable storage rack in the transportation process; and the automatic lifting translation mechanism is nested in a fixed supporting body, and the fixed supporting body is configured for carrying the automatic lifting translation mechanism and configured for supporting the movable storage rack in the non-transportation process.

In one embodiment, the top of the automatic lifting translation mechanism and the top of the fixed supporting body are respectively provided with a top correction positioning component; the bottom of the movable storage rack is provided with bottom correction positioning components matched with the top correction positioning components; and each of the top correction positioning components is matched with the corresponding bottom correction positioning component to jointly correct the alignment deviation between the top of the automatic lifting translation mechanism and the bottom of the movable storage rack or the alignment deviation between the top of the fixed supporting body and the bottom of the movable storage rack.

In one embodiment, the top correction positioning components are correction positioning bulges, and the bottom correction positioning components are correction positioning holes; or the top correction positioning components are correction positioning holes, and the bottom correction positioning components are correction positioning bulges; the top size of the correction positioning hole is greater than the top diameter of the correction positioning bulge, and the correction positioning bulges enter the correction positioning holes, so that the top of the automatic lifting translation mechanism is positioned and aligned at the bottom of the movable storage rack, or the top of the fixed supporting body is positioned and aligned at the bottom of the movable storage rack.

In one embodiment, the correction positioning bulges are cones, and the correction positioning holes are conical holes; or the correction positioning bulges are cylinders, and the correction positioning holes are long slotted holes.

In one embodiment, the tip of each cone is also provided with a top cylinder, and the sharp end of each conical hole is also correspondingly provided with a top cylinder hole; and the top cylinder enters the top cylinder hole, so that the positioning alignment between the top of the automatic lifting translation mechanism and the bottom of the movable storage rack, or the positioning alignment between the top of the fixed supporting body and the bottom of the movable storage rack can be completed.

In one embodiment, the automatic lifting translation mechanism is provided with the telescopic mechanism and the lifting mechanism; the telescopic mechanism executes the extending action to push the movable storage rack out of the material storage apparatus or executes the retracting action to pull the movable storage rack into the material storage apparatus; and the lifting mechanism executes the rising action to jack up the movable storage rack or executes the falling action to lower the movable storage rack.

In one embodiment, the telescopic mechanism is provided with a multi-section linkage telescopic assembly, so that the extension and retraction of the telescopic mechanism can be realized by virtue of the multi-section linkage telescopic action.

In one embodiment, the multi-section linkage telescopic assembly includes multiple layers of slide rails, the number of the slide rails of each layer is at least two, and each slide rail is correspondingly sleeved with a slide block matched with the slide rail; and the slide block sleeved on each slide rail is also fixedly connected with the adjacent slide rail, so that the multi-section linkage telescopic assembly can realize the multi-section linkage extension and retraction.

In one embodiment, the both ends of the slide rail are respectively inwardly provided with a buffering positioning block, and in the moving process of the slide rail, the buffering positioning block is configured for limiting a moving distance of the slide rail and releasing the impact of the end part of the slide rail for the slide block (L02).

In one embodiment, the slide rail is also connected with a deformation limiting component, and the deformation limiting component is parallel to the slide rail and is configured for limiting the movement of the slide rail in any direction other than the extension direction of the slide rail.

In one embodiment, the telescopic mechanism is also provided with a limiting sensing assembly configured for limiting the extension distance or retraction distance of the telescopic mechanism. In some embodiments, the telescopic mechanism is provided with a telescopic driving assembly; the telescopic driving assembly is provided with a deformation driving mechanism and a deformable transportation component; the deformable transportation component is connected between the telescopic mechanism and the deformation driving mechanism; and when the telescopic mechanism is extended and retracted, the deformation driving mechanism is controlled by the controller to drive the deformable transportation component to perform the telescopic deformation so as to drive the telescopic mechanism to extend and retract.

In some embodiments, the deformation driving mechanism is controlled by the controller to drive the deformable transportation component to perform the bending deformation or to be restored from the deformation so as to drive the telescopic mechanism to retract or extend.

In some embodiments, the deformable transportation component at least includes a movable transportation rod and a guide transportation rod; the guide transportation rod is fixed; both ends of the movable transportation rod are respectively a first end and a second end; and the first end of the movable transportation rod is rotatably connected onto the telescopic mechanism, and the second end of the movable transportation rod is movably connected onto the guide transportation rod, so that the second end of the movable transportation rod can move along the guide transportation rod so as to drive the first end of the movable transportation rod to move in the horizontal direction, and the first end of the movable transportation rod pushes the telescopic mechanism to extend outwardly or pulls the telescopic mechanism to retract inwardly.

In some embodiments, the gear meshing drive is adopted between the deformation driving mechanism and the guide transportation rod, and the second end of the movable transportation rod is movably connected with the guide transportation rod by virtue of threads; the deformation driving mechanism drives the guide transportation rod to rotate along a center axis through a gear, and the rotating threads on the guide transportation rod enable the second end of the movable transportation rod to move along the guide transportation rod.

In some embodiments, the second end is provided with a thread assembly; the thread assembly is fixed on the guide transportation rod; and threads of the thread assembly are in fit connection with the threads of the guide transportation rod.

In some embodiments, the threads on the guide transportation rod are outer threads, and the threads on the thread assembly are inner threads.

In one embodiment, the automatic lifting translation mechanism and the fixed supporting body are lifted and lowered by virtue of mutually-nested guide rail and slide block.

In one embodiment, the guide rail is arranged on the fixed supporting body; the automatic lifting translation mechanism is provided with the slide block matched with the guide rail; and the slide block and the guide rail are mutually nested.

In one embodiment, the material storage apparatus is provided with a plurality of first storage receiving chambers, wherein each first storage receiving chamber is provided with a material box; the movable storage rack is also provided with a plurality of second storage receiving chambers, and each second storage receiving chamber is provided with a material box; and the second storage receiving chamber is smaller than the first storage receiving chamber, and the volume of the first storage receiving chambers of the same number is greater than the volume of the second storage receiving chambers of the same number, so that the volume of the space of the material storage apparatus for receiving the movable storage rack is greater than the volume of the space of the movable storage rack.

In one embodiment, the material storage apparatus is provided with a plurality of first storage receiving chambers, and each first storage receiving chamber is provided with a material box; the material storage apparatus further includes a plurality of third storage receiving chambers for transporting the material box to the process chamber or receiving the material box transported from the processing equipment; and the volume of each third storage receiving chamber is greater than the volume of the first storage receiving chamber.

The material storage apparatus, the material transportation system and transportation method of the present invention realize the simultaneous transportation of a plurality of material boxes, for example, six material boxes, by arranging the movable storage rack in the material storage apparatus. This overcomes the defect that the existing OHT system can only pick up one material box from the material storage apparatus at one time. Furthermore, by arranging the automatic lifting translation mechanism in the material storage apparatus, the movable storage rack can be automatically moved into or out of the material storage apparatus. Particularly, the position deviation of the movable storage rack in the lifting and transferring process can be corrected by utilizing the top correction positioning components, so that the movable storage rack can be accurately positioned, thereby preventing the movable storage rack from tilting and even tipping over due to the position deviation in the lifting and transferring process. The material transportation system of the present invention utilizes the movable storage rack and the automatic transportation apparatus to simultaneously transport a plurality of material boxes between the material storage apparatuses and between the material storage apparatus and the processing equipment. Moreover, by adopting the automatic transportation apparatus, the single-box track overhead traveling crane and the overhead track in the traditional OHT system are canceled. Therefore, the problems that the traditional OHT system is high in design complexity, highly difficult and limited in later adjustment, and limited in the practical application can be overcome. In contrast, the cooperation of the automatic transportation apparatus and the movable storage rack of the present invention can reduce the design complexity of the production line at the initial stage of the factory construction, and the flexibility in later adjustment is very high, thereby improving the practical application range.

BRIEF DESCRIPTION OF THE DRAWINGS

FIG. 23 is a flow diagram of transporting an empty movable storage rack into a material storage apparatus according to one embodiment of the present invention;

DETAILED DESCRIPTION OF THE INVENTION

In order to make the content of the present invention clearer and easier to understand, the content of the present invention will be further described below in conjunction with the drawings of description. Of course, the present invention is not limited to the specific embodiment, and the general replacements well known to those skilled in the art shall be covered within the protection scope of the present invention.

The present invention is further described below in combination with FIG. 1 to FIG. 15 and specific embodiments. It should be noted that the drawings are in a very simplified form according to a non-precise ratio, and are only used to conveniently and clearly achieve the purpose of describing the objectives of the present embodiment.

Figure 1:
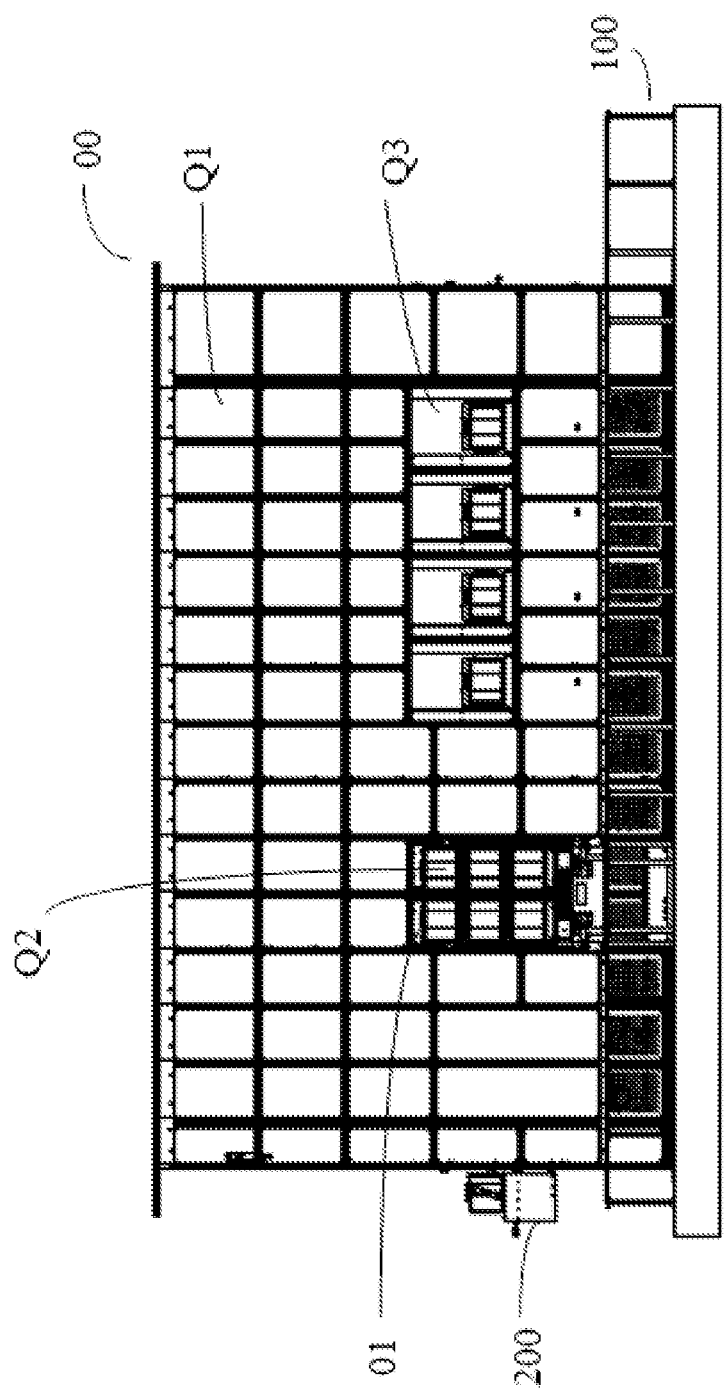
FIG. 1 is a structural schematic diagram of a material storage apparatus according to one embodiment of the present invention.
Figure 2:
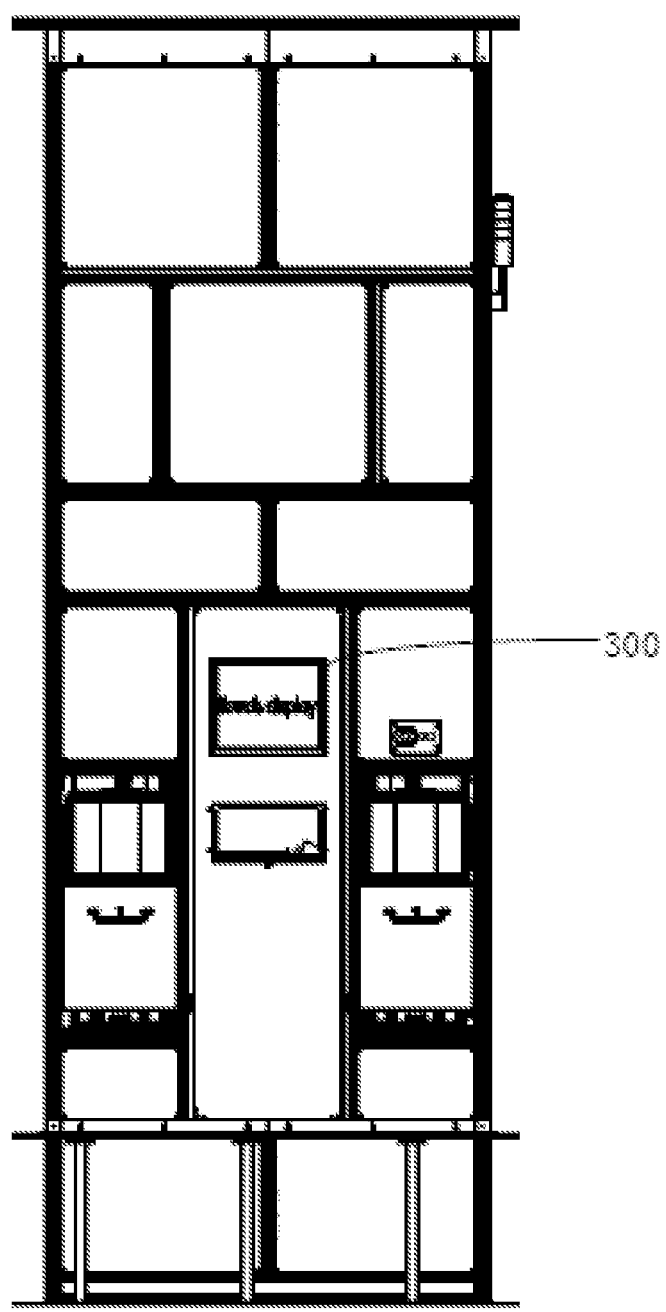
FIG. 2 is a schematic diagram of a side surface of the material storage apparatus in FIG. 1.

Referring to FIG. 1, a material storage apparatus 00 of the present embodiment is arranged on an abutment 100. The abutment 100 is hollowed, and configured for isolating the material storage apparatus 00 from the floor, thereby facilitating the heat dissipation of the material storage apparatus 00. The material storage apparatus 00 is provided with a plurality of storage receiving chambers and a movable storage rack 01. Furthermore, referring to FIG. 1 and FIG. 2, FIG. 2 is a schematic diagram of a side surface of the material storage apparatus of the present embodiment. The material storage apparatus 00 of the present embodiment also includes a material box transportation table 200, a human-machine interaction display interface 300 and the like. Each storage receiving chamber in the present embodiment is configured for storing a material box. Each storage receiving chamber is provided with one material box.

Referring to FIG. 1, these storage receiving chambers can include first storage receiving chambers Q1, second storage receiving chambers Q2 and third storage receiving chambers Q3. The first storage receiving chambers Q1 are arranged in the material storage apparatus 00 in a matrix manner. The second storage receiving chambers Q2 are arranged in the movable storage rack 01. In the present embodiment, the second storage receiving chamber Q2 is smaller than the first storage receiving chamber Q1, and the volume of the first storage receiving chambers Q1 of the same number is greater than the volume of the second storage receiving chambers Q2 of the same number, so that the size of the space receiving the movable storage rack 01 in the material storage apparatus 00 is greater than the space size of the movable storage rack 01. In this way, in the process of moving into and out of the material storage apparatus 00, the collision of the movable storage rack 01 with the material storage apparatus 00 can be avoided. Moreover, the space for receiving the movable storage rack 01 in the material storage apparatus 00 can be ensured to be sufficiently utilized. Preferably, the bottom of the movable storage rack 01 is higher than the bottom of the material storage apparatus 00, the height of the second storage receiving chamber Q2 on an $N^{th}$ layer in the movable storage rack 01 is approximate to the height of the first storage receiving chamber Q1 on an $(N-1)^{th}$ layer in the material storage apparatus 00, and N is a positive integer and is greater than or equal to 1.

Furthermore, the side wall, corresponding to the movable storage rack 01, of the material storage apparatus 00 is also provided with an automatic door (in order to facilitate the indication of the movable storage rack, the automatic door is not shown in FIG. 1, and the automatic door is arranged in the outer side of the movable storage rack 01), and the movable storage rack 01 is sent out or sent in by opening or closing the automatic door.

Herein, the third storage receiving chambers Q3 are configured for transporting or receiving the material boxes transported from the processing equipment, and the volume of the third storage receiving chamber Q3 can be greater than the volume of the first storage receiving chamber Q1.

Figure 3:
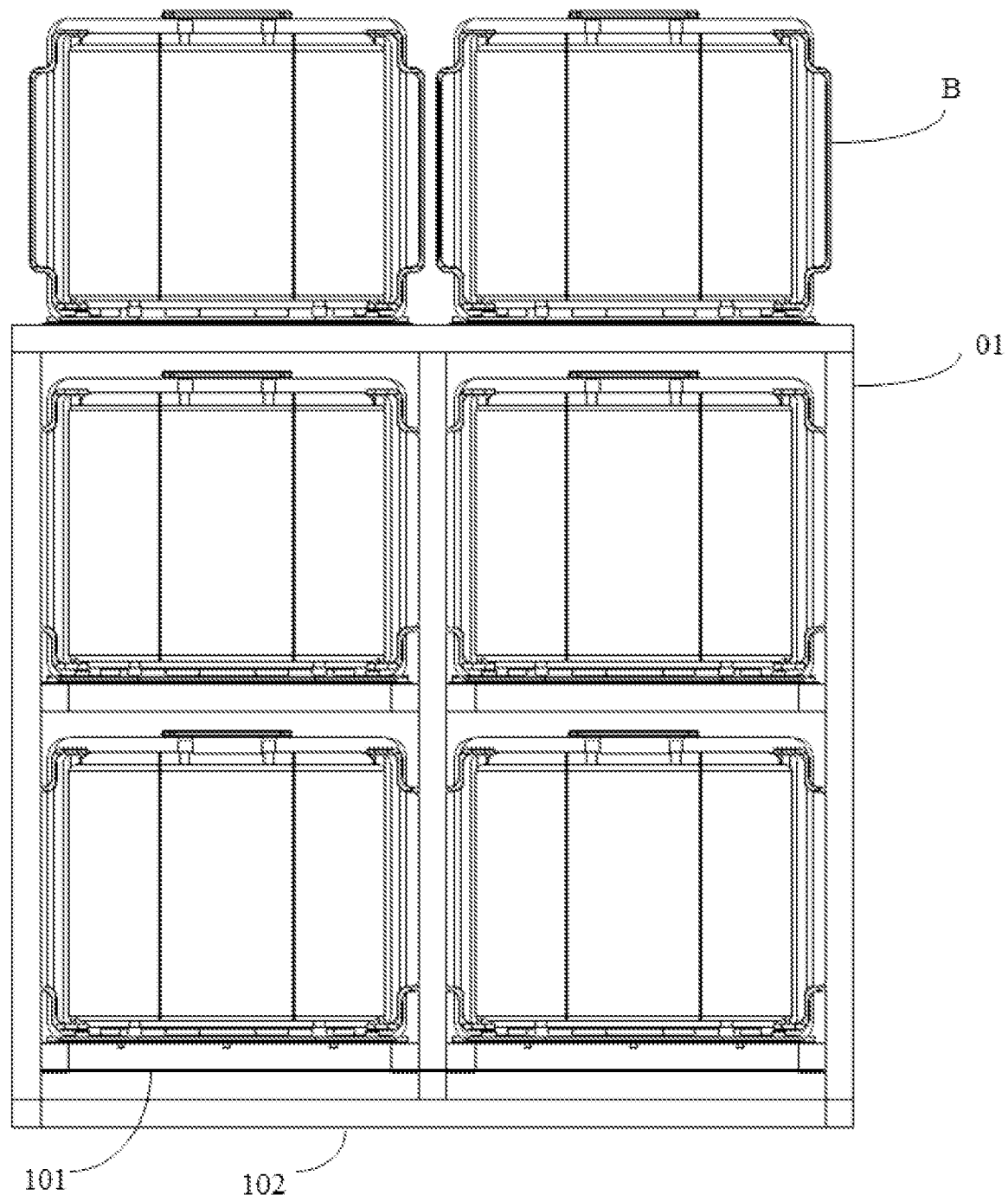
FIG. 3 is a structural schematic diagram of a movable storage rack of one embodiment of the present invention.
Figure 4:
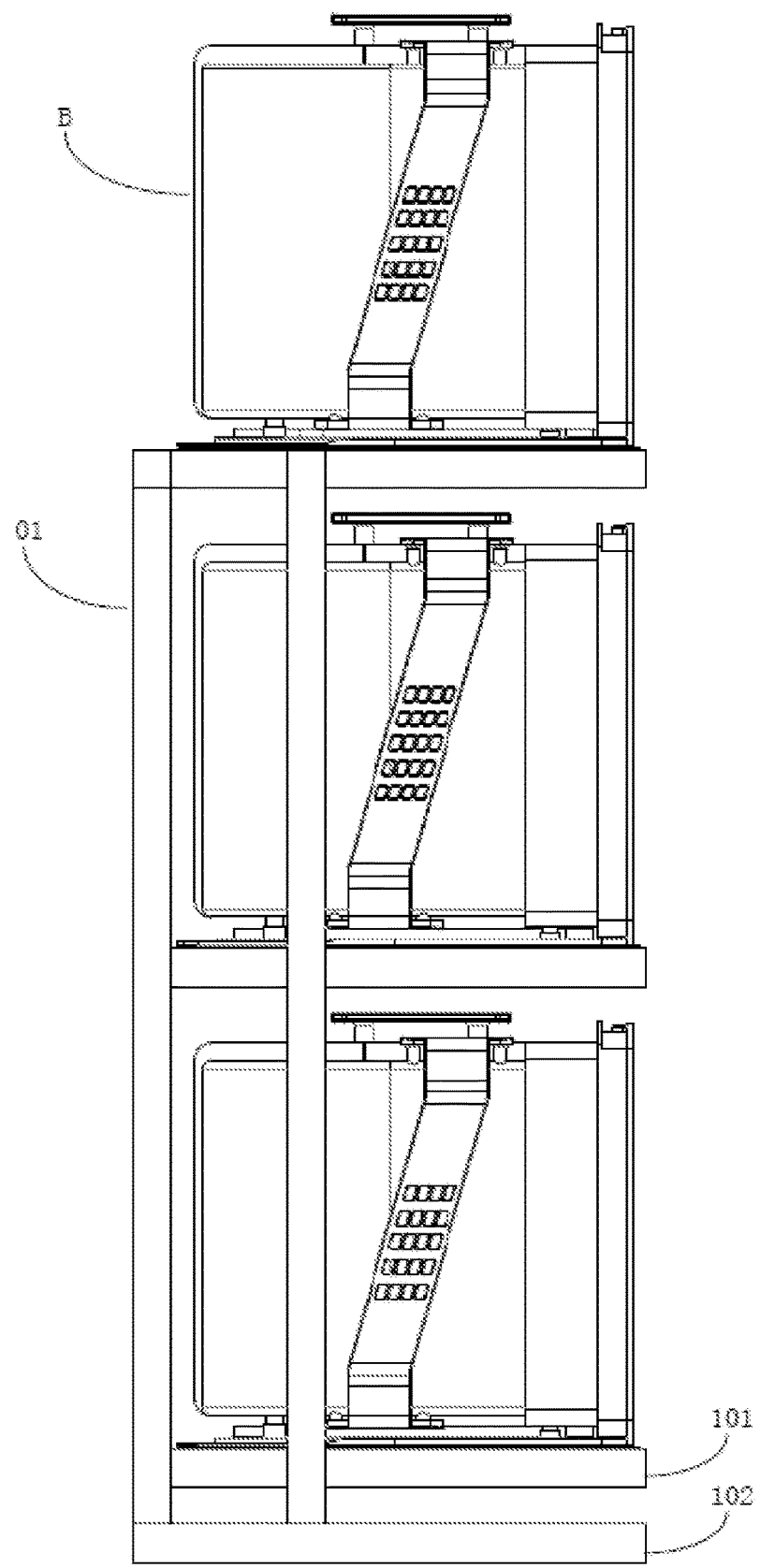
FIG. 4 is a structural schematic diagram of a side surface of a movable storage rack in FIG. 3.
Figure 5:
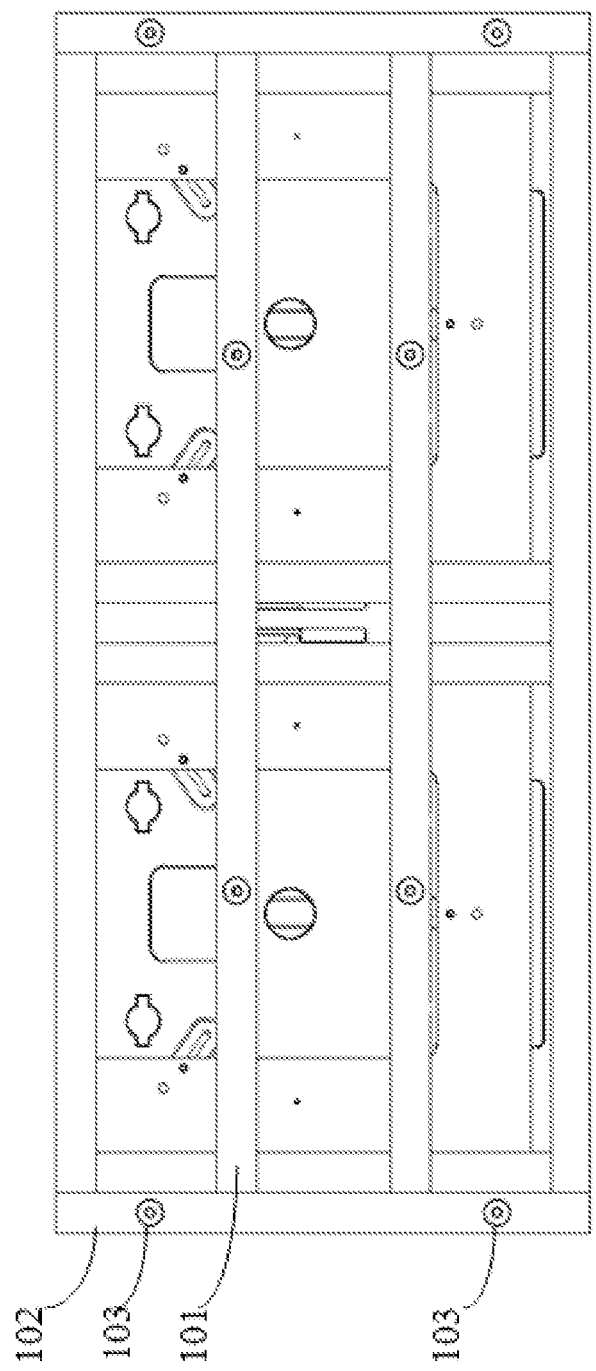
FIG. 5 is a schematic diagram of the bottom of a movable storage rack in FIG. 3.

The volume of the third storage receiving chamber Q3 is set to be large, which facilitates the entry and exit of the large-volume mechanical arm so as to pick and place the material box. Referring to FIG. 3 to FIG. 5 in combination with FIG. 1, FIG. 3 is a structural schematic diagram of the movable storage rack of the present embodiment. FIG. 4 is a structural schematic diagram of a side surface of the movable storage rack of the present embodiment. FIG. 5 is a structural schematic diagram of the bottom of the movable storage rack of the present embodiment. The movable storage rack 01 of the present embodiment is provided with six second storage receiving chambers Q2 in total, which is not intended to limit the protection scope of the present invention. In other embodiments of the present invention, the number of the second storage receiving chambers Q2 can be four, eight and even more and is not limited to the even number, an odd number is acceptable, and the even number of second storage receiving chambers Q2 can be adopted to ensure the balance and stability of the movable storage rack 01 in a stationary state and in the moving process. In the present embodiment, referring to FIG. 3 and FIG. 4, the bottom of the movable storage rack 01 is provided with two layers of bottom supporting structures. The two layers of bottom supporting structures include an upper layer bottom supporting structure 101 and a lower layer bottom supporting structure 102. The upper layer bottom supporting structure 101 carriers a material box; the lower layer bottom supporting structure 102 supports the entire movable storage rack 01. The bottom of the upper layer bottom supporting structure 101 is higher than the top of the lower layer bottom supporting structure 102. Referring to FIG. 5, in the present embodiment, both the upper layer bottom supporting structure 101 and the lower layer bottom supporting structure 102 are respectively provided with correction positioning components 103 which can be correction positioning holes herein and are matched with correction positioning components on the automatic translation lifting mechanism, the telescopic mechanism and the automatic transportation apparatus. The correction positioning components, the automatic translation lifting mechanism, the telescopic structure and the automatic transportation apparatus are described in detail below and not described herein. Therefore, by arranging the upper layer bottom supporting structure 101 and the lower layer bottom supporting structure 102, the movable storage rack 01 can be kept balanced and stable both in the stationary state and in the moving state. Moreover, the automatic lifting translation mechanism can conveniently pick up and transport the movable storage rack 01, and the automatic transportation apparatus can conveniently carry the movable storage rack 01.

Figure 6:
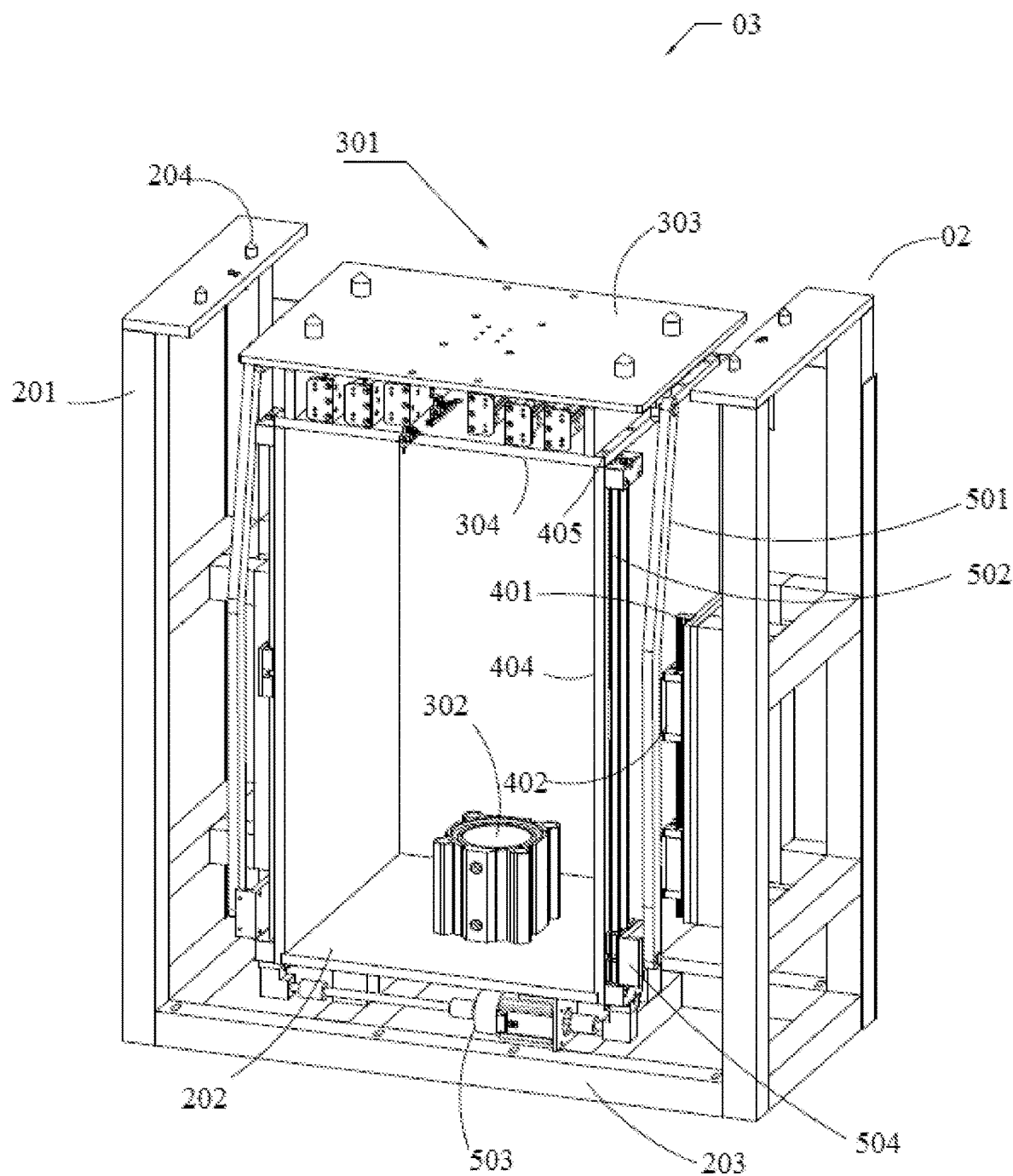
FIG. 6 is a three-dimensional structural schematic diagram of an automatic lifting translation mechanism according to one embodiment of the present invention.
Figure 7:
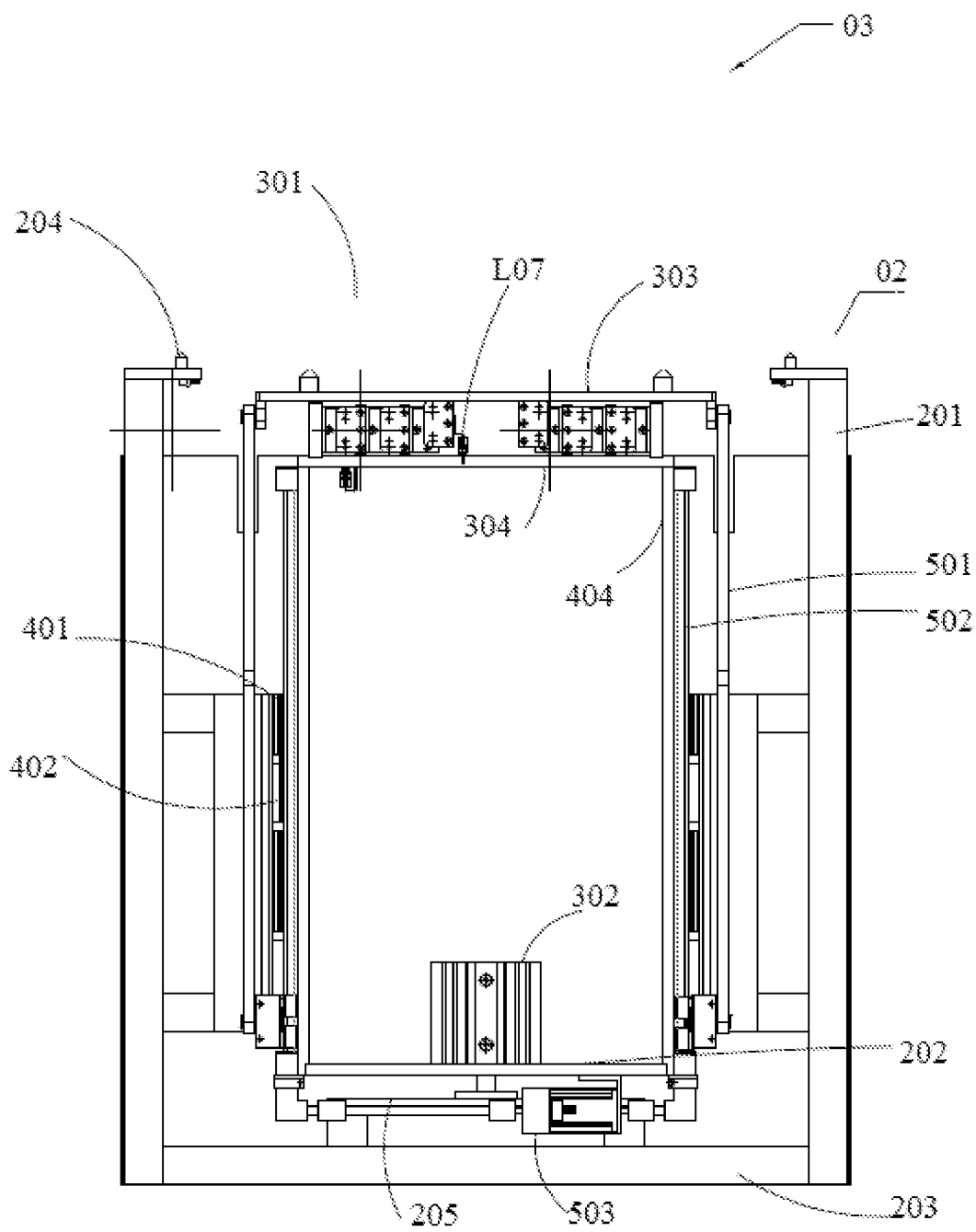
FIG. 7 is a front structural schematic diagram of an automatic lifting translation mechanism of FIG. 6.

Referring to FIG. 6 and FIG. 7 in combination with FIG. 1, FIG. 6 is a three-dimensional structural schematic diagram of an automatic lifting translation mechanism of the present embodiment; and FIG. 7 is a front structural schematic diagram of the automatic lifting translation mechanism of the present embodiment. The automatic lifting translation mechanism 03 of the present embodiment can be configured for transporting the movable storage rack 01 from inside of the material storage apparatus 00 to the outside of the material storage apparatus 00 or sending the movable storage rack 01 from the outside of the material storage apparatus 00 into the material storage apparatus 00. The top of the automatic lifting translation mechanism 03 herein supports and contacts the bottom of the movable storage rack 01 and is configured for supporting the movable storage rack 01 in the transportation process. The automatic lifting translation mechanism 03 is nested in a fixed supporting body 02. The fixed supporting body 02 herein is configured for carrying the automatic lifting translation mechanism 03 and for supporting the movable storage rack 01 in the non-transportation process. In the present embodiment, the fixed supporting body 02 is a fixed frame, which is not intended to limit the protection scope of the present invention. In other embodiments of the present invention, the fixed supporting body can also be in other forms.

As shown in FIG. 6, a framework of the fixed frame is composed of four vertical supporting columns 201, a first layer supporting seat 203 connected with the bottoms of the four vertical supporting columns 201, and a second layer supporting seat 202 connected with the middle-upper parts of the four supporting columns 201. The tops of two opposite ones of the four vertical supporting columns 201 can be provided with connected top plates 204. The first layer supporting seat 203 is used as a base of the entire fixed frame and configured for supporting the entire fixed frame. The second layer supporting seat 202 is configured for supporting the automatic lifting translation mechanism 03. The second layer supporting seat 202 is used as a fundamental plane, the height of bulged portions of the four supporting columns 201 is greater than the height of the second supporting seat 202, and the top plates 204 of the four supporting columns 201 are configured for supporting the bottom of the movable storage rack 01.

Figure 10:
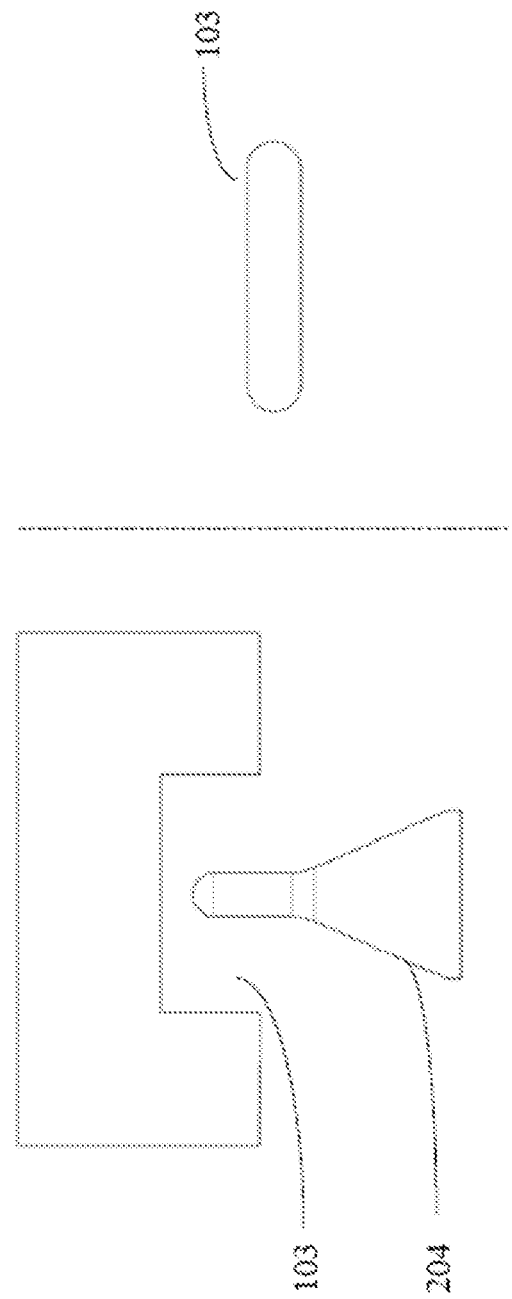
FIG. 10 is a structural schematic diagram of a group of matched top correction positioning component and bottom correction positioning component according to another embodiment of the present invention.

Refer to FIG. 5 (the structural schematic diagram of the bottom of the movable storage rack) to FIG. 10. In FIG. 6, the top of the automatic lifting translation mechanism 03 and the top of the fixed supporting body 02 are respectively provided with a top correction positioning component 204. In FIG. 5, the bottom of the movable storage rack 01 is provided with bottom correction positioning components 103 matched with the top correction positioning components 204. In this way, referring to FIG. 5 and FIG. 8, each top correction positioning component 204 is correspondingly matched with the corresponding bottom correction positioning component 103 to jointly correct an alignment deviation between the top of the automatic lifting translation mechanism 03 and the bottom of the movable storage rack 01 or the alignment deviation between the top of the fixed supporting body 02 and the bottom of the movable storage rack 01. Specifically, in the present embodiment, in FIG. 8, the top correction positioning components 204 are correction positioning bulges, and the bottom correction positioning components 103 in FIG. 5 are correction positioning holes. However, this is not intended to limit the protection scope of the present invention. In other embodiments of the present invention, the top correction positioning components can also be correction positioning holes, and the bottom correction positioning components can be correction positioning bulges. In the present embodiment or in other embodiments, the correction positioning bulges 204 enter the correction positioning holes 103, so that the top of the automatic lifting translation mechanism 03 is aligned at the bottom of the movable storage rack 01, or the top of the fixed supporting body 02 is aligned at the bottom of the movable storage rack 01. Therefore, when the movable storage rack 01 falls and is to be located on the fixed supporting body 02, the top correction positioning components 204 on the fixed supporting body 02 and the bottom positioning correction parts 103 of the movable storage rack 01 are used. Once the position deviation occurs between the movable storage rack 01 and the fixed supporting body 02, the deviation can be corrected by utilizing the cooperation of the top correction positioning components 204 and the bottom correction positioning components 103. For example, the top correction positioning components 204 are the correction positioning bulges, and the bottom correction positioning components 103 are correction positioning holes. Since the top size of the correction positioning hole is greater than the top size of the correction positioning bulge, when the position deviation occurs between the movable storage rack 01 and the fixed supporting body 02, the tops of the correction positioning bulges can always enter a range of the correction positioning holes and fall into the correction positioning holes to drive the movable storage rack 01 to be correspondingly deviated, thereby correcting the position of the movable storage rack 01. It should be noted herein that in order to achieve the position deviation correction, the top size of the correction positioning hole shall be designed on the basis of the movement accuracy of the automatic lifting translation mechanism 03, so that the movable storage rack 01 having the position deviation is ensured to always fall into the top size of the correction positioning holes. Similarly, when the automatic lifting translation mechanism 03 is raised and is going to contact the bottom of the movable storage rack 01, the correction positioning bulges on the top of the automatic lifting translation mechanism 03 and the correction positioning holes on the bottom of the movable storage rack 01 are used. Once the position deviation occurs between the movable storage rack 01 and the automatic lifting translation mechanism 03, the deviation is corrected by virtue of the cooperation of the correction positioning bulges and the correction positioning holes. For this process and the principle thereof, references can be made to the above description of the correction positioning bulges and correction positioning holes on the movable storage rack 01 and the fixed supporting body 02 and are not repeated herein.

Figure 8:
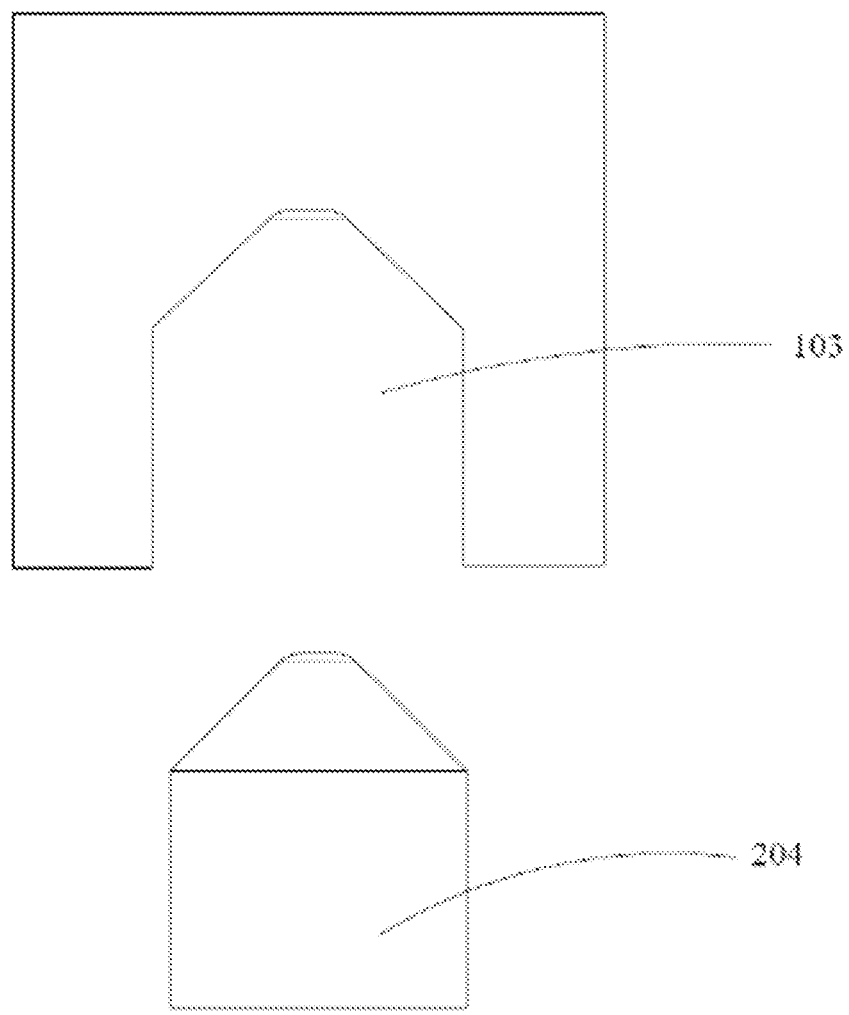
FIG. 8 is a structural schematic diagram of a group of matched top correction positioning component and bottom correction positioning component according to one embodiment of the present invention.
Figure 9:
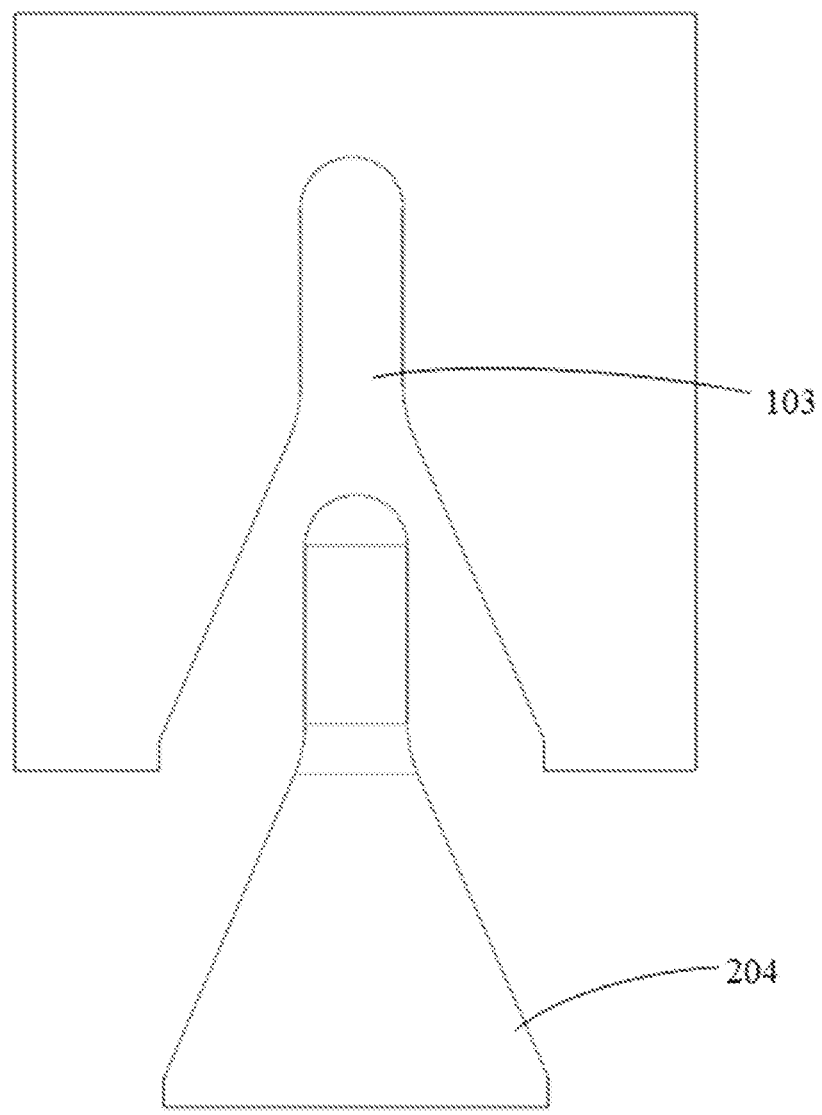
FIG. 9 is a structural schematic diagram of a group of matched top correction positioning component and bottom correction positioning component according to another embodiment of the present invention.

For the structural forms of the correction positioning bulges and the correction positioning holes, in the present embodiment, preferably, referring to FIG. 8, the top correction positioning components 204 are correction positioning bulges and are cones herein, and the bottom correction positioning components 103 are correction positioning holes and are conical holes herein. The correction positioning bulges can include top cones and bottom cylinders. The correction positioning holes can correspondingly include top conical holes and bottom cylindrical holes. The top conical holes are matched with the top cones, and the bottom cylinders are matched with the bottom cylindrical holes. Referring to FIG. 9, the top correction positioning components 204 are correction positioning bulges; the correction positioning bulges herein can include bottom cones and top cylinders. The bottom correction positioning components 103 are correction positioning holes, and the correction positioning holes herein can include bottom conical holes and top cylindrical holes. In other embodiments, referring to FIG. 10, the right side of a dotted line in FIG. 10 indicates that the bottom correction positioning component 103 are correction positioning holes, and the left side of the dotted line indicates a cooperation relation of the correction positioning holes and the correction positioning bulges. The top correction positioning components 204 herein are correction positioning bulges, and the bottom correction positioning components 103 are correction positioning holes. The top ends of the correction positioning bulges can be but not limited to cylinders, for example, the entire correction positioning bulges can be cylinders or can be cones with cylinders on the tops, and the correction positioning holes are long slotted holes. It should be noted that, in the present invention, the correction positioning bulges can be used as the top correction positioning components and can also be used as the bottom correction positioning components. The correction positioning holes can also be used as the top correction positioning components and can also be used as the bottom correction positioning components. Furthermore, in other embodiments of the present invention, the correction positioning bulges are cones, the tips of the cones are also provided with top cylinders, the correction positioning holes are conical holes, and the sharp end of the conical holes are also correspondingly provided with top cylindrical holes; and the top cylinders enter the top cylindrical holes, so that the positioning alignment between the top of the automatic lifting translation system and the bottom of the movable storage rack can be completed.

Again referring to FIG. 6 and FIG. 7 in combination with FIG. 1, in the present embodiment, the automatic lifting translation mechanism 03 is provided with a telescopic mechanism 301 and a lifting mechanism. The telescopic mechanism 301 executes the extending action to push the movable storage rack 01 out of the material storage apparatus 00 or executes the retracting action to pull the movable storage rack 01 into the material storage apparatus 00. The lifting mechanism executes the rising action to jack up the movable storage rack 01 or executes the falling action to lower the movable storage rack 01. It should be noted that, in the present embodiment, the top of the telescopic mechanism 301 can also be provided with a supporting layer 303, and the supporting layer 303 is configured for supporting the movable storage rack 01, thereby improving the stability in the transportation process of the movable storage rack 01.

Figure 11:
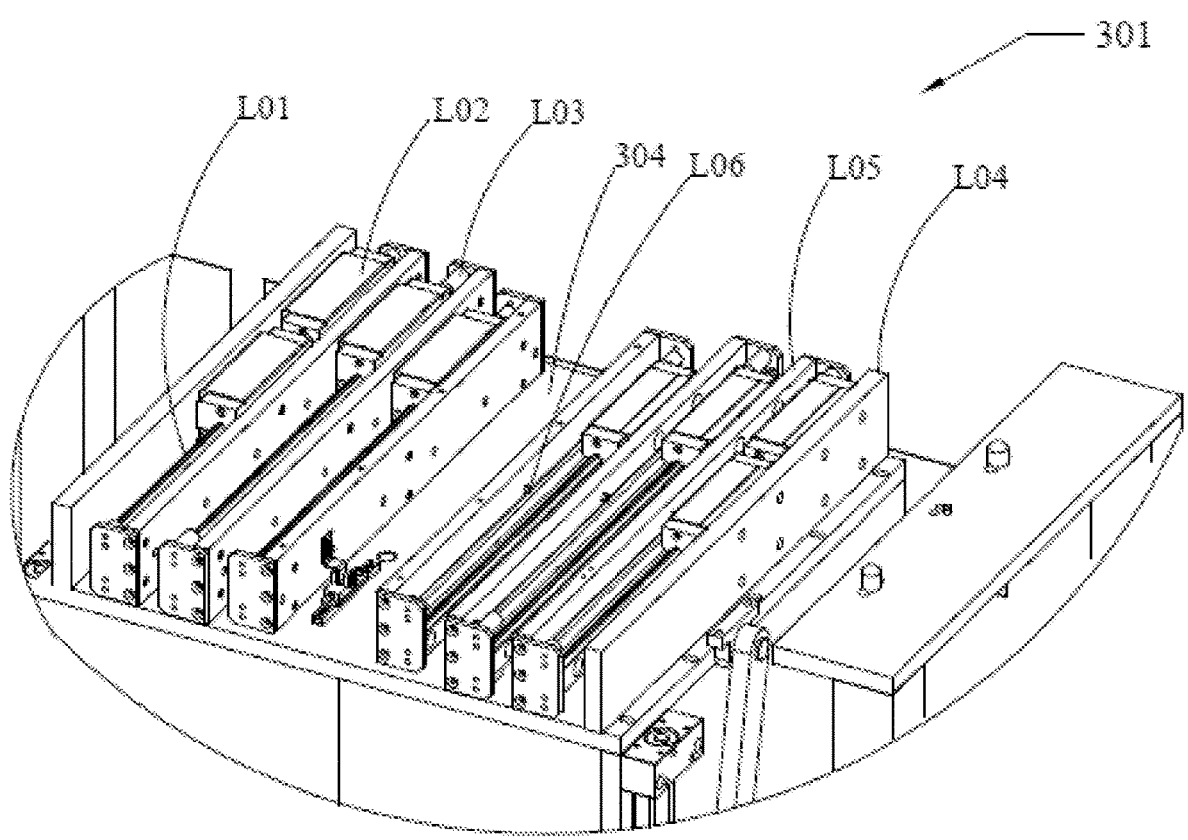
FIG. 11 is a three-dimensional structural schematic diagram of a telescopic mechanism according to one embodiment of the present invention.
Figure 12:
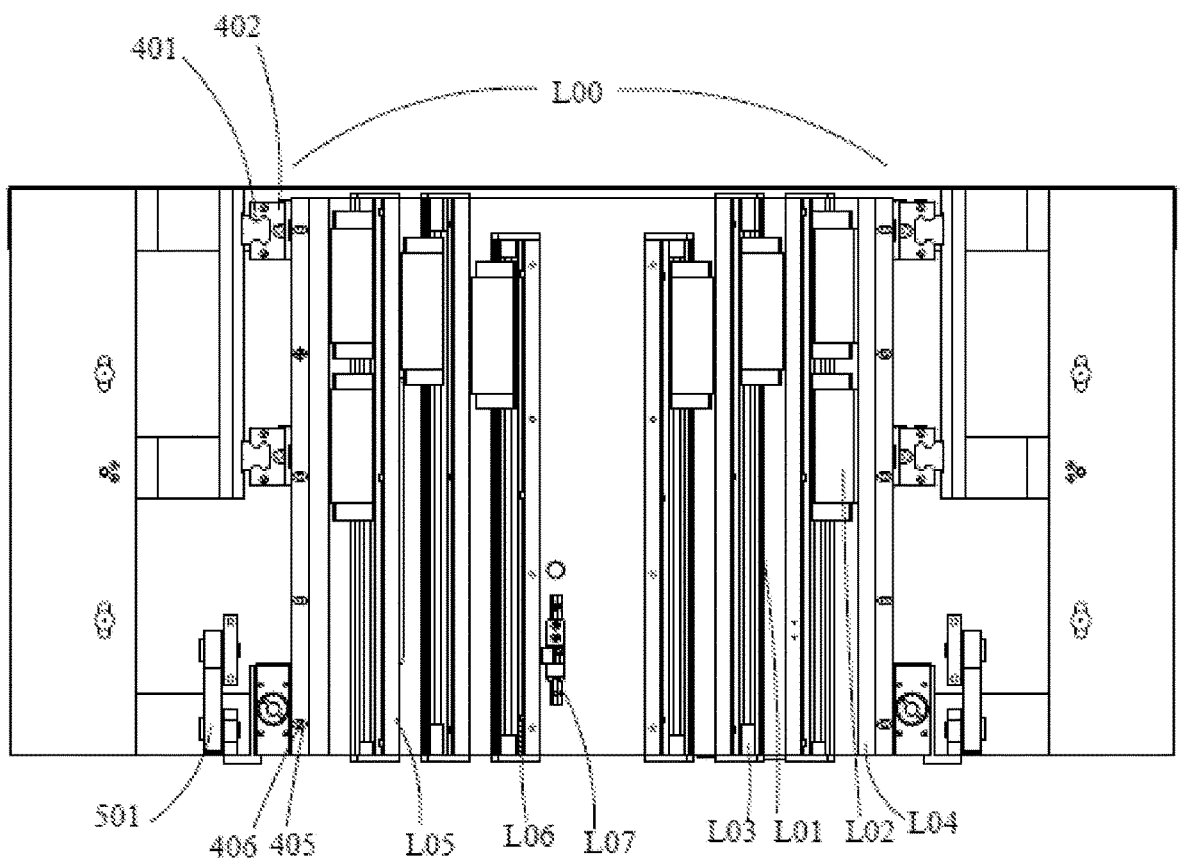
FIG. 12 is a structural schematic diagram of a telescopic mechanism in a retraction state according to one embodiment of the present invention.

Preferably, herein, referring to FIG. 11 in combination with FIG. 12, the telescopic mechanism 301 is provided with a multi-section linkage telescopic assembly L00, thereby realizing the extension and retraction of the telescopic mechanism 301 through the multi-section linkage telescopic action.

Specifically, the multi-section linkage telescopic assembly L00 can include multiple layers of slide rails, the number of the slide rails of each layer can be at least two, and each slide rail L01 is correspondingly sleeved with a slide block L02 matched with the slide rail. The slide block L02 sleeved on each slide rail L01 is also fixedly connected with the adjacent slide rail L01, so that the telescopic mechanism 301 realizes the multi-section linkage extension and retraction. In the present embodiment, the slide rails can be distributed on multiple layers in a same horizontal direction. In other embodiments, the slide rails can be distributed on multiple layers in a vertical direction.

Figure 13:
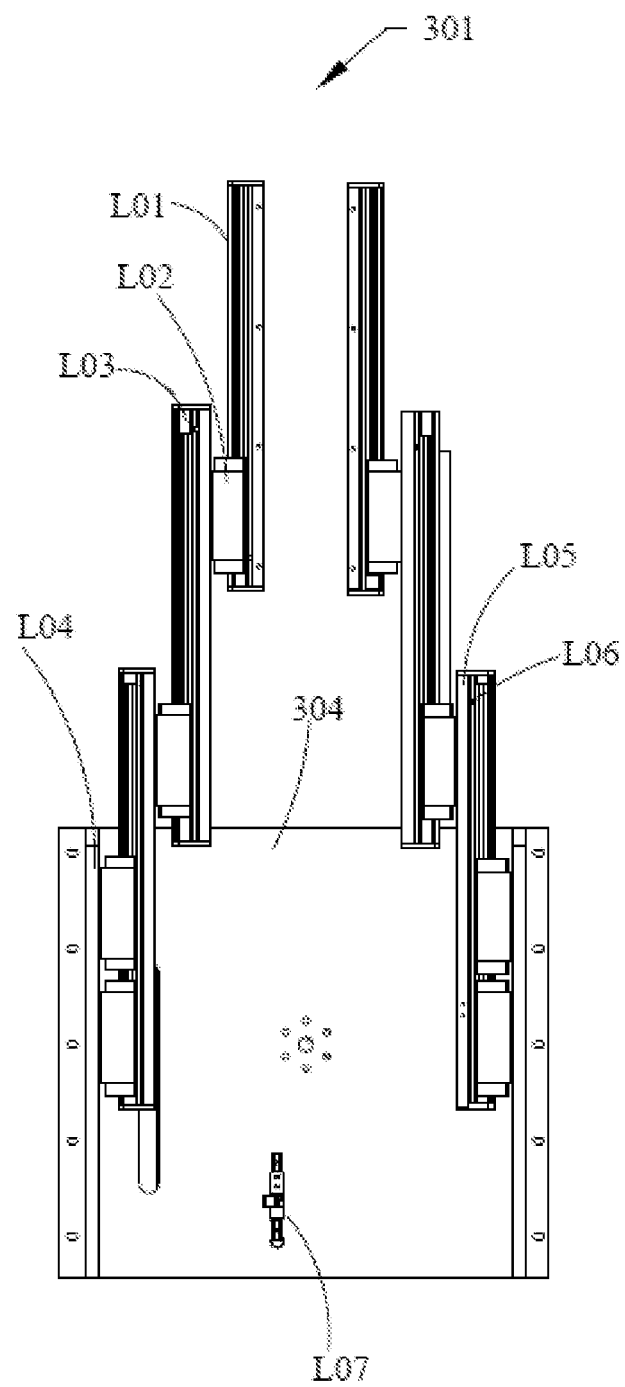
FIG. 13 is a structural schematic diagram of a telescopic mechanism in an extension state according to one embodiment of the present invention.

In the present embodiment, preferably, both ends of each slide rail L01 can be respectively inwardly provided with a buffering positioning block L03. In the moving process of the slide rail L01, the buffering positioning block L03 is configured for limiting a moving distance of the slide rail L01 and the impact of the end part of the slide rail L01 for the slide block L03. In the present embodiment, two outermost sides of the multi-section linkage telescopic assembly L00 are respectively provided with a fixed plate L04, the fixed plates L04 are fixedly provided with slide blocks L02, and the slide blocks L02 are connected onto the adjacent slide rails L01 in a sleeving manner. In this way, in combination with FIG. 12, FIG. 13 and FIG. 1, in the outward extension sliding process of the multi-section linkage telescopic assembly L00 which is horizontally distributed, the slide rail L01 located on the innermost side slides forwardly under the guide effect of the adjacent slide block L02. When the tail end of the slide rail L01 on the innermost side is about to reach the adjacent slide block L02, the slide rail still continues to move forwardly, and at this time the buffering positioning block L03 can buffer the impact of the slide rail L01 at the innermost side for the adjacent slide block L02, thereby avoiding the shortening of the service life caused by the damage. Meanwhile, by arranging the buffering positioning block L03, the slide rail L01 at the innermost side can be ensured to move stably when contacting the adjacent slide rail L01 in the moving process. The sudden stopping problem can be avoided; and the continuity and smoothness of the multiple layers of slide rails of the multi-section linkage telescopic assembly L00 can be ensured in the moving process. This ensures the moving continuity, smoothness and stability of the movable storage rack 01 carried by the slide rail. Furthermore, when the buffering positioning block L03 contacts the adjacent slide rail L01, since the slide rail L01 at the innermost side continues to move forwardly, the buffering positioning block L03 can push the adjacent slide block L02 to move forwardly, and the adjacent slide block L02 can drive the other slide rail L01 on which the slide block L02 is fixed to begin to move forwardly. Then, according to the above process, the slide rail L01 on other subsequent layers can be continuously driven to slide forwardly until the slide rail L01 at the outermost side moves forwardly. Finally, the slide rail is limited by the outermost fixed plate L04 and cannot move, as shown in FIG. 13 in combination with FIG. 12 and FIG. 1. At this moment, a distance between the front end of the slide rail L01 at the innermost side and the front end of the fixed plate L04 is an extension distance of the entire multi-section linkage telescopic assembly L00. Since the multi-section linkage telescopic assembly L00 extends outwardly together with the movable storage rack 01, the extension distance should be the extension distance of the movable storage rack 01. It should be noted that in the outward extension process of the multi-section linkage telescopic assembly L00, as described above, the buffering positioning block L03 located on the tail end of the slide rail L01 plays a major role. In the retraction process of the multi-section linkage telescopic assembly L00, similarly, the buffering positioning block L03 located on the front end of the slide rail L01 plays a major role and has the same effect with the buffering positioning block L03 located on the tail end of the slide rail L01 and is not repeated herein. It should be noted that, in combination with FIG. 7, FIG. 12 and FIG. 13, the supporting layer 303 is fixed on a section, which moves first, in the multi-section linkage telescopic assembly L00. For example, in the multiple layers of slide rails L01, the supporting layer 303 shall be fixed on the slide rail on the layer, which extends out first, of the multiple layers of slide rails, thereby driving the movable storage rack 01 to move.

However, in combination with FIG. 1 and FIG. 13, in the successive linkage sliding process of the multiple layers of slide rails, the repeated reciprocating sliding and the weight of movable storage rack 01 carried by the slide rails may unavoidably result in the deformation of the slide rails L01, such as bending in any direction in a horizontal plane or bending in any direction in a vertical plane, thereby damaging the entire telescopic mechanism 301. Therefore, in the present embodiment, the side surface of the slide rail L01 can also be provided with a deformation limiting component; and the deformation limiting component is parallel to the slide rail L01 and configured for limiting the movement of the slide rail L01 in any non-extension direction of the slide rail. Specifically, as shown in FIG. 11, the deformation limiting component can consist of a limiting rod L0S parallel to the slide rail L01 and limiting pins L06. Both ends of the limiting rod L0S are respectively fixed on both ends of the slide rail L01, and the side surface of the limiting rod L0S is fit to the side surface of the slide rail L01, thereby limiting the deformation of the slide rail L01 in the horizontal plane. The other side of the slide rail L01 is nested in the slide block L02, thereby actually causing the deformation of the other side of the slide rail L01 in the horizontal plane. Furthermore, the limiting pins L06 can be distributed on the limiting rod L0S and can be bulged outwardly so as to buckle the top surface and bottom of the corresponding slide rail L01. In this way, the bending deformation of the slide rail L01 in the vertical plane can be limited by utilizing the limiting pins L06, so that the deformation limiting component formed by the limiting rod L0S and the limiting pins L06 can avoid the deformation of the slide rail L01 in any direction in the horizontal plane and the vertical plane.

Figure 14:
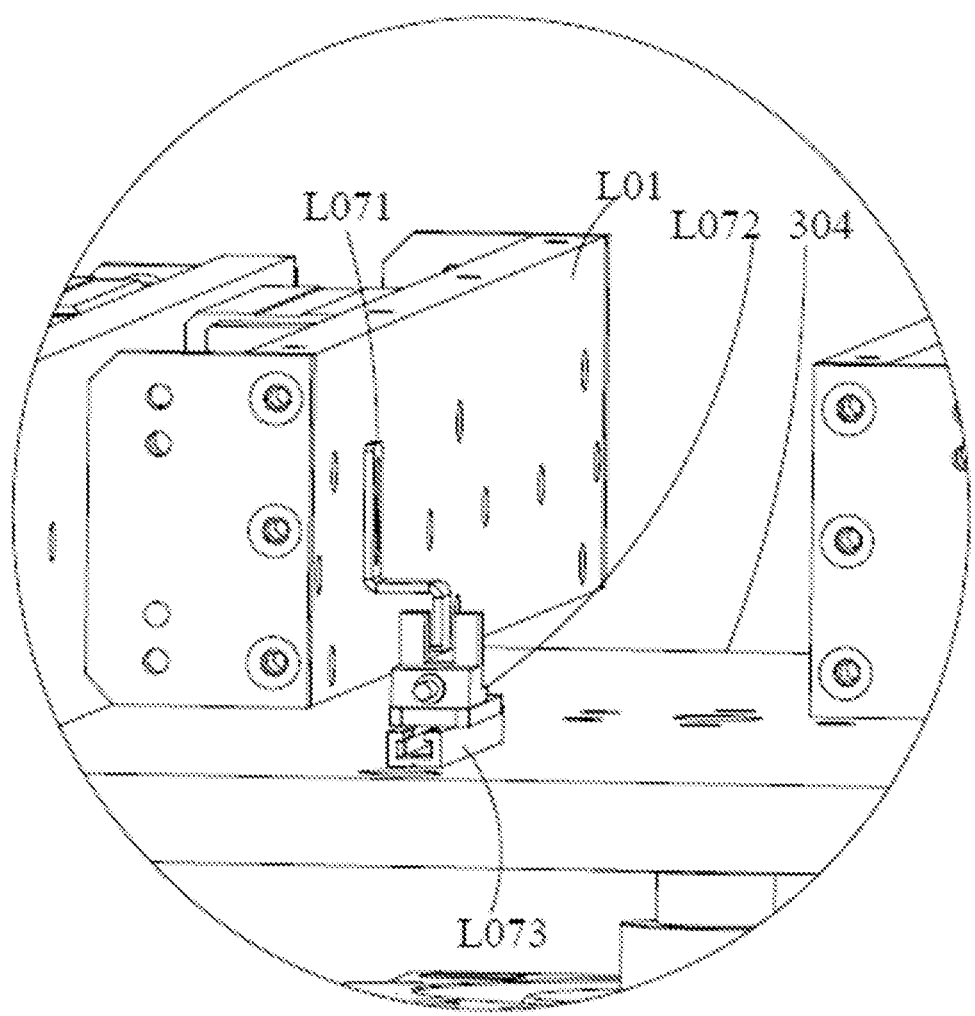
FIG. 14 is a structural schematic diagram of a group of limiting sensing assemblies according to one embodiment of the present invention.
Figure 15:
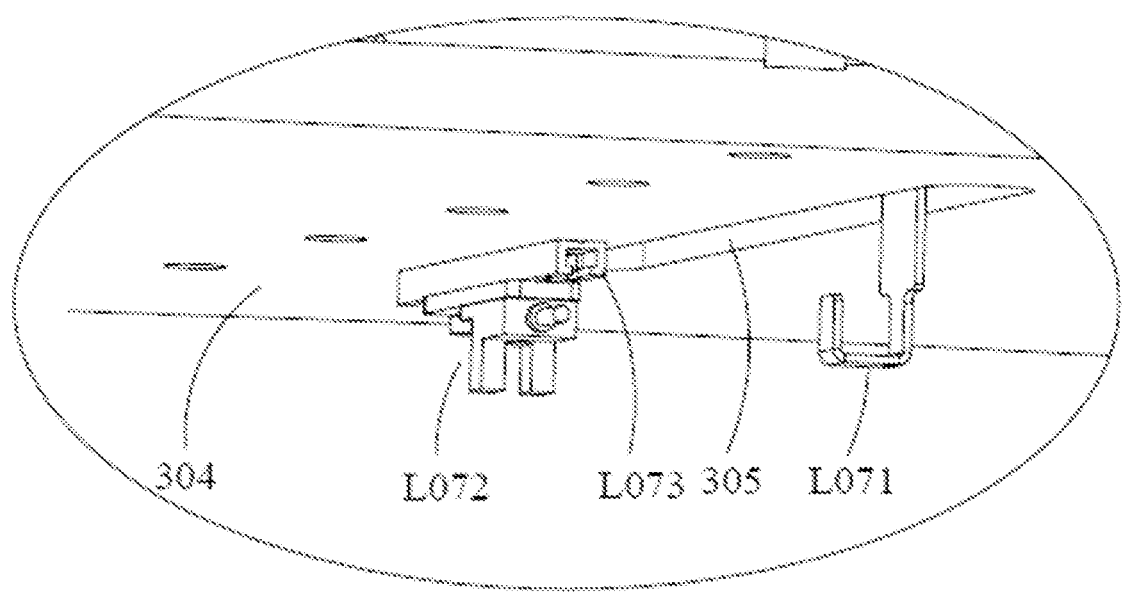
FIG. 15 is a structural schematic diagram of another group of limiting sensing assemblies according to one embodiment of the present invention.

In the extension and retraction process of the telescopic mechanism 301, the telescopic moving distance can be limited by virtue of the lengths of the buffering positioning block L03 and the slide rail L0. However, in the practical application, the repeated movement may cause the movement deviation, and the deviation may be increased over time, which leads to a great safety potential hazard for the entire material storage apparatus 00. Therefore, in the present embodiment, referring to FIG. 14 and in combination with FIG. 12 and FIG. 7, the telescopic mechanism 301 can also be provided with limiting sensing assemblies L07 configured for limiting the extension distance or retraction distance of the telescopic mechanism 301. The limiting sensing assemblies herein do not use the conventional sensor to obtain a probable position through the uni-direction sensing in conjunction with the internal logic calculation, but ensures that the telescopic movement of the telescopic mechanism at each time is basically same through the bi-directional accurate positioning and that the telescopic mechanism is basically returned to the same position, thereby further reducing the movement distance deviation. The limiting sensing assemblies L07 of the present embodiment are specifically described below. Referring to FIG. 14 and FIG. 15 in combination with FIG. 12, the limiting sensing assemblies L07 of the present embodiment can include a limiting sensor L07 and a baffle plate L071. The bottom of the multi-section linkage telescopic assembly L00 is provided with a supporting plate 304. The baffle plate L071 is arranged at one side of the slide rail L01, one side surface of the baffle plate L071 is kept at a distance to the slide rail L01, and the distance enables the baffle plate L071 to enter an opening of the limiting sensor L072. The limiting sensor L072 is installed above or below the supporting plate 304. The limiting sensor L072 is provided with the opening matched with the baffle plate L071. When the baffle plate L071 enters the opening, the limiting sensor L072 judges whether the telescopic mechanism 301 is extended in place or retracted in place. Specifically referring to FIG. 14, the slide rail L01 at the innermost side is finally retracted in place, which indicates that the multi-section linkage telescopic assembly L00 is retracted place. At this time, the baffle plate L071 on the slide rail L01 at the innermost side enters the opening of the limiting sensor L072, so that the limiting sensor L072 senses the entry of the baffle plate L071, thereby judging that the slide rail L071 at the innermost side is retracted in place. Referring to FIG. 15 in combination with FIG. 12, the supporting plate 304 is provided with a slender hollowed groove 305, and the other limiting sensor L072 is arranged on the bottom of the supporting plate 304. The other baffle plate L071 located on one end, close to the outer side, of the slender hollowed groove 305 and located on the slide rail L01 at the outermost side extends to be below the supporting plate 304 through the slender hollowed groove 305. The slide rail L01 at the outermost side is finally extended in place, which indicates that the multi-section linkage telescopic assembly L00 is extended in place. At this moment, the baffle plate located on the slide rail L01 at the outermost side enters the opening of the limiting sensor L072 on the bottom of the supporting plate 304, so that the other limiting sensor L072 senses the entry of the other baffle plate L071, thereby judging that the slide rail L01 at the outermost side is extended in place.

It should be noted that the position of the limiting sensor L072 is initially adjusted or needs to be adjusted when the position deviation occurs. Therefore, in the present embodiment, referring to FIG. 14 and FIG. 15, the limiting sensor L072 and the supporting plate 304 are connected through a correction limiting track L073. Specifically, the limiting sensor L072 can be buckled into the correction limiting track L073, and the position of the limiting sensor L072 is adjusted by moving the limiting sensor L072 along the correction limiting track L073, thereby realizing the position correction of the limiting sensor L072.

Figure 16:
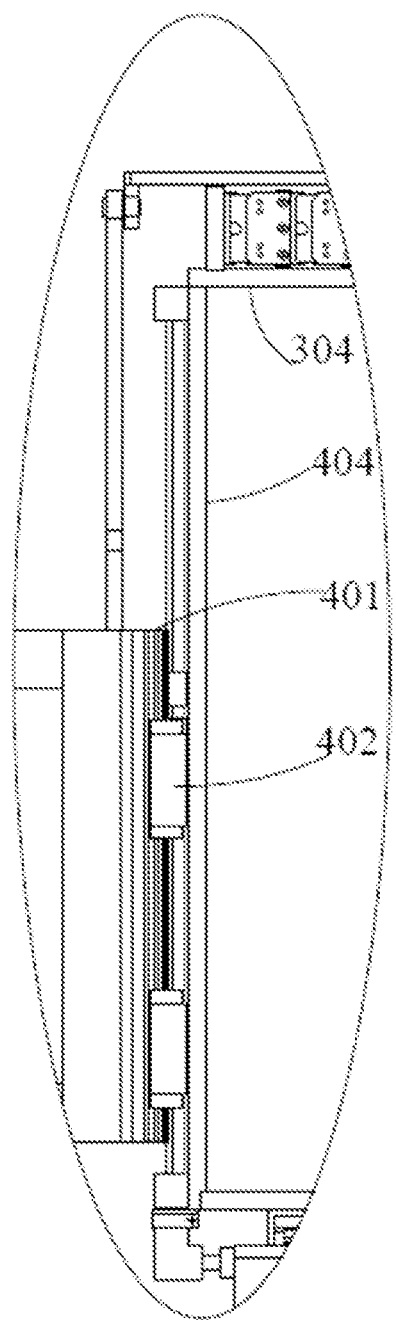
FIG. 16 is a structural schematic diagram of a fixed assembly of an automatic lifting translation mechanism according to one embodiment of the present invention.

In the present embodiment, referring to FIG. 16 in combination with FIG. 6 and FIG. 7, the lifting mechanism includes nested guide rail 401 and slide block 402, thereby realizing the rising and falling movement. Specifically, the guide rail 401 is arranged on the supporting columns 201 of the fixed frame, the lifting mechanism is provided with the slide block 402 matched with the guide rail 401, and the slide block 402 and the guide rail 401 are mutually nested. The lifting mechanism can also be provided with a fixed assembly for fixing the slide block 402. The fixed assembly can consist of a first fixed plate arranged in a first direction and a second fixed plate 404 arranged in a second direction. In the present embodiment, the first plate and the supporting plate 304 are of a same structure. Herein, the first direction is parallel to the extension direction of the guide rail 401, and the second direction is perpendicular to the first direction. The slide block 402 is fixed on the second fixed plate 404, and the first fixed plate (the supporting plate 304) is configured for carrying the telescopic mechanism. Moreover, in combination with FIG. 12, the first fixed plate (the supporting plate 304) and the second fixed plate 404 are connected through a long hole 406 and a fixed part 405, so that the alignment deviation between the first fixed plate (the supporting plate 304) and the second fixed plate 404 can be adjusted through the movement of the fixed part 405 in the long hole 406. Preferably, the length direction of the long hole 406 is perpendicular to a vertical surface of the first fixed plate (the supporting plate 304). Furthermore, in the present embodiment, the supporting plate 304 on the bottom of the telescopic mechanism 301 and the top of the second supporting seat 202 can also be fixedly connected through the second fixed plate 404.

Figure 28:
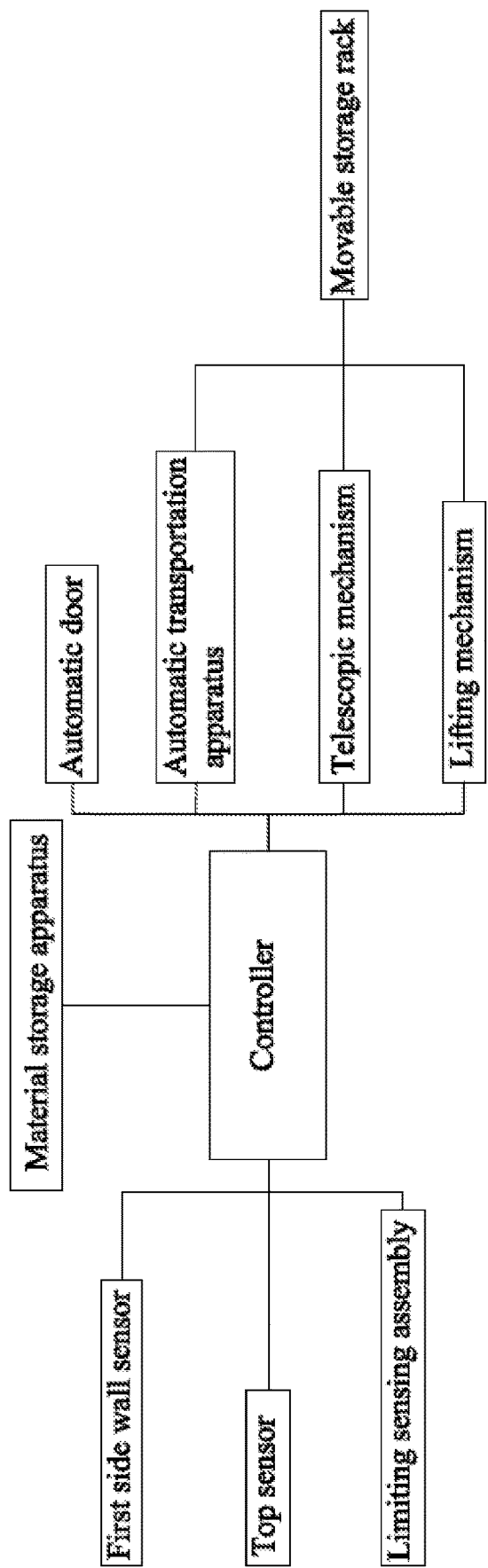
FIG. 28 is a block diagram of a material transportation system according to one embodiment of the present invention.

Herein, referring to FIG. 28 in combination with FIG. 7, the material transportation system is also provided with a controller for controlling the driving mechanism to execute a driving instruction. Specifically, the driving mechanism can include a telescopic driving assembly and a lifting driving assembly 302. The telescopic driving assembly can be controlled by the controller to drive the telescopic mechanism 301 to perform the extending action or the retracting action. The lifting driving assembly 302 can be controlled by the controller to drive the lifting mechanism to perform the rising action or falling action. The lifting driving assembly 302 can adopt an air cylinder and a driving shaft. Preferably, the first layer supporting seat 302 is also provided with a third supporting seat 205, and a driving shaft of the lifting driving assembly 302 can abut against the third supporting seat 302 so as to push the second supporting seat 202, thereby realizing the slide of the lifting mechanism. Specifically, the driving shaft is pushed by using the air cylinder to outwardly abut against the third supporting seat 302 so as to push the slide block 402 of the lifting mechanism to move up relative to the guide rail 401 through the retroaction. The retraction of the air cylinder is used to drive the driving shaft to retract. Therefore, the air cylinder pulls the second supporting seat 202 to move down, and the slide block 403 of the lifting mechanism is driven to move down relative to the guide rail 401. Furthermore, the supporting plate 304 on the bottom of the telescopic mechanism 301 and the top of the second supporting seat 202 can also be fixedly connected through the second fixed plate 404. The lifting driving assembly 302 is arranged on the second supporting seat 202. The second supporting seat 202 is provided with an opening allowing the driving shaft of the lifting driving assembly 302 to pass through, and the driving shaft of the lifting driving assembly 302 can pass through the opening to contact the first layer supporting seat 203. The driving shaft of the lifting driving assembly 302 downwardly abuts against the first layer supporting seat 203, thereby obtaining a counterforce given by the first layer supporting seat 203, and pushing up the supporting plate 304. Meanwhile, the slide block 402 on the second fixed plate 404 slides upwardly along the guide rail 401.

Figure 17:
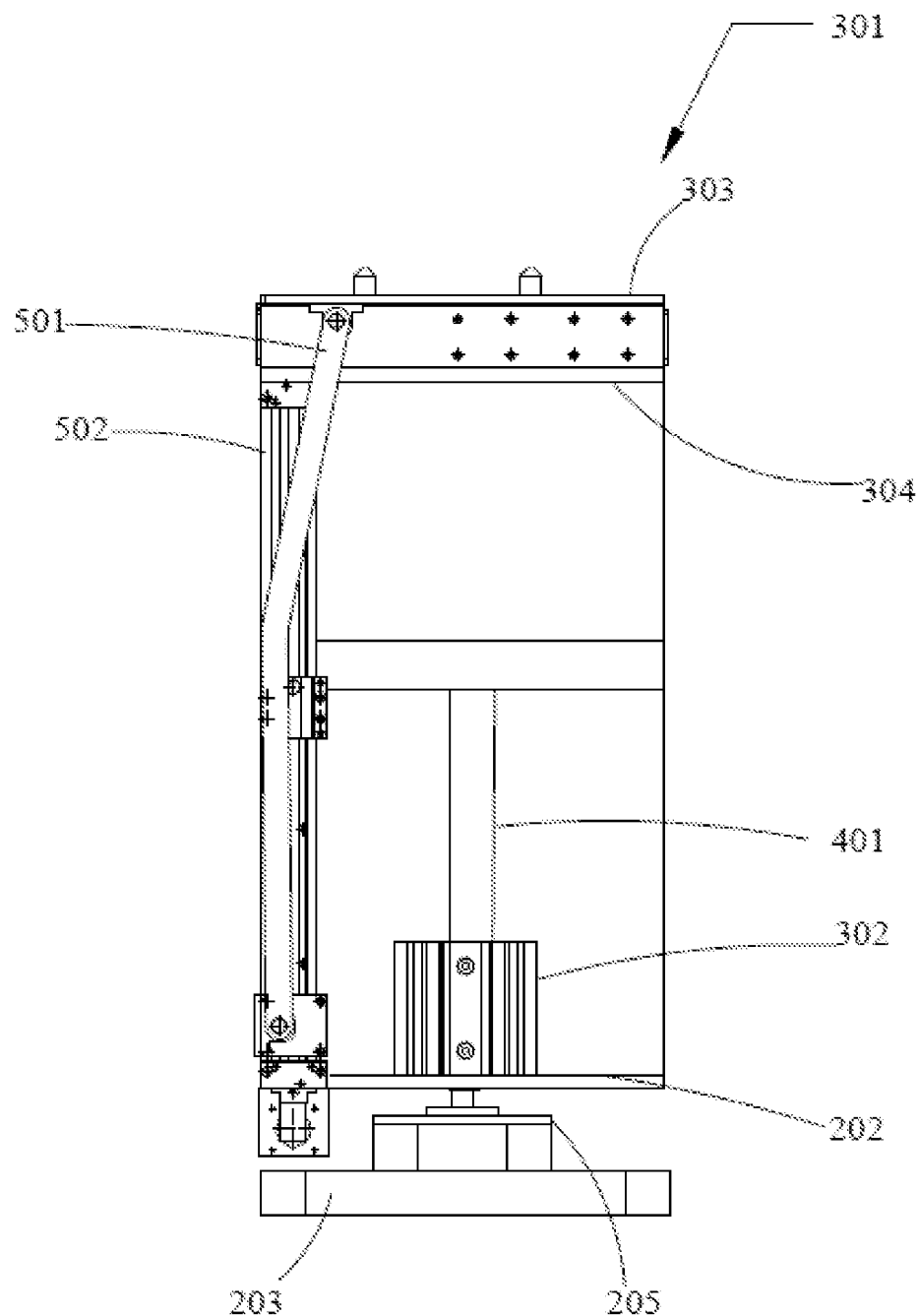
FIG. 17 is a structural schematic diagram of a driving assembly of a telescopic mechanism in a retraction state according to one embodiment of the present invention.

Referring to FIG. 17 in combination with FIG. 12, the telescopic driving assembly is arranged on the multi-section linkage telescopic assembly L00 and configured for driving the multi-section linkage telescopic assembly L00 to perform the telescopic movement. The telescopic driving assembly herein is provided with a deformation driving mechanism 503 and a deformable transportation component, and the deformable transportation component is connected between the multi-section linkage telescopic assembly L00 and the deformation driving mechanism 503. The deformation driving mechanism 503 drives the multi-section linkage telescopic assembly L00 to extend and retract through the telescopic deformation of the driving transportation component. Herein, the controller also controls the starting and stopping of the deformation driving mechanism 503.

Figure 18:
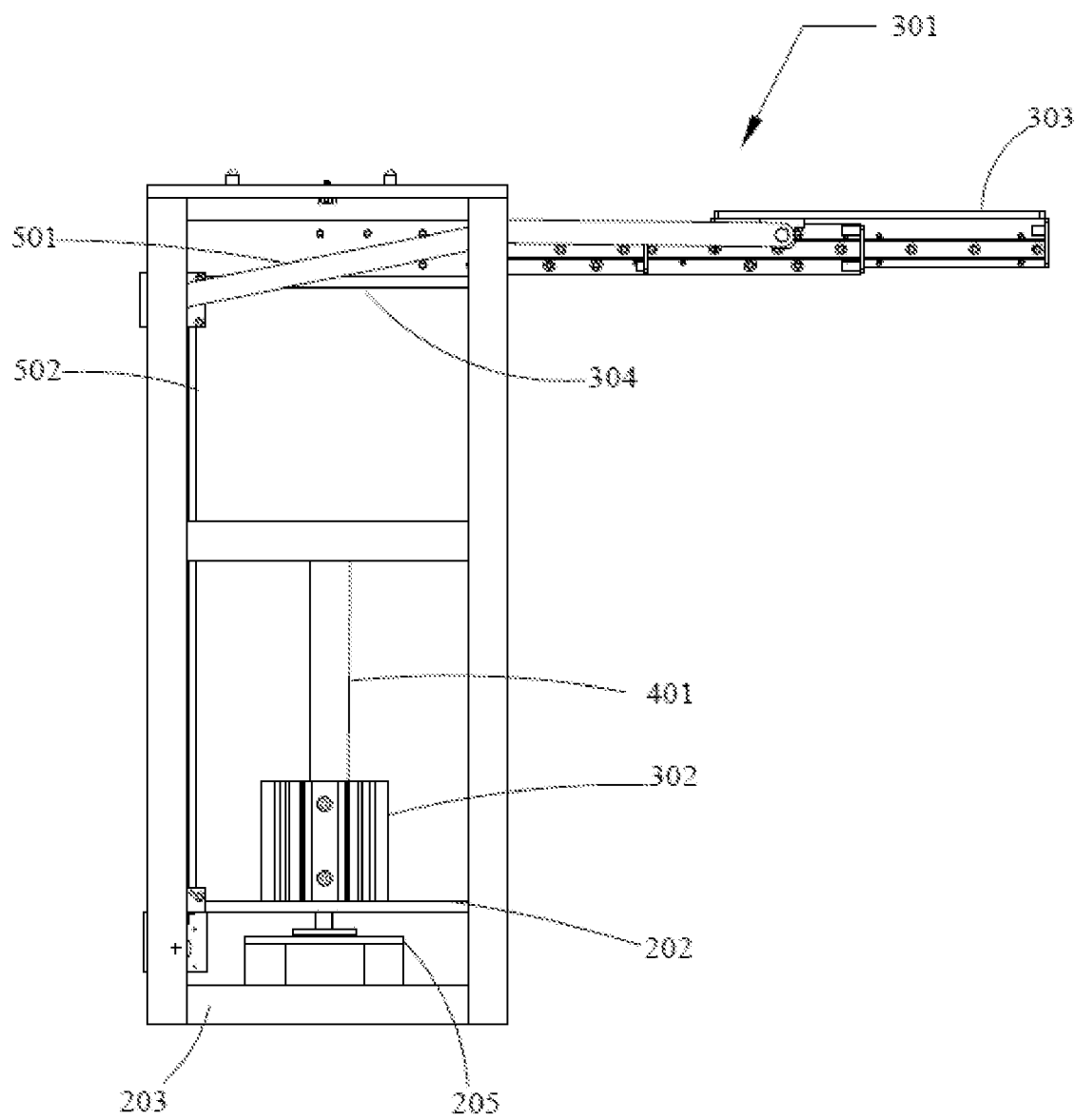
FIG. 18 is a structural schematic diagram of a driving assembly of a telescopic mechanism in an extension state according to one embodiment of the present invention.

Referring to FIG. 17 and FIG. 6, the deformable transportation component can be rigid. Herein, the deformable transportation component at least includes a guide transportation rod 502 and a movable transportation rod 501. The guide transportation rod 502 is fixed. Herein, the guide transportation rod 502 is fixed on the second fixed plate 404. Both ends of the movable transportation rod 501 are respectively configured as a first end and a second end. The first end of the movable transportation rod 501 is rotatably connected to the telescopic mechanism 301. Herein, the first end of the movable transportation rod 501 can be, but not limited to, connected to the supporting layer 303 on the telescopic mechanism 301. The second end of the movable transportation rod 501 is movably connected onto the guide transportation rod 502, so that the second end of the movable transportation rod 501 can move along the guide transportation rod 502 so as to drive the first end of the movable transportation rod 501 to move along a horizontal direction. Therefore, the first end of the movable transportation rod 501 pushes the telescopic mechanism 301 to extend outwardly or pulls the telescopic mechanism 301 to retract inwardly. Referring to FIG. 18 in combination with FIG. 6, the gear meshing drive is adopted between the deformation driving mechanism 503 and the guide transportation rod 502. For example, the deformation driving mechanism 503 adopts a motor and a lead screw. The junction between the lead screw and the fixed transportation rod 502 is provided with a first gear. One end of the fixed transportation rod 502 is provided with a second gear. The first gear is engaged with the second gear. Center axes of the first gear and the second gear are perpendicular to each other. The second end of the movable transportation rod 501 is movably connected with the guide transportation rod 502 by adopting threads. In combination with FIG. 1, the deformation driving mechanism 503 drives the guide transportation rod 502 to rotate along the center axis through the gear. The second end is provided with a thread assembly 504. The thread assembly 504 is not only movably connected with the transportation rod 501, but also the thread assembly 504 is fixed on the guide transportation rod 502, and threads of the thread assembly 504 are in fit connection with threads of the guide transportation rod 502. In the present embodiment, the threads on the guide transportation rod 502 are outer threads, and the threads on the thread assembly are inner threads. Specifically, the motor drives the lead screw to rotate, and the lead screw drives the first gear to rotate in the vertical plane, so that the second gear is driven to rotate in the horizontal plane. The second gear is provided with threads, so that the threads of the second gear also rotate. By means of the rotating threads on the guide transportation rod 502, the second end of the movable transportation rod 501 moves up and down along the guide transportation rod 502. In this way, since the movable transportation rod 501 is rotatably connected to a supporting point on the bottom of the telescopic mechanism 301, the first end of the movable transportation rod 501 can only move along the horizontal direction along with the up-down movement of the second end, thereby pushing the telescopic mechanism 301 to extend outwardly or pulling the telescopic mechanism 301 to retract inwardly.

Figure 19:
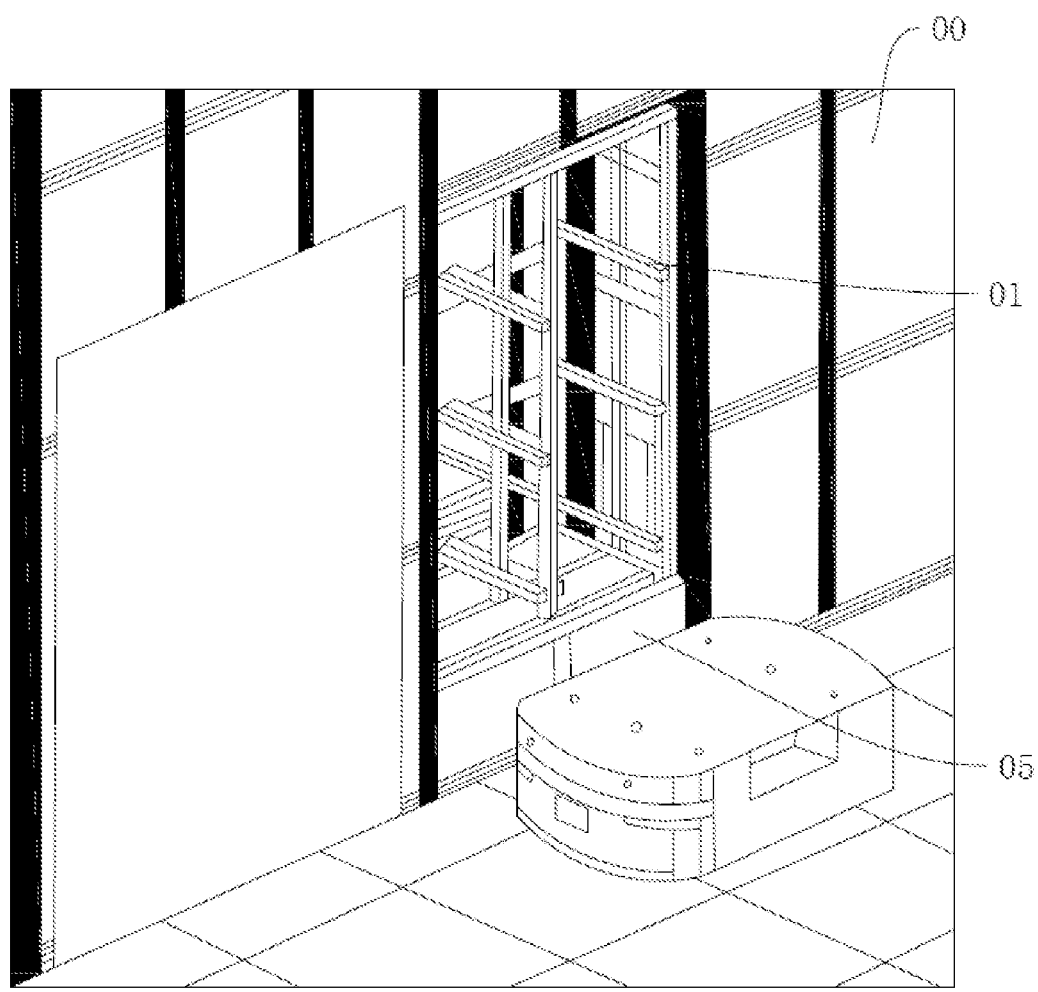
FIG. 19 is a schematic diagram showing a position relation of a baffle plate and a movable storage rack in a material storage apparatus according to one embodiment of the present invention.

In the present embodiment, referring to FIG. 19 in combination with FIG. 6, the area, corresponding to the outer side bottom of the movable storage rack 01, of the material storage apparatus 00 is provided with a baffle plate 05. The baffle plate 05 is configured for protecting the automatic lifting translation mechanism 03 and can avoid the detection of the automatic lifting translation mechanism 03 which is mistaken as a malfunction to issue a danger signal, resulting in the unnecessary stoppage of the transportation of the material transportation system, thereby ensuring the high-efficiency and successful running of the material transportation system.

In combination with FIG. 20 to FIG. 32, the material transportation system of the present embodiment is described in detail below.

Figure 20:
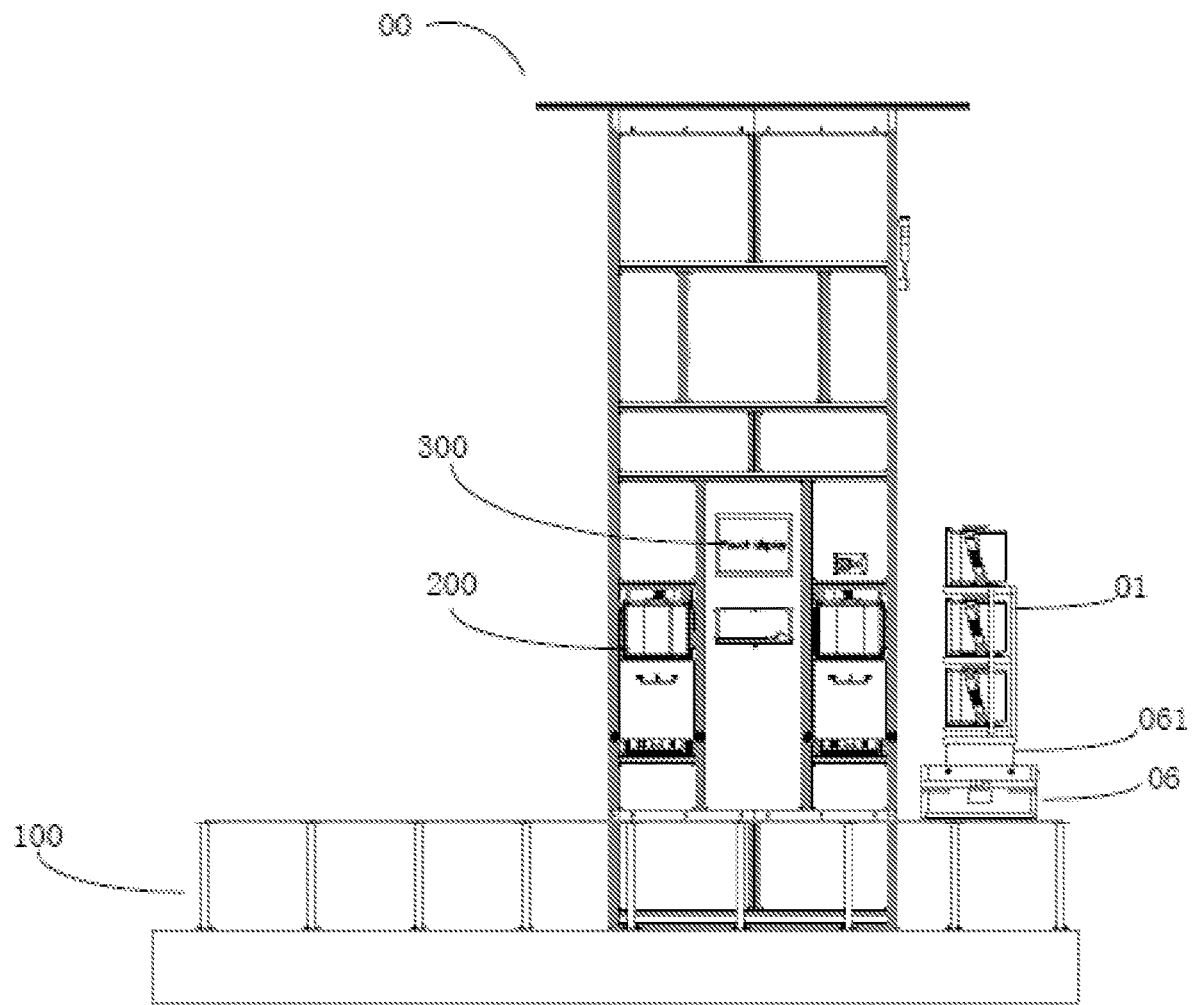
FIG. 20 is a relational diagram of an automatic transportation apparatus and a material storage apparatus according to one embodiment of the present invention.

Referring to FIG. 20, the material transportation system of the present embodiment can adopt the above material transportation apparatus, and also includes an automatic transportation apparatus 06. The automatic transportation apparatus 06 can move freely along any route in any direction and is configured for carrying the movable storage rack 01. Moreover, the automatic transportation apparatus 06 sends the movable storage rack 01 to be in front of the material storage apparatus 00 or transports the movable storage rack 01, which is transported onto the automatic transportation apparatus 06 from the material storage apparatus 00, to a target storage position. For example, when the material is transported, the movable storage rack 01 carrying a plurality of material boxes is transported from the material storage apparatus 00 onto the automatic transportation apparatus 06. The automatic transportation apparatus 06 carries the movable storage rack 01 to move to the target storage position. Or, the automatic transportation apparatus 06 carries the movable storage rack 01 with a plurality of material boxes to reach the material storage apparatus 00, and then the movable storage rack 01 is transported into the material storage apparatus 00. The material transportation can include the transportation from the material storage apparatus 00 to the material storage apparatus 00 and can also include the transportation between the material storage apparatus 00 and a tool.

Figure 21:
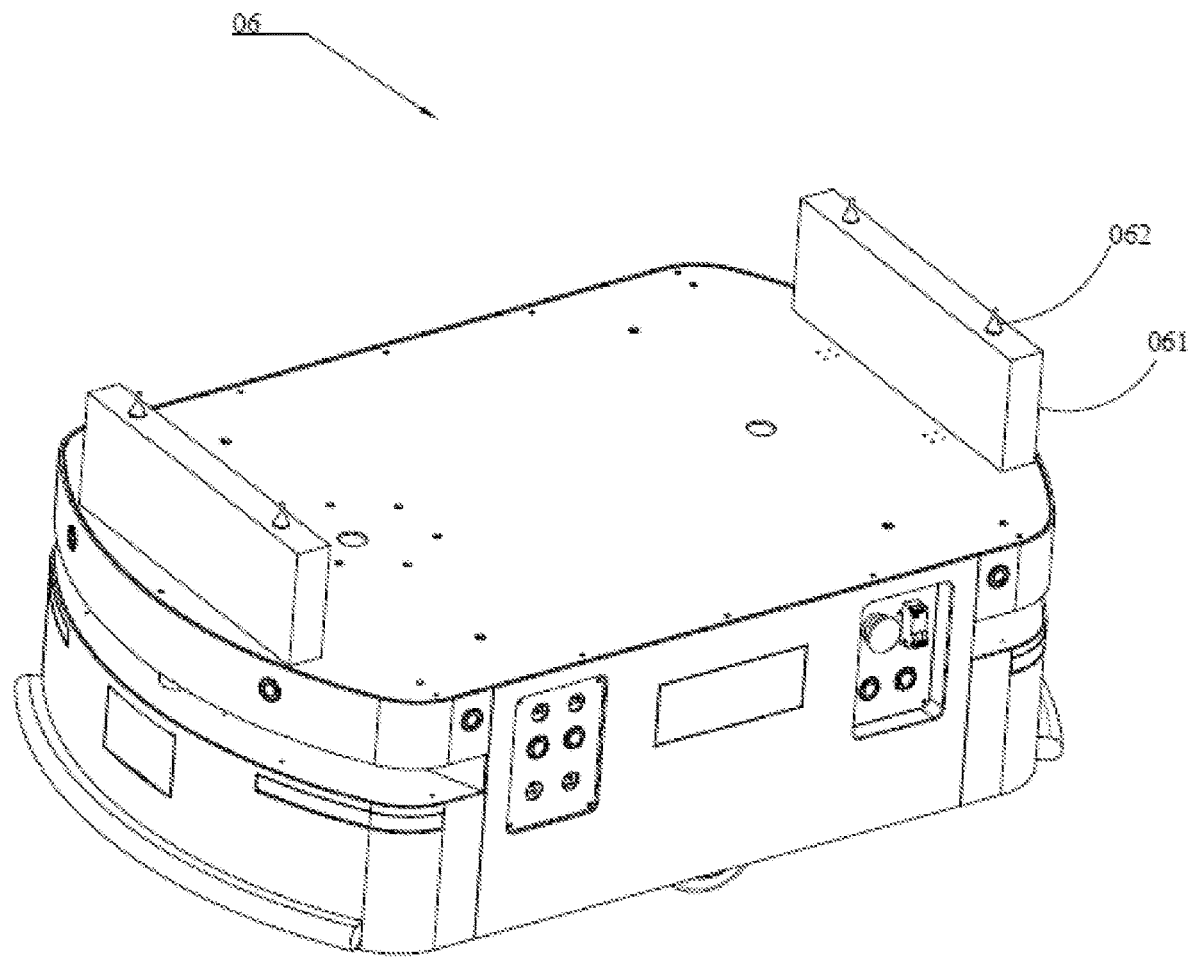
FIG. 21 is a three-dimensional structural schematic diagram of an automatic transportation apparatus according to one embodiment of the present invention.

Preferably, in the present embodiment, the automatic transportation apparatus 06 can adopt a self-propelled backpack robot. Referring to FIG. 21 in combination with FIG. 20 and FIG. 5, the top of the self-propelled backpack robot is provided with a supporting part 061 supporting the movable storage rack 01. The supporting part 061 can be a supporting frame, a supporting table and the like. Moreover, the top of the supporting part 061 can also be provided with a top correction positioning component 062 matched with the bottom correction positioning component 103 on the bottom of the movable storage rack 01. The top correction positioning component 062 of the supporting part 061 is consistent with the top correction positioning components 204 of the automatic lifting translation mechanism 03 and the fixed supporting body 02, and the structure and effect of the top correction positioning component can refer to the above description about the top correction positioning components 204 of the automatic lifting translation mechanism 03 and the fixed supporting body 02 and are not repeated herein.

Figure 29:
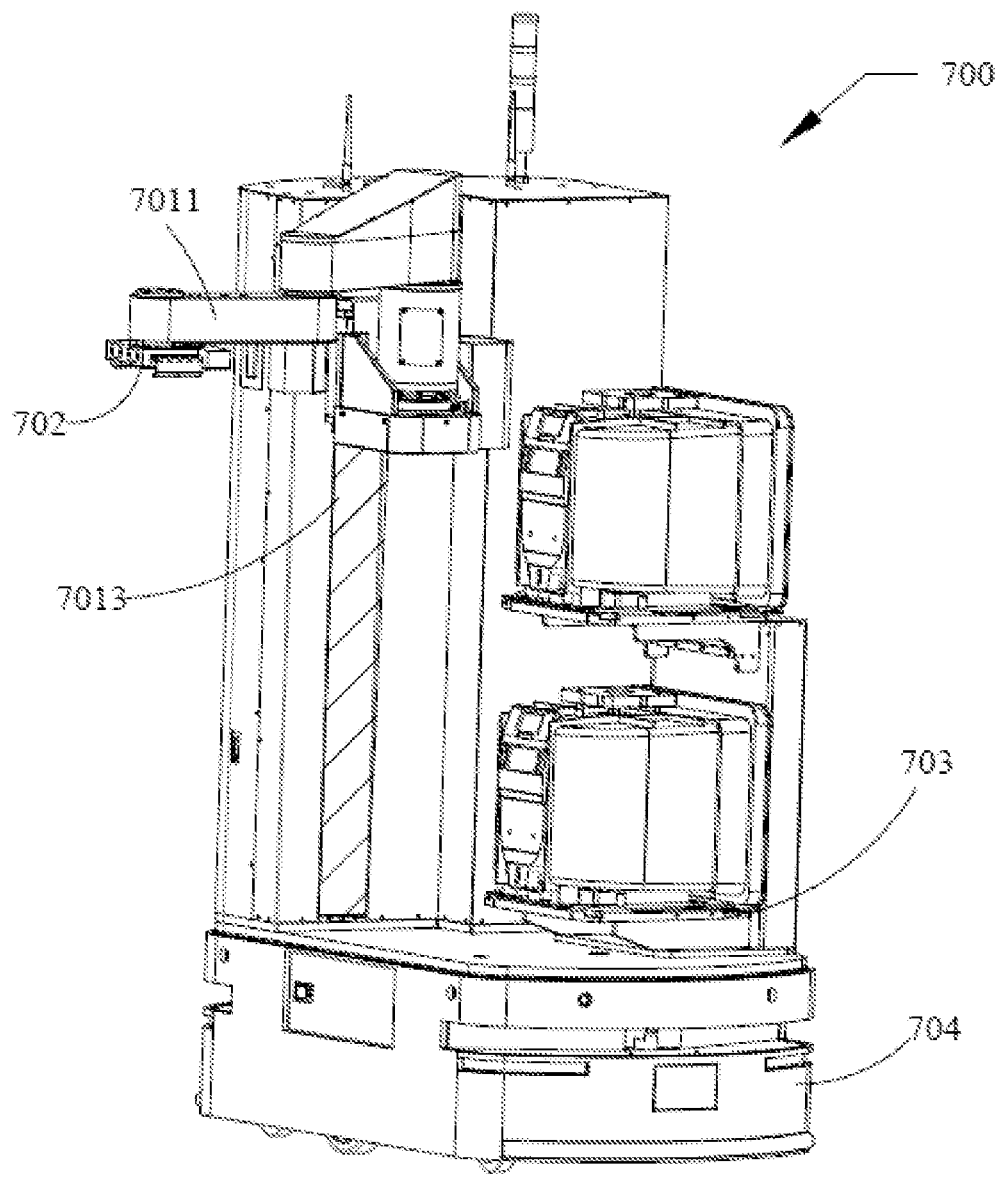
FIG. 29 is a three-dimensional structural schematic diagram of an automatic multi-arm transportation apparatus according to one embodiment of the present invention.
Figure 30:
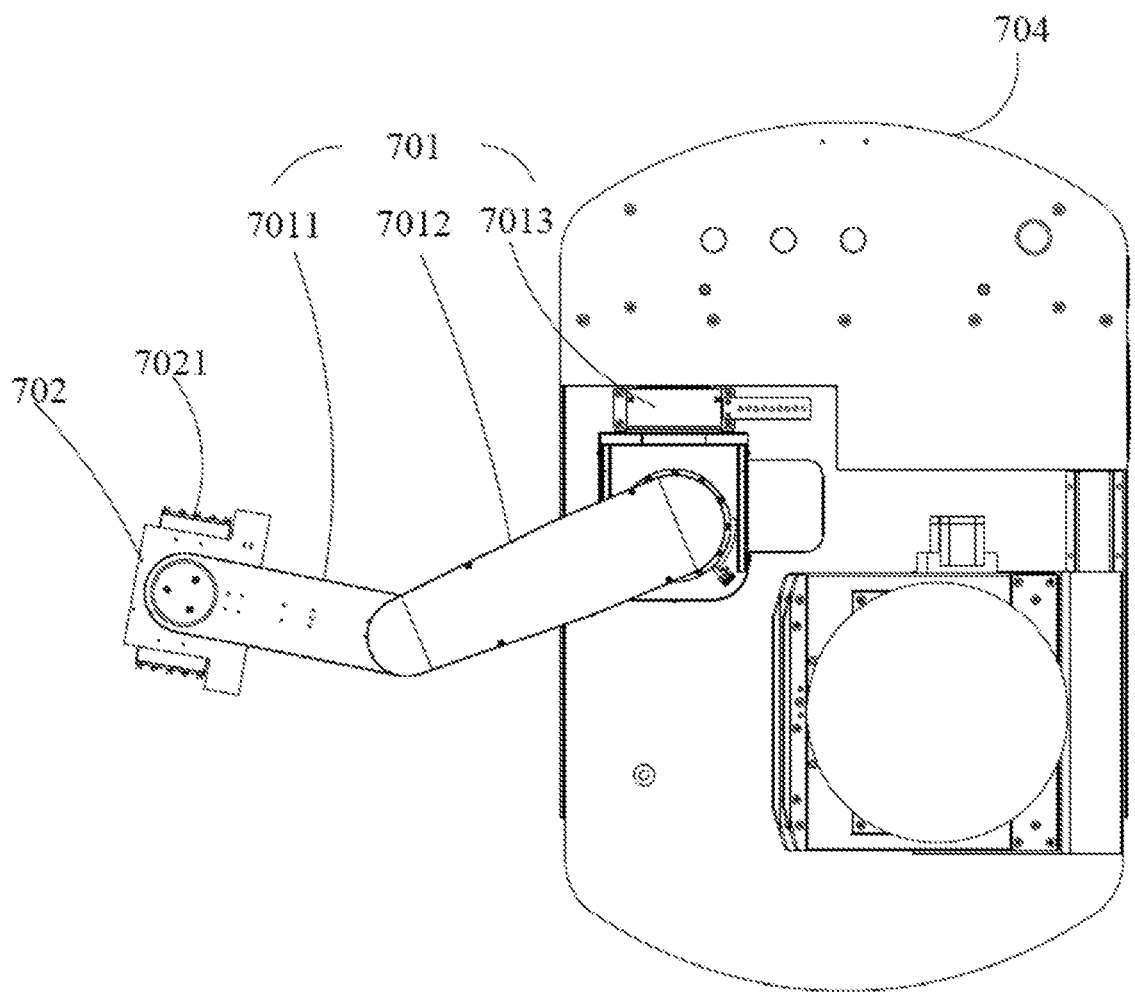
FIG. 30 is a top structural schematic diagram of an automatic multi-arm transportation apparatus of FIG. 29.

Herein, referring to FIG. 29 in combination with FIG. 1 and FIG. 6, the material transportation system is also provided with a controller. As described above, the material storage apparatus 00 is provided with the automatic lifting translation mechanism 03 which can be specifically located on the bottom of the movable storage rack 01. Furthermore, the outer side wall of the material storage apparatus 00 can also be provided with a first side wall sensor. The first side wall sensor herein is configured for detecting whether the automatic transportation apparatus 06 reaches or leaves an external area of the movable storage rack 01, and transmitting the signal to the controller if yes. After receiving the signal of the first side wall sensor, the controller controls the automatic lifting translation mechanism 03 to execute the rising action, so that the movable storage rack 01 can be raised upwardly; and the controller controls the automatic lifting translation mechanism 03 to execute the outward translation action, so that the movable storage rack 01 is transported outwardly onto the automatic transportation apparatus 06 or the movable storage rack 01 can be picked up from the automatic transportation apparatus 06 and sent back into the material storage apparatus 00.

Referring to FIG. 20 in combination with FIG. 19, according to the present embodiment, the outer wall of the material storage apparatus 00 corresponding to the movable storage rack 01 is also provided with an automatic door, and the first side wall sensor is also further arranged on the outer side wall of the material storage apparatus 00 below the automatic door. After detecting that the automatic transportation apparatus 06 reaches the exterior of the movable storage rack 01, the first side wall sensor transmits the signal to the controller, and the controller controls the automatic lifting translation mechanism 03 to execute the rising action while also controlling the automatic door to open. After detecting that the automatic transportation apparatus 06 leaves the material storage apparatus 00, the first side wall sensor transmits the signal to the controller, and the controller controls the automatic lifting translation mechanism 03 to execute the falling action while also controlling the automatic door to close.

The description about the structures of the telescopic mechanism 301, the lifting mechanism and the limiting sensing assemblies L07 of the present embodiment can refer to the above description of FIG. 6 to FIG. 7 and is not repeated herein. Herein, the telescopic mechanism 301 is controlled by the controller to execute the telescopic action. The cooperation relation of the telescopic mechanism 301, the lifting mechanism and the limiting sensing assemblies L07 of the present embodiment in the transportation process is described in detail below.

The telescopic mechanism 301 and the lifting mechanism are controlled by the controller to perform the corresponding action. The telescopic mechanism 301 is controlled by the controller to perform the extending action or retracting action. The lifting mechanism is controlled by the controller to execute the rising action or falling action.

It should be noted that in the transportation system of the present embodiment, a plurality of limiting sensing assemblies L07 are not only configured for limiting an extension distance or retraction distance of the telescopic mechanism 301 but also can judge whether the telescopic mechanism 301 is extended or retracted in place, and transmit the signal to the controller, and then the controller controls the lifting mechanism to perform the rising action or falling action. Furthermore, referring to FIG. 22 in combination with FIG. 12, FIG. 13 and FIG. 1, the route adopted in the process that the movable storage rack 01 is sent out or in by the automatic lifting translation mechanism 03 can be set according to the practical requirement. According to the present embodiment, the top of the telescopic mechanism 301 is provided with a supporting layer 303 for supporting the movable storage rack 01. Preferably, referring to FIG. 22, in the process that the movable storage rack 01 is sent out or in by the automatic lifting translation mechanism 03, the supporting layer 303 can go through four positions. A rectangular heavy line with an arrow in FIG. 22 indicates the moving route of the supporting layer 303. The first position D1 is an original position of the supporting layer 303. The second position D2 is a position that the supporting layer 303 reaches above the original position. The third position D3 is a position that the supporting layer 303 reaches above the top of the automatic transportation apparatus 06. The fourth position D4 is a position that the supporting layer 303 reaches below the top of the automatic transportation apparatus 06. The above four positions are four inevitable positions of the supporting layer 303, and the four positions form a loop route. It should be noted that the direction of the route through which the automatic lifting translation mechanism 03 sends out the movable storage rack 01 is opposite to the direction of the route through which the automatic lifting translation mechanism 03 sends in the movable storage rack 01.

Figure 22:
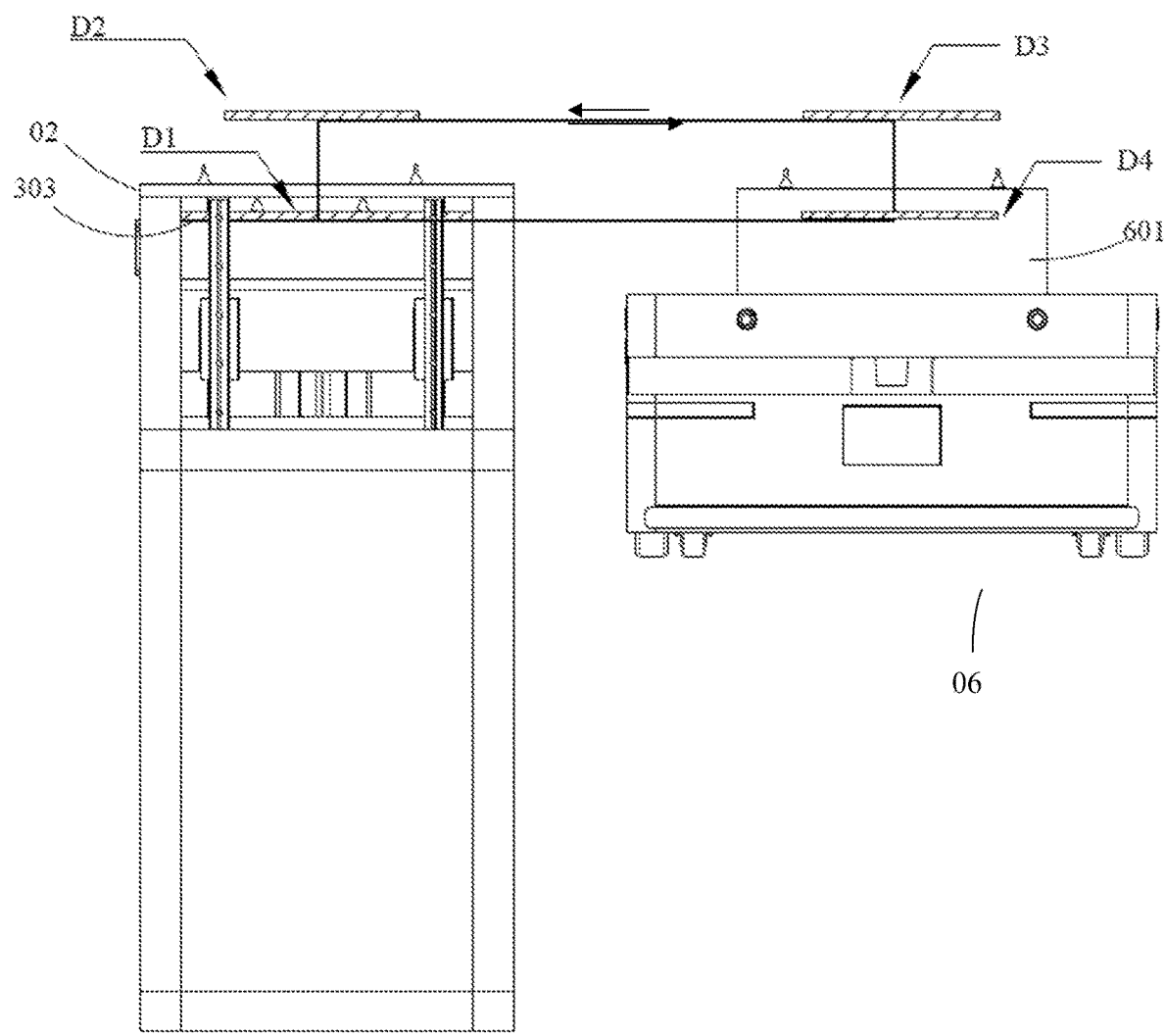
FIG. 22 is a schematic diagram of a supporting layer going through four positions according to one embodiment of the present invention.

Referring to FIG. 22 and FIG. 14, the process in which the movable storage rack 01 is transported by the automatic transportation apparatus 06 between the material storage apparatuses 00 can include:

A, the automatic transportation apparatus 06 arrives in front of the material storage apparatus 00;
B, the automatic door is opened; C, the movable storage rack 01 is moved into the material storage apparatus 00 through the automatic lifting translation mechanism 03; D, the automatic door is closed; and E, herein, a handling manipulator in the material storage apparatus 00 also picks up and takes out a material box in the first storage receiving chamber Q1 in the material storage apparatus 00 and places the material box into the second storage receiving chamber Q2. The subsequent step is that the automatic transportation apparatus 06 picks up the movable storage rack 01 with the material box and can specifically include: F, the automatic transportation apparatus 06 arrives in front of the automatic door, and the automatic door is opened; G, the movable storage rack 01 with the material box is sent out and placed onto the automatic transportation apparatus 06 through the automatic lifting translation mechanism 03; H, the automatic door is closed; and I, the movable storage rack 01 with the material box is placed into other material storage apparatuses 00 through the automatic transportation apparatus 06. It should be noted that the above description is one embodiment of the material transportation and is not intended to limit the protection scope of the present invention.

Referring to FIG. 23 in combination with FIG. 28, FIG. 22, FIG. 12, FIG. 6 and FIG. 1, the step that the movable storage rack 01 is transported from the material storage apparatus 00 in the material transportation process of the present embodiment is described in detail.

In the present embodiment, before the movable storage rack 01 with the material box is taken out, the process can include the empty movable storage rack 01 is disposed into the material storage apparatus 00, which specifically includes:

The first side wall sensor detects whether the automatic transportation apparatus 06 reaches the external area of the movable storage rack 01, and transmits the signal to the controller if yes. After receiving the signal of the first side wall sensor, the controller controls the automatic door to open and controls the telescopic mechanism 301 to execute the extending action, and the supporting layer 303 reaches the fourth position D4 from the first position D1.

The limiting sensing assemblies L07 judge whether the telescopic mechanism 301 is extended in place, and transmit the signal to the controller if yes.

The controller controls the lifting mechanism to execute the rising action; the supporting layer 303 reaches the third position D3 from the fourth position D4. In the process that the supporting layer 303 reaches the third position D3 from the fourth position D4, the supporting layer 303 contacts the bottom of the movable storage rack 01 and jacks up the movable storage rack 01 to continuously move up to the third position D3.

The controller controls the telescopic mechanism 301 to perform the retracting action, and the supporting layer 303 reaches the second position D2 from the third position D3.

The limiting sensing assemblies L07 judge whether the telescopic mechanism 301 is retracted in place, and transmit the signal to the controller if yes.

The process can also include the first side wall sensor detects whether the automatic transportation apparatus 06 leaves the material storage apparatus 00, and transmits the signal to the controller if yes.

The controller controls the automatic door to close and controls the lifting mechanism to execute the falling action, and the supporting layer 303 reaches the first position D1 from the second position D2. Herein, since the automatic lifting translation mechanism 03 is nested in the fixed supporting body 02, in the process that the controller controls the lifting mechanism to execute the falling action, i.e. the supporting layer 303 reaches the first position D1 from the second position D2, the bottom of the movable storage rack 01 contacts and is supported by the top of the fixed supporting body 02, and the supporting layer 303 is separated from the bottom of the movable storage rack 01 to move downwardly to the first position.

After the empty movable storage rack 01 is disposed in the material storage apparatus 00, the controller can also control a handling manipulator inside the material storage apparatus 00 to pick up the material box from the first storage receiving chamber Q1 and places into the empty second storage receiving chamber Q2 until the movable storage rack 00 is fully filled with the material boxes, and then controls the handling manipulator to stop handling.

Figure 24:
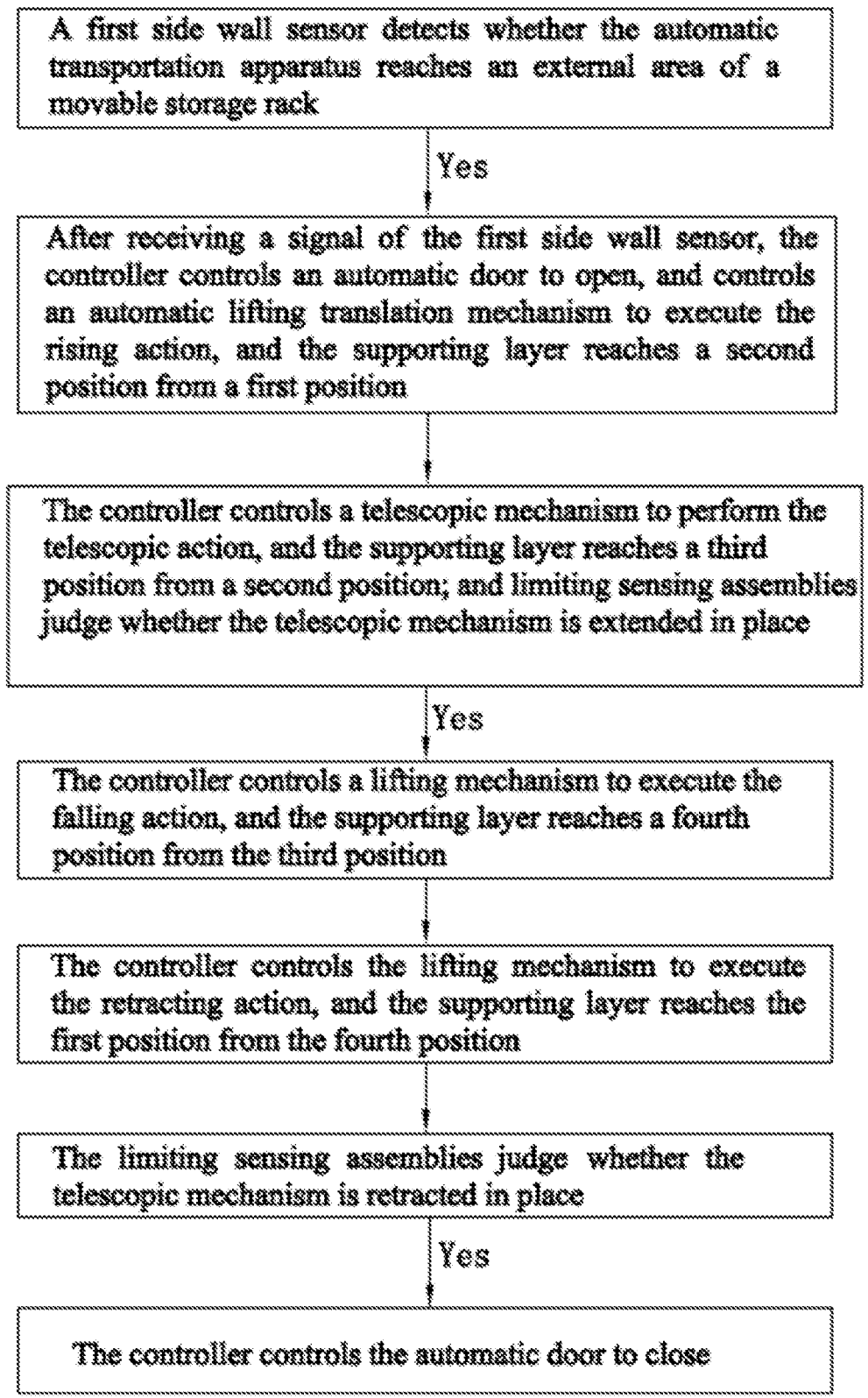
FIG. 24 is a flow diagram of transporting a movable storage rack from a material storage apparatus according to one embodiment of the present invention.
Figure 25:
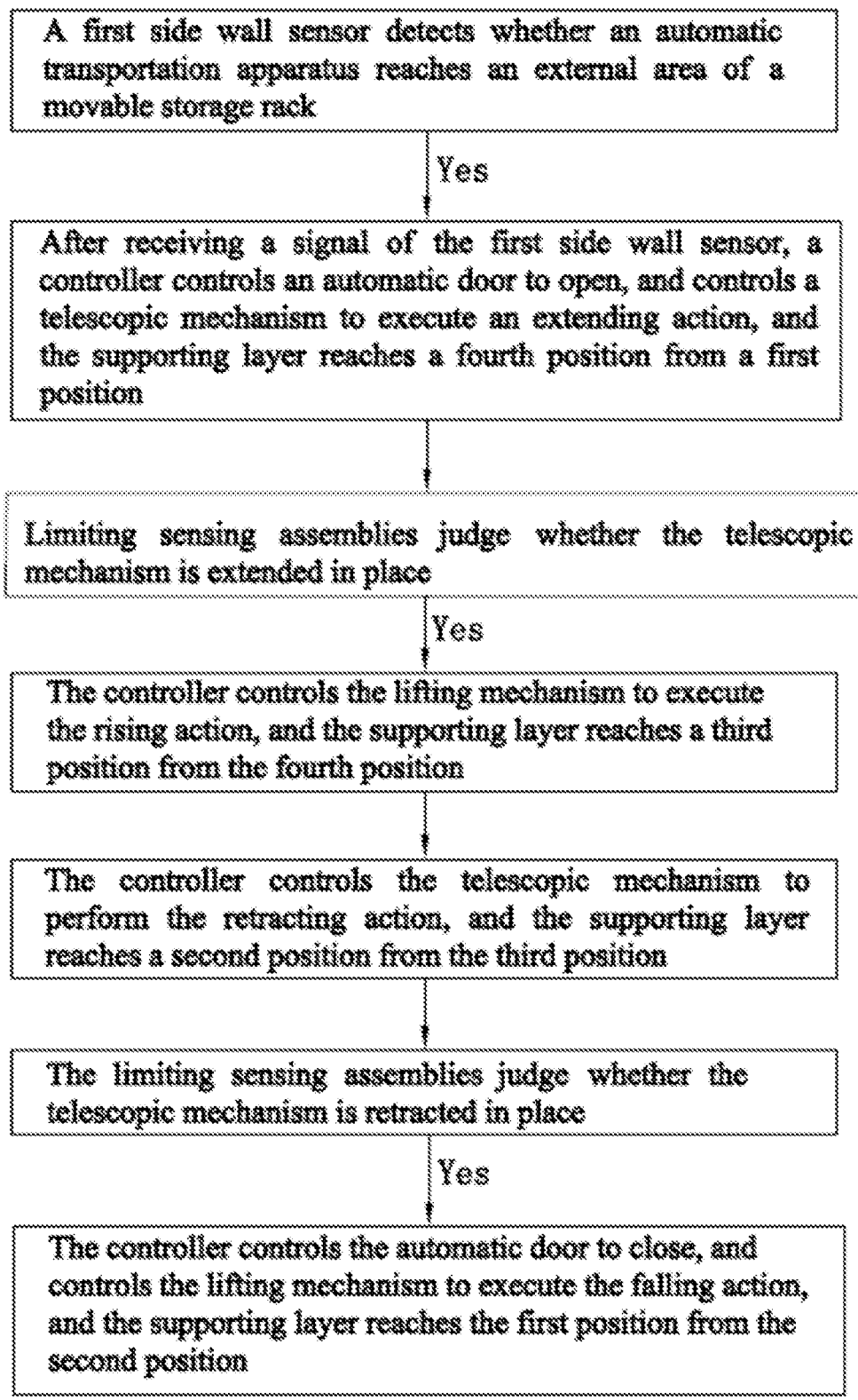
FIG. 25 is a flow diagram of transporting a movable storage rack with a material box into a material storage apparatus according to one embodiment of the present invention.

Referring to FIG. 24 in combination with FIG. 28, FIG. 22, FIG. 12, FIG. 6 and FIG. 1, the process that the movable storage rack 01 is transported from the material storage apparatus 00 in the material transportation process of the present embodiment is described in detail. The process the movable storage rack 01 with the material box is sent out by the automatic lifting translation mechanism 03 in the present embodiment can include:

The first side wall sensor detects whether the automatic transportation apparatus 06 reaches the external area of the movable storage rack 01, and transmits the signal to the controller if yes.

After receiving the signal of the first side wall sensor, the controller controls the automatic door to open and controls the automatic lifting translation mechanism 03 to execute the rising action, and the supporting layer reaches the second position D2 from the first position D1. Herein, since the automatic lifting translation mechanism 03 is nested in the fixed supporting body 02, the lifting mechanism is controlled by the controller to execute the rising action, i.e. the supporting layer 303 reaches the second position D2 from the first position D1, the supporting layer 303 contacts the bottom of the movable storage rack 01 and jacks up the movable storage rack, and the supporting layer 303 supports the movable storage rack 01 to move up to the second position D2.

The controller controls the telescopic mechanism 301 to perform the extending action. The supporting layer 303 reaches the third position D3 from the second position D2. The limiting sensing assemblies L07 judge whether the telescopic mechanism 301 is extended in place, and transmit the signal to the controller if yes.

The controller controls the lifting mechanism to execute the falling action. The supporting layer 303 reaches the fourth position D4 from the third position D3. In the process that the supporting layer 303 reaches the fourth position D4 from the third position D3, the movable storage rack 01 is supported after contacting the top of the automatic transportation apparatus 06, and the supporting layer 303 is separated from the movable storage rack 01 to move downwardly to the fourth position D4.

The controller controls the telescopic mechanism 301 to execute the retracting action, and the supporting layer 303 reaches the first position D1 from the fourth position D4.

The limiting sensing assemblies L07 judge whether the telescopic mechanism 301 is retracted in place, and transmit the signal to the controller if yes; the process can also include the first side wall sensor detects whether the automatic transportation apparatus 06 leaves the material storage apparatus 00, and transmits the signal to the controller if yes.

The controller controls the automatic door to close. It should be noted that the controller can execute the subsequent operation according to the signal of the limiting sensing assemblies L07 and according to the practical needs, for example, controlling the automatic door to close or controlling the automatic lifting translation mechanism 03 to perform the subsequent action. Correspondingly, referring to FIG. 25 in combination with FIG. 28, FIG. 22, FIG. 12, FIG. 6 and FIG. 1, the process that the movable storage rack 01 sent back by the automatic lifting translation mechanism 03 is described in detail below, which can include:

The first side wall sensor detects whether the automatic transportation apparatus 06 reaches the external area of the movable storage rack 01, and transmits the signal to the controller if yes. After receiving the signal of the first side wall sensor, the controller controls the automatic door to open and controls the telescopic mechanism 301 to execute the extending action, and the supporting layer 303 reaches the fourth position D4 from the first position D1.

The limiting sensing assemblies L07 judge whether the telescopic mechanism 301 is extended in place, and transmit the signal to the controller if yes.

The controller controls the lifting mechanism to execute the rising action; the supporting layer 303 reaches the third position D3 from the fourth position D4; in the process that the supporting layer 303 reaches the third position D3 from the fourth position D4, the supporting layer 303 contacts the bottom of the movable storage rack 01 and jacks up the movable storage rack 01 to continuously move up to the third position D3.

The controller controls the telescopic mechanism 301 to perform the retracting action, and the supporting layer 303 reaches the second position D2 from the third position D3;

The limiting sensing assemblies L07 judge whether the telescopic mechanism 301 is retracted in place, and transmit the signal to the controller if yes.

The process can also include the first side wall sensor detects whether the automatic transportation apparatus 06 leaves the material storage apparatus 00, and transmits the signal to the controller if yes.

The controller controls the automatic door to close and controls the lifting mechanism to execute the falling action, and the supporting layer 303 reaches the first position D1 from the second position D2. Herein, since the automatic lifting translation mechanism 03 is nested in the fixed supporting body 02, in the process that the controller controls the lifting mechanism to execute the falling action, i.e. the supporting layer 303 reaches the first position D1 from the second position D2, the bottom of the movable storage rack 01 contacts and is supported by a top plate on the top of the fixed supporting body 02, and the supporting layer 303 is separated from the bottom of the movable storage rack 01 to move downwardly to the first position D1.

Then, the controller can control the handling manipulator in the material storage apparatus 00 to pickup the material box from the second storage receiving chamber Q2 in the movable storage rack 01 and places into the first storage receiving chamber Q1 until the material boxes in the movable storage rack 01 are completely picked. The empty movable storage rack 01 can also be sent out onto the automatic transportation apparatus 06 from the material storage apparatus 00 and sent into other material storage apparatuses 00.

Furthermore, in order to avoid the problem whether the movable storage rack 01 exists on the automatic transportation apparatus 06 before the automatic lifting translation mechanism 03 sends out the movable storage rack 01 or sends in the movable storage rack 01, in the present embodiment, the top of the automatic transportation apparatus 06 is also provided with a top sensor configured for detecting whether the top of the automatic transportation apparatus 06 is empty. Moreover, a detection result can be fed back to the controller, and the controller can control the automatic lifting translation mechanism 03 to start running according to the feedback result.

Figure 26:
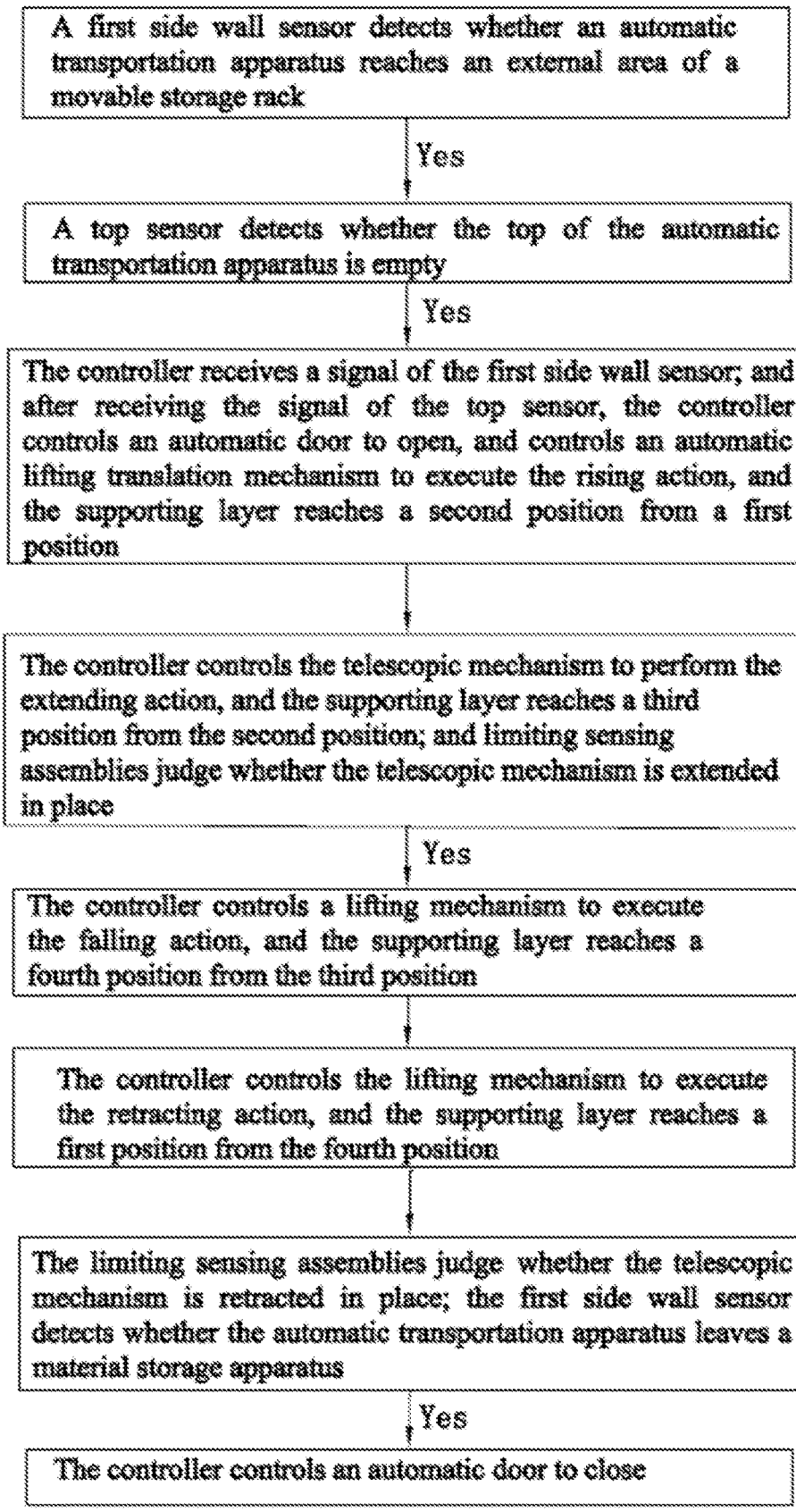
FIG. 26 is a flow diagram of transporting a movable storage rack from a material storage apparatus according to one embodiment of the present invention.
Figure 27:
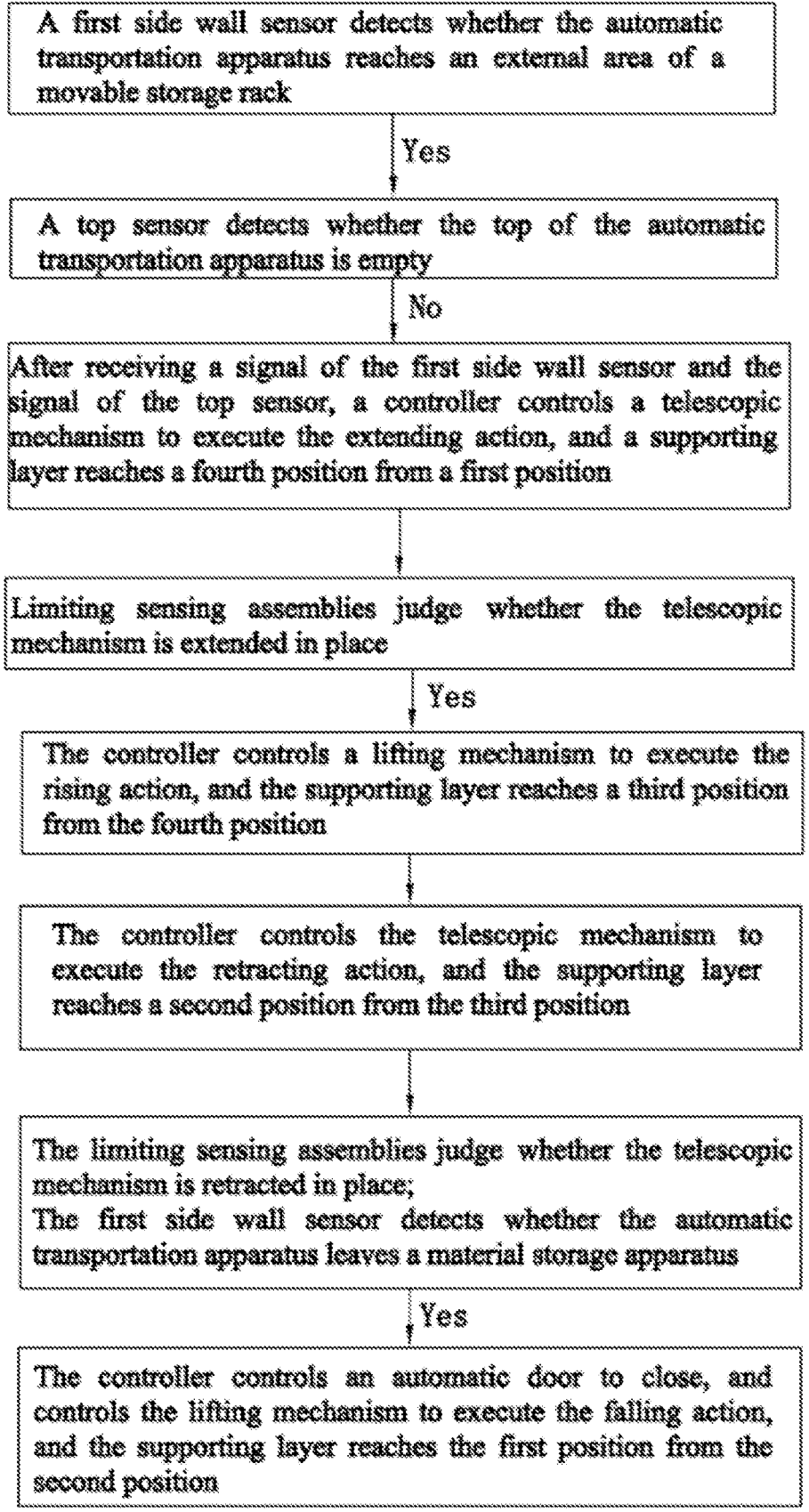
FIG. 27 is a flow diagram of transporting a movable storage rack with a material box into a material storage apparatus according to one embodiment of the present invention.

In this way, in the present embodiment, referring to FIG. 26 in combination with FIG. 28, FIG. 22, FIG. 12, FIG. 6 and FIG. 1, the process that the movable storage rack 01 is sent out by the automatic lifting translation mechanism 03 can also include:

The first side wall sensor detects whether the automatic transportation apparatus 06 reaches the external area of the movable storage rack 01, and transmits the signal to the controller if yes. Before the automatic lifting translation mechanism begins to send out the movable storage rack 01, the top sensor detects that the top of the automatic transportation apparatus 06 is empty, and transmits the signal to the controller.

After receiving the signal of the first side wall sensor and receiving the signal of the top sensor, the controller controls the automatic door to open and controls the automatic lifting translation mechanism 03 to execute the rising action, and the supporting layer 303 reaches the second position D2 from the first position D1. Herein, since the automatic lifting translation mechanism 03 is nested in the fixed supporting body 02, the lifting mechanism is controlled by the controller to execute the rising action. That is, in the process that the supporting layer 303 reaches the second position D2 from the first position D1, the supporting layer 303 contacts the bottom of the movable storage rack 01 and jacks up the movable storage rack, and the supporting layer 303 supports the movable storage rack 01 to move up to the second position D2.

The controller controls the telescopic mechanism 301 to perform the extending action. The supporting layer 303 reaches the third position D3 from the second position D2. The limiting sensing assemblies L07 judge whether the telescopic mechanism 301 is extended in place, and transmit the signal to the controller if yes.

The controller controls the lifting mechanism to execute the falling action. The supporting layer 303 reaches the fourth position D4 from the third position D3. In the process that the supporting layer 303 reaches the fourth position D4 from the third position D3, the movable storage rack 01 is supported after contacting the top of the automatic transportation apparatus 06, and the supporting layer 303 is separated from the movable storage rack 01 to move downwardly to the fourth position D4.

The controller controls the telescopic mechanism 301 to execute the retracting action, and the supporting layer 303 reaches the first position D1 from the fourth position D4.

The limiting sensing assemblies L07 judge whether the telescopic mechanism 301 is retracted in place, and transmit the signal to the controller if yes. Moreover, the first side wall sensor detects whether the automatic transportation apparatus 06 leaves the material storage apparatus 00, and transmits the signal to the controller if yes.

The controller controls the automatic door to close. It should be noted that the controller can execute the subsequent operation according to the signal of the limiting sensing assemblies L07 and according to the practical requirements, for example, controlling the automatic door to close or controlling the automatic lifting translation mechanism 03 to perform the subsequent action. Correspondingly, referring to FIG. 27 in combination with FIG. 28, FIG. 22, FIG. 12, FIG. 6 and FIG. 1, the process that the movable storage rack 01 is sent back by the automatic lifting translation mechanism 03 can also include:

The first side wall sensor detects whether the automatic transportation apparatus 06 reaches the external area of the movable storage rack 01, and transmits the signal to the controller if yes. Before the automatic lifting translation mechanism 03 begins to send back the movable storage rack 01, the top sensor detects that the top of the automatic transportation apparatus is not empty, and transmits the signal to the controller.

After receiving the signal of the first side wall sensor and receiving the signal of the top sensor, the controller controls the telescopic mechanism 301 to execute the extending action, and the supporting layer 303 reaches the fourth position D4 from the first position D1.

The limiting sensing assemblies L07 judge whether the telescopic mechanism 301 is extended in place, and transmit the signal to the controller if yes.

The controller controls the lifting mechanism to execute the rising action; the supporting layer 303 reaches the third position D3 from the fourth position D4; in the process that the supporting layer 303 reaches the third position D3 from the fourth position D4, the supporting layer 303 contacts the bottom of the movable storage rack 01 and jacks up the movable storage rack 01 to continuously move up to the third position D3.

The controller controls the telescopic mechanism 301 to perform the retracting action, and the supporting layer 303 reaches the second position D2 from the third position D3.

The limiting sensing assemblies L07 judge whether the telescopic mechanism 301 is retracted in place, and transmit the signal to the controller if yes.

The process can also include the first side wall sensor detects whether the automatic transportation apparatus 06 leaves the material storage apparatus 00, and transmits the signal to the controller if yes.

The controller controls the automatic door to close and controls the lifting mechanism to execute the falling action, and the supporting layer 303 reaches the first position D1 from the second position D2. Herein, since the automatic lifting translation mechanism 01 is nested in the fixed supporting body 02, in the process that the controller controls the lifting mechanism to execute the falling action, i.e. in the process that the supporting layer 303 reaches the first position D1 from the second position D2, the bottom of the movable storage rack 01 contacts and is supported by the top of the fixed supporting body 02, and the supporting layer 303 is separated from the bottom of the movable storage rack 01 to move downwardly to the first position D1. Furthermore, referring to FIG. 29 in combination with FIG. 1, since the material storage apparatus 00 of the present embodiment is also provided with the third storage receiving chamber Q3, and the third storage receiving chamber Q3 is configured for transporting the material box to the process chamber or receiving the material box transported from the processing equipment, the material transportation system of the present embodiment can also include an automatic multi-arm transportation apparatus 700. The automatic multi-arm transportation apparatus 700 can move freely along any route in any direction. Herein, the automatic multi-arm transportation apparatus 700 is configured for picking up and transporting the material box in the material storage apparatus to the process chamber or picking up and transporting the material box of the process chamber into the material storage apparatus 00. Specifically, in combination with FIG. 29 and FIG. 30, the automatic multi-arm transportation apparatus 700 can include a plurality of mechanical arms 701, grippers 702, a plurality of carrier tables 703 for carrying the material boxes and an automatic transportation table 704 located on the bottoms of the plurality of mechanical arms 701. The automatic transportation table 704 is configured for realizing the free movement of the automatic multi-arm transportation apparatus 700, and the automatic transportation table 704 carries carrier tables 703. The carrier tables 703 can be vertically distributed, and the grippers 702 are configured for clamping the material boxes. The material boxes are picked and placed by means of the multi-axis independent movement of the plurality of mechanical arms 701. The entire automatic multi-arm transportation apparatus 700 is driven to move by virtue of the movement of the automatic transportation table 704.

Herein, the plurality of mechanical arms 701 are connected through a movable shaft and include a vertical lifting arm 7013 and horizontal rotating arms 7011 and 7012. The vertical lifting arm 7013 is fixed on the automatic transportation table 704, and one horizontal rotating arm 7012 is movable connected onto the vertical lifting arm 7013 and moves along the vertical lifting arm 7013 to realize the up-down movement. The horizontal rotating arms 7011 and 7012 are movably connected. Each of the horizontal rotating arms 7011 and 7012 rotates in a horizontal plane, and the rotation movement of each of the horizontal rotating arms does not interfere with each other, so that the multi-arm manipulator of four-axis, six-axis and the like can pick up or place the material in any direction. The grippers 702 are provided with a driving motor and a plurality of movable clamping pieces 7021. For example, two movable clamping pieces are oppositely arranged. The driving motor drives the movable clamping pieces 7021 to change in distance, so that the movable clamping pieces 7021 can correspondingly adjust the clamping distance.

Figure 31:
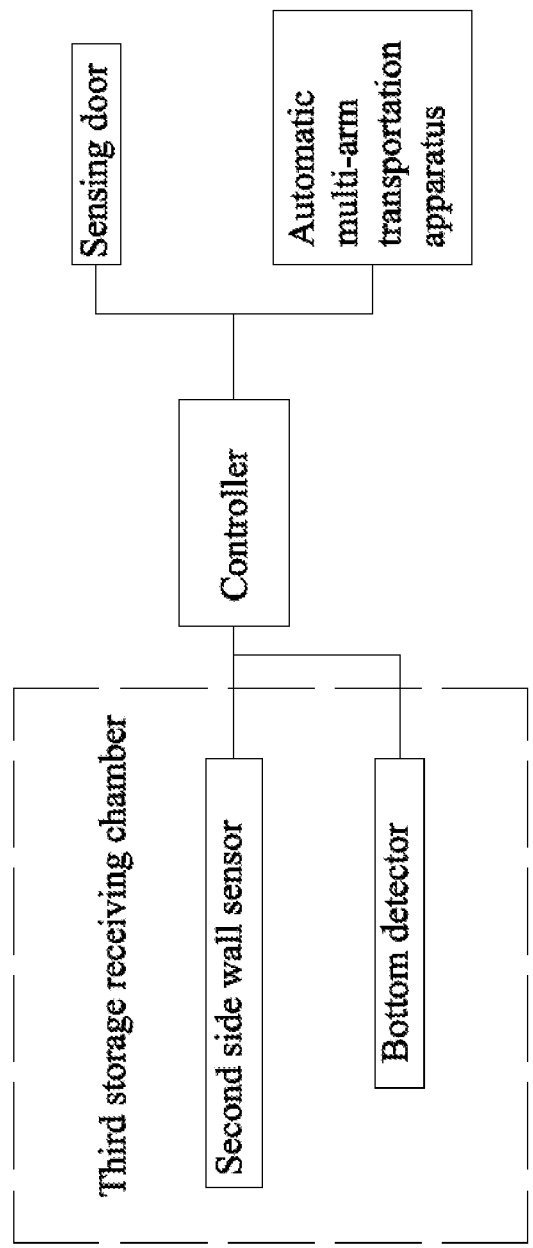
FIG. 31 is a block diagram of a material transportation system part with an automatic multi-arm transportation apparatus according to one embodiment of the present invention.

Referring to FIG. 31 in combination with FIG. 29 and FIG. 1, the side wall of the material storage apparatus 00 corresponding to the third storage receiving chamber Q3 is provided with a sensing door. The bottom of the third storage receiving chamber Q3 is provided with a bottom sensor. The bottom sensor is configured for detecting whether the third storage receiving chamber Q3 has a material box and feeds back a detection result to the controller, and the controller controls the sensing door to open or close according to the feedback result.

Furthermore, the side wall of the material storage apparatus 00 below the third storage receiving chamber Q3 can also be provided with a second side wall sensor; and the second side wall sensor is configured for detecting whether the automatic multi-arm transportation apparatus 700 is located outside the third storage receiving chamber Q3. The controller controls the sensing door to open or close according to a detection result. Specifically, the second side wall sensor detects whether the automatic multi-arm transportation apparatus 700 reaches the outside of the third storage receiving chamber Q3 and transmits the signal to the controller if yes. The controller can control the sensing door to open. The second side wall sensor is also configured for detecting whether the automatic multi-arm transportation apparatus 700 leaves the outside of the third storage receiving chamber Q3 and transmits the signal to the controller if yes, and the controller can control the sensing door to close.

Figure 32:
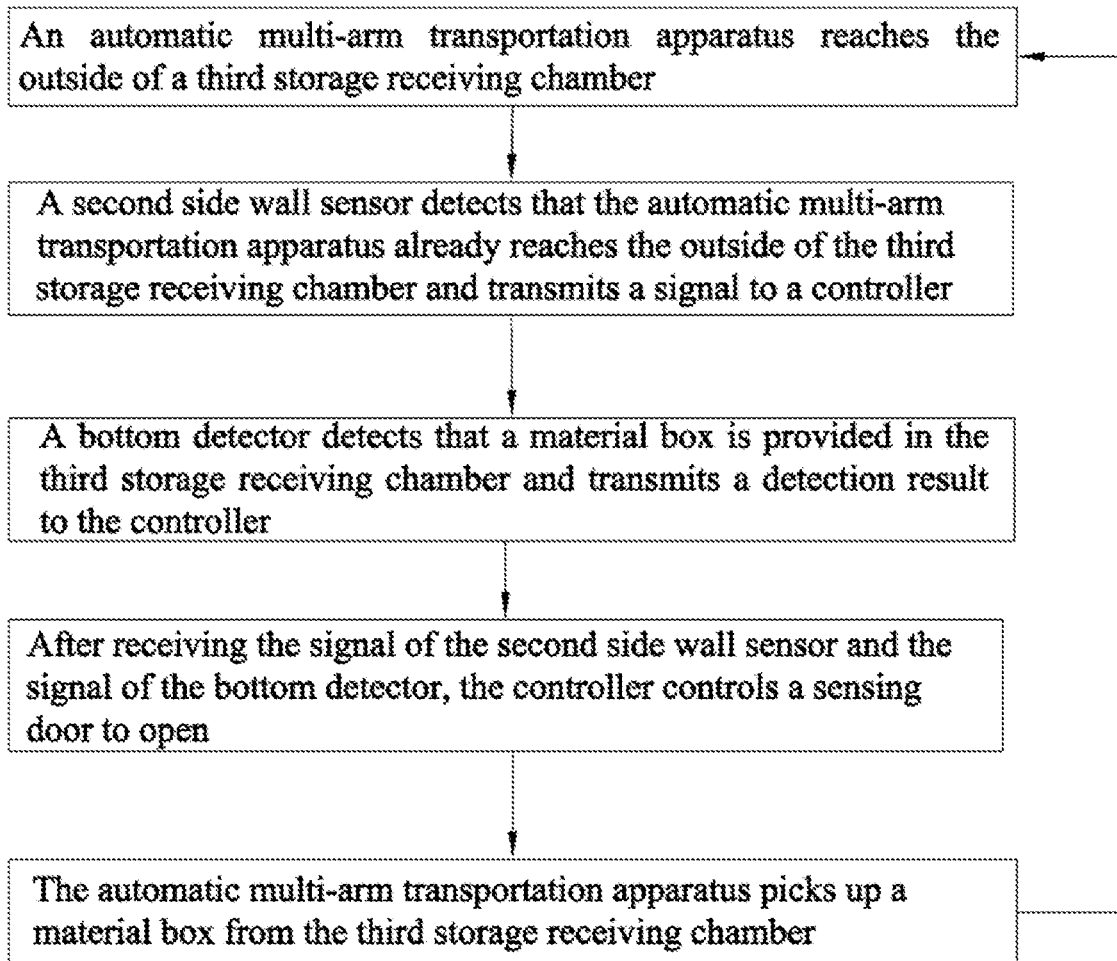
FIG. 32 is a flow diagram of picking up and transporting materials from a third storage receiving chamber by an automatic multi-arm transportation apparatus according to one embodiment of the present invention.

In the present embodiment, referring to FIG. 32 in combination with FIG. 1, the process that the automatic multi-arm transportation apparatus 700 picks up and transports the material from the third storage receiving chamber Q3 is described with an example below, which can include but not limit to the following process.

The automatic multi-arm transportation apparatus 700 reaches the outside of one third storage receiving chamber Q3.

The second side wall sensor detects that the automatic multi-arm transportation apparatus 700 already reaches the outside of the third storage receiving chamber Q3 and transmits the signal to the controller.

The bottom detector detects whether the third storage receiving chamber Q3 has the material box and transmits a detection result to the controller.

After receiving the signal of the second side wall sensor and the signal of the bottom detector, the controller controls the sensing door to open.

The automatic multi-arm transportation apparatus 700 picks up the material box from the third storage receiving chamber Q3. Specifically, the mechanical arm 7011 with the grippers 702 of the automatic multi-arm transportation apparatus 700 stretches into the third storage receiving chamber Q3. Before stretching into the third storage receiving chamber, the automatic multi-arm transportation apparatus 700 controls the horizontal rotating arm 7012 to perform the lifting operation along the vertical lifting arm 7013 so as to adjust the height of the horizontal rotating arm 7011 with the grippers 702 and control the plurality of horizontal rotating arms 7011 and 7012 to perform the rotating operation so as to adjust the angle of the horizontal rotating arm 7011 with the grippers 702. Therefore, the horizontal rotating arm 7011 with the grippers 702 can vertically enter the third storage receiving chamber Q3 and can be accurately positioned above the material box in the third storage receiving chamber Q3. Moreover, after picking up the material box, the horizontal rotating arm 7011 with the grippers 702 can be vertically withdrawn from the third storage receiving chamber Q3.

After one material box is picked up, the above process can be repeated to pick up the next material box. It should be noted that the automatic multi-arm transportation apparatus 700 is provided with a plurality of carrier tables 703, so that a plurality of material boxes can be carried. Therefore, a plurality of material boxes can be successively picked up.

The automatic multi-arm transportation apparatus 700 carries the material boxes to move towards a target position. Meanwhile, the second side wall sensor detects that the automatic multi-arm transportation apparatus 700 leaves the material storage apparatus 00 and transmits the signal to the controller. Furthermore, the bottom sensor can also detect that the third storage receiving chamber Q3 does not have the material box and feeds back the detection result to the controller. Specifically, the target position herein can be the processing equipment, so that the automatic multi-arm transportation apparatus 700 can transport the material between the material storage apparatus 00 and the processing equipment.

When receiving the signal transmitted by the second side wall sensor and the signal transmitted by the bottom sensor, the controller controls the sensing door to close.

Figure 33:
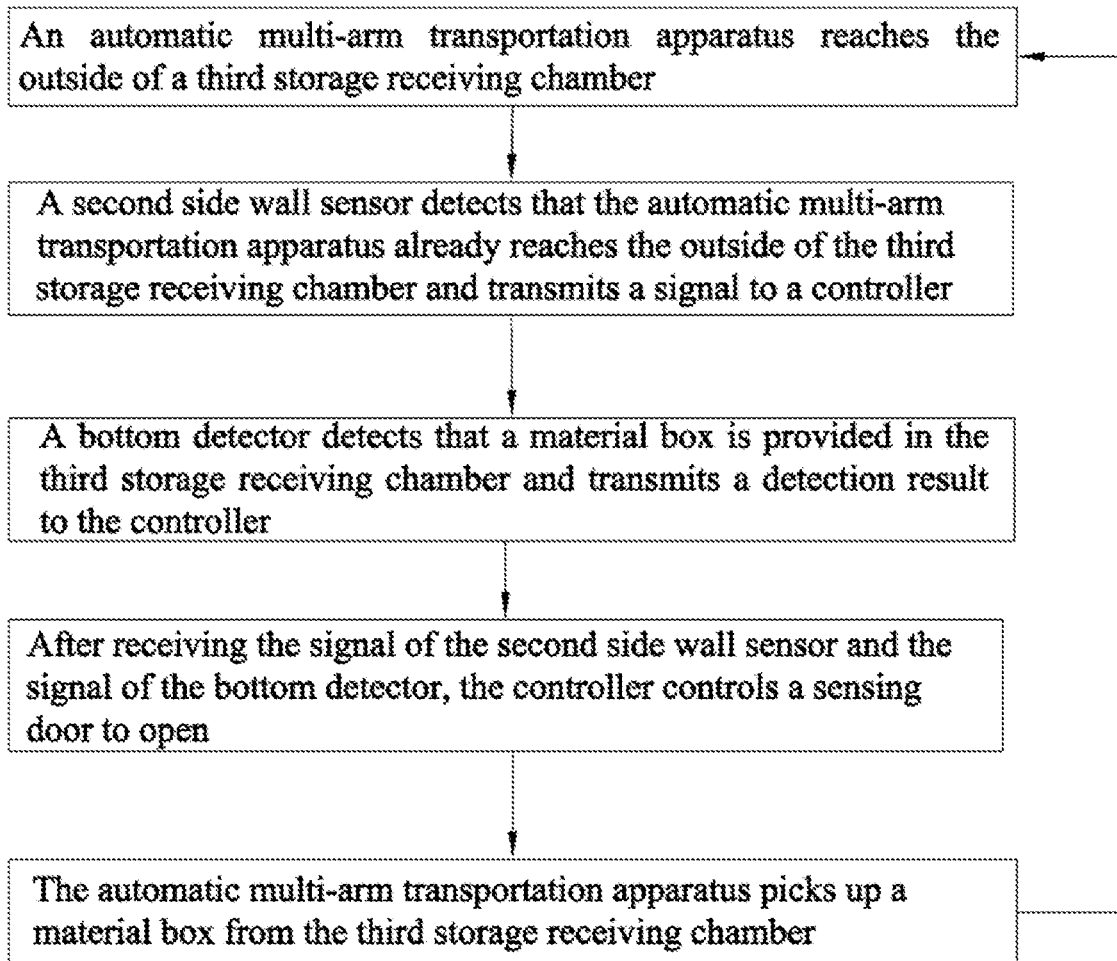
FIG. 33 is a flow diagram of placing and transporting materials to a third storage receiving chamber by an automatic multi-arm transportation apparatus according to one embodiment of the present invention.

In the present embodiment, referring to FIG. 33 in combination with FIG. 1, the process that the automatic multi-arm transportation apparatus 700 places and transports the material into the third storage receiving chamber Q3 is described with an example below, which can include but not limit to the following process.

The automatic multi-arm transportation apparatus 700 reaches the outside of one third storage receiving chamber Q3. Herein, it should be noted that if the material box is transported from the processing equipment, after picking up the material box from the processing equipment, the automatic multi-arm transportation apparatus 700 carries the material box to reach the outside of the third storage receiving chamber Q3.

The second side wall sensor detects that the automatic multi-arm transportation apparatus 700 reaches the outside of the third storage receiving chamber Q3 and transmits the signal to the controller.

The bottom detector detects whether the third storage receiving chamber Q3 has the material box and transmits the detection result to the controller.

After receiving the signal of the second side wall sensor and the signal of the bottom detector, the controller controls the sensing door to open.

The automatic multi-arm transportation apparatus 700 places the material box into the third storage receiving chamber Q3. Specifically, the horizontal rotating arm 7011 with the grippers 702 of the automatic multi-arm transportation apparatus 700 stretches into the carrier table 703 to grab the material box. Before the horizontal rotating arm stretches into the third storage receiving chamber, the automatic multi-arm transportation apparatus 700 controls the horizontal rotating arm 7011 to perform the lifting operation through the vertical lifting arm 7013 so as to adjust the height of the horizontal rotating arm 7011 with the grippers 702 and control the plurality of horizontal rotating arms 7011 and 7012 to perform the rotating operation so as to adjust the angle of the horizontal rotating arm 7011 with the grippers 702. Therefore, the grippers 702 can be accurately positioned above the material box on the carrier table 703 and can accurately grab the material box. Then the horizontal rotating arm 7011 with the grippers 702 of the automatic multi-arm transportation apparatus 700 stretches into the third storage receiving chamber Q3. Before the horizontal rotating arm stretches into the third storage receiving chamber, the automatic multi-arm transportation apparatus 700 controls the horizontal rotating arm 7012 to perform the lifting operation along the vertical lifting arm 7013 so as to adjust the height of the horizontal rotating arm 7011 with the grippers 702 and control a plurality of horizontal rotating arms 7011 and 7012 to perform the rotating operation so as to adjust the angle of the horizontal rotating arm 7011 with the grippers 702. Therefore, the horizontal rotating arm 7011 with the grippers 702 can vertically enter the third storage receiving chamber Q3 and can be accurately positioned above the bottom of the to be-placed material box in the third storage receiving chamber Q3 and can place the material box. Then, the horizontal rotating arm 7011 with the grippers 702 can be vertically withdrawn from the third storage receiving chamber Q3.

After one material box is placed, the above process can be repeated to place the next material box. It should be noted that the automatic multi-arm transportation apparatus 700 is provided with a plurality of carrier tables, so that a plurality of material boxes can be arranged.

The automatic multi-arm transportation apparatus 700 leaves the material storage apparatus 00 to move to the target position. Meanwhile, the second side wall sensor detects that the automatic multi-arm transportation apparatus 700 leaves the material storage apparatus and transmits the signal to the controller. Furthermore, the bottom sensor can also detect that the third storage receiving chamber Q3 has the material box and feeds back the detection result to the controller. Specifically, the target position here can be the processing equipment, so that the automatic multi-arm transportation apparatus 700 can transport the material between the material storage apparatus 00 and the processing equipment.

When receiving the signal transmitted by the second side wall sensor and the signal transmitted by the bottom sensor, the controller controls the sensing door to close.

It should be noted that the process that the automatic multi-arm transportation apparatus 700 picks up and places the material box is examples but not intended to limit the protection scope of the present invention.

Furthermore, in the present embodiment, the method for performing the material transportation by adopting the material transportation system can be described with examples as follows.

Figure 34:
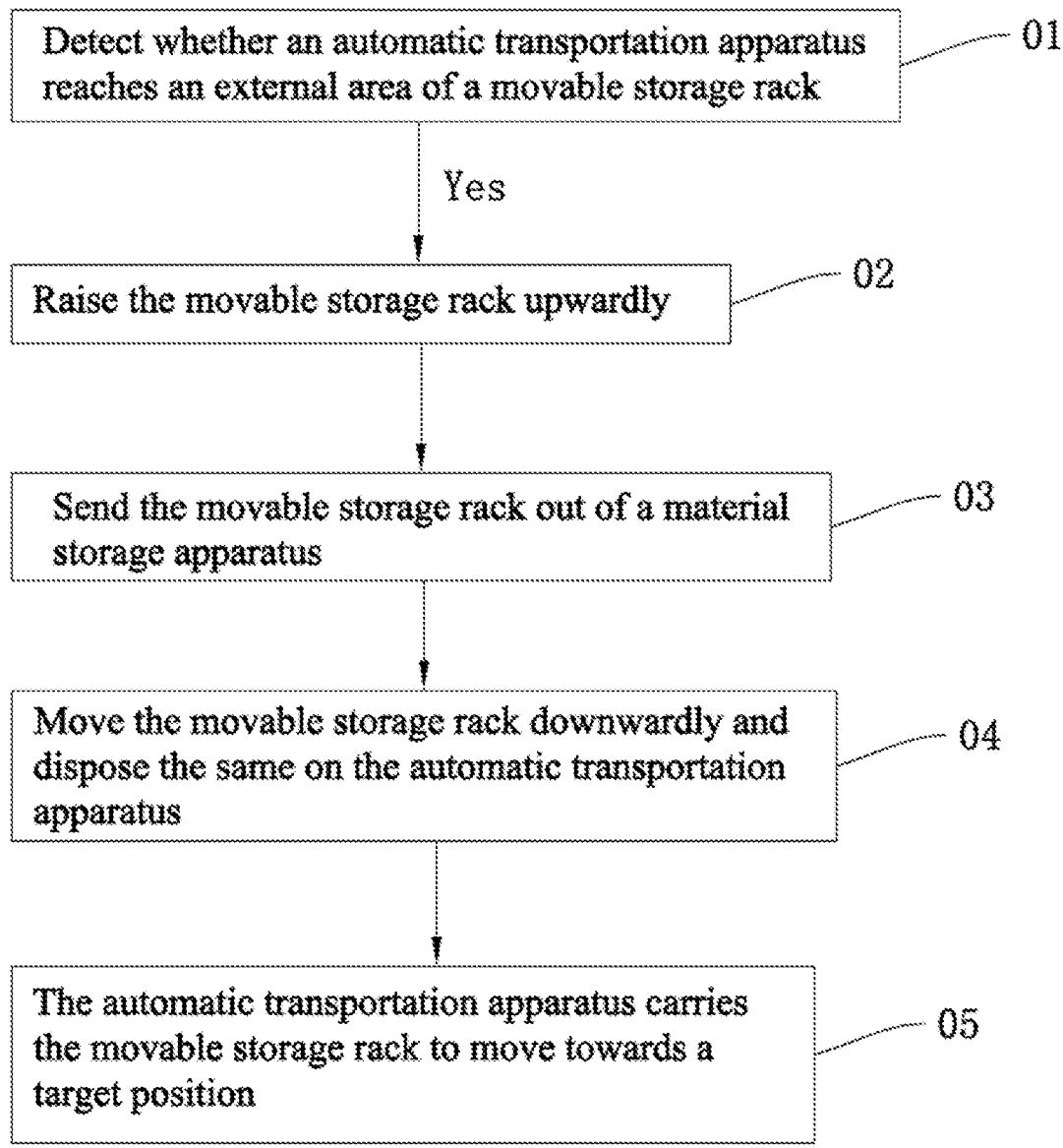
FIG. 34 is a flow diagram of a material transportation method according to one embodiment of the present invention.

For example, referring to FIG. 34, a material transportation method for transporting the movable storage rack in the material storage apparatus to other target positions specifically includes:

Step 01: detecting whether the automatic transportation apparatus reaches an external area of the movable storage rack; and executing step 02 if yes.

The step 01 specifically includes detecting whether the automatic transportation apparatus reaches the external area of the movable storage rack, judging whether the top of the automatic transportation apparatus is empty, and executing the step 02 if both are yes.

Step 02: raising the movable storage rack upwardly.

Specifically, since the bottom of the movable storage rack is also provided with the automatic lifting translation mechanism, the automatic lifting translation mechanism supports the movable storage rack through the supporting layer. The supporting layer can go through four positions. A first position is an original position of the supporting layer; a second position is a position that the supporting layer reaches above the original position; a third position is a position that the supporting layer reaches above the top of the automatic transportation apparatus; and a fourth position is a position that the supporting layer reaches below the top of the automatic transportation apparatus. The side wall of the material storage apparatus of the movable storage rack is also provided with the automatic door. Therefore, in the step 02, the movable storage rack is raised by the automatic lifting translation mechanism from the first position to the second position; and the automatic door can also be opened.

Step 03: sending the movable storage rack out of the material storage apparatus.

Specifically, in the step 03, the automatic lifting translation mechanism moves the movable storage rack outwardly from the second position to the third position.

Step 04: moving the movable storage rack downwardly and disposing the same on the automatic transportation apparatus.

Specifically, in the step 04, the automatic lifting translation mechanism lowers the movable storage rack downwardly. The supporting layer moves from the third position to the fourth position; and in this process, the movable storage rack contacts the top of the automatic transportation apparatus and is supported, and the supporting layer is separated from the movable storage rack to move downwardly to the fourth position.

Step 05: carrying, by the automatic transportation apparatus, the movable storage rack to move towards the target position.

Specifically, the step 05 further includes retracting the automatic lifting translation mechanism, and moving the supporting layer to the first position from the fourth position. In the step 05, the method further includes detecting whether the automatic transportation apparatus leaves the material storage apparatus, and closing the automatic door if yes.

Furthermore, the step 05 can further include judging whether the automatic lifting translation mechanism is retracted in place. In this way, if detecting the automatic transportation apparatus leaves the material storage apparatus and the automatic lifting translation mechanism is retracted in place, closing the automatic door.

Figure 35:
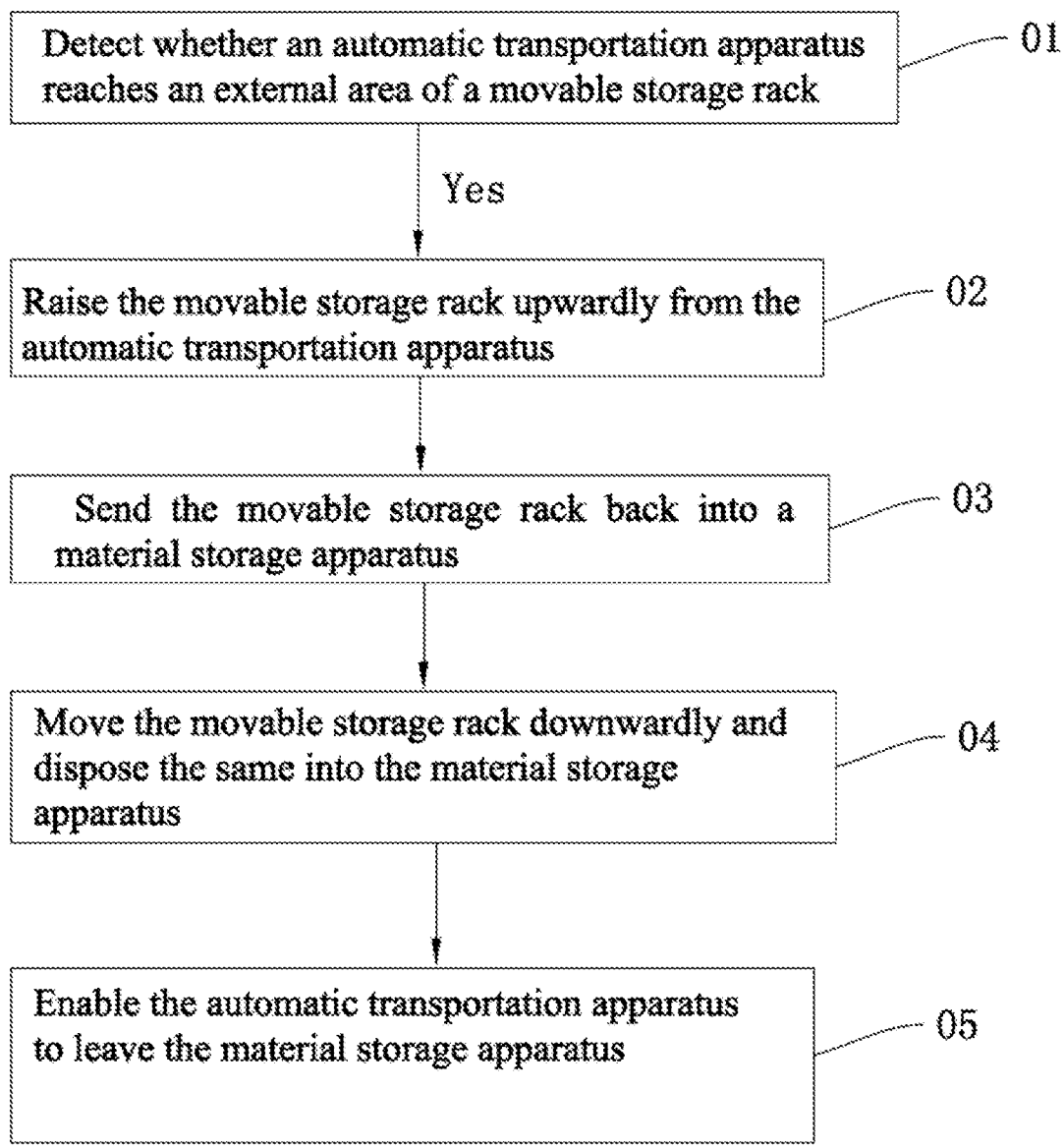
FIG. 35 is a flow diagram of a material transportation method according to one embodiment of the present invention.

For example, referring to FIG. 35, a material transportation method for transporting the movable storage rack on the automatic transportation apparatus into the material storage apparatus specifically includes:

Step 01: detecting whether the automatic transportation apparatus reaches an external area of the movable storage rack; and executing step 02 if yes.

Specifically, detecting whether the automatic transportation apparatus reaches the external area of the movable storage rack, and judging whether the top of the automatic transportation apparatus is empty; and executing the step 02 if both are yes.

Step 02: raising the movable storage rack upwardly from the automatic transportation apparatus. Specifically, since the bottom of the movable storage rack is also provided with the automatic lifting translation mechanism, the automatic lifting translation mechanism supports the movable storage rack through the supporting layer. The supporting layer can go through four positions. A first position is an original position of the supporting layer; a second position is a position that the supporting layer reaches above the original position; a third position is a position that the supporting layer reaches above the top of the automatic transportation apparatus; and a fourth position is a position that the supporting layer reaches below the top of the automatic transportation apparatus. Moreover, the side wall of the material storage apparatus corresponding to the movable storage rack of the present embodiment is also provided with the automatic door. Therefore, the step 02 can specifically include: firstly, the automatic lifting translation mechanism extends outwardly from the first position to the fourth position; secondly, the automatic lifting translation mechanism rises up, and the supporting layer reaches the third position from the fourth position, wherein in the process that the supporting layer reaches the third position from the fourth position, the supporting layer contacts the bottom of the movable storage rack and jacks up the movable storage rack to continuously move up to the third position. Meanwhile, the step 02 can also include the automatic door is opened.

Step 03: sending the movable storage rack back into the material storage apparatus.

Specifically, the automatic lifting translation mechanism sends the movable storage rack back to the material storage apparatus, and the supporting layer moves from the third position to the second position.

Furthermore, the step 03 can further include judging whether the automatic lifting translation mechanism is retracted in place; and executing the step 04 if yes.

Step 04: moving the movable storage rack downwardly and disposing the same in the material storage apparatus.

Specifically, the automatic lifting translation mechanism lowers the movable storage rack downwardly. The supporting layer reaches the first position from the second position; and in this process, the movable storage rack reaches the original position and is supported, and the supporting layer is separated from the movable storage rack to move downwardly to the first position.

Step 05: enabling the automatic transportation apparatus to leave the material storage apparatus. Specifically, the step 05 further includes detecting whether the automatic transportation apparatus leaves the material storage apparatus; and closing the automatic door if yes.

In conclusion, the material storage apparatus, the material transportation system and transportation method of the present invention realize the simultaneous transportation of a plurality of material boxes, for example, six material boxes, by arranging the movable storage rack in the material storage apparatus. This overcomes the defect that the existing OHT system can only pick up one material box from the material storage apparatus at one time. Further, by arranging the automatic lifting translation mechanism in the material storage apparatus, the movable storage rack can be automatically moved into or out of the material storage apparatus. Particularly, the position deviation of the movable storage rack in the lifting and transferring process can be corrected by utilizing the top correction positioning components, so that the movable storage rack can be accurately positioned, thereby preventing the movable storage rack from tilting and even tipping over due to the position deviation in the lifting and transferring process. The material transportation system of the present invention utilizes the movable storage rack and the automatic transportation apparatus to simultaneously transport a plurality of material boxes between the material storage apparatuses and between the material storage apparatus and the processing equipment. Moreover, by adopting the automatic transportation apparatus, the single-box track overhead traveling crane and the overhead track in the traditional OHT system are canceled. Therefore, the problems that the traditional OHT system is high in design complexity, highly difficult and limited in later adjustment, and limited in the practical application can be overcome. In contrast, the cooperation of the automatic transportation apparatus and the movable storage rack of the present invention can reduce the design complexity of the production line at the initial stage of the factory construction, and the flexibility in later adjustment is very high, thereby expanding the practical application range. Although the present invention is described above with preferred embodiments, the embodiments are described by way of examples only and are not intended to limit the present invention. Those skilled in the art can make several changes and modifications to the present invention without departing from the spirit and scope of the present invention. The protection scope claimed by the present invention shall depend on the claims.

The invention claimed is:

1. A material transportation system, comprising:
a material storage apparatus, wherein the material storage apparatus comprises a movable storage rack; the movable storage rack is configured to hold a plurality of material boxes, and the movable storage rack can be separated from the material storage apparatus; and
an automatic transportation apparatus that can move freely along any route in any direction; and the automatic transportation apparatus is configured to carry and transport the movable storage rack,
wherein the material transportation system further comprises an automatic lifting translation mechanism that is arranged underneath of the movable storage rack, a first side wall sensor and a controller;
the first side wall sensor detects whether the automatic transportation apparatus reaches or leaves an external area of the movable storage rack, and transmits a signal to the controller if yes; and
after receiving the signal of the first side wall sensor, the controller controls the automatic lifting translation mechanism to raise the movable storage rack upwardly, and controls the automatic lifting translation mechanism to extend or retract to:
transfer a movable storage rack from the automatic lifting translation mechanism onto the automatic transportation apparatus, or to pick up a movable storage rack from the automatic transportation apparatus to be transported back into the material storage apparatus for storage.

2. The material transportation system according to claim 1, wherein the automatic lifting translation mechanism further comprises:
a telescopic mechanism controlled by the controller to perform an extending action or a retracting action;
a lifting mechanism controlled by the controller to execute the rising action or a falling action; and
a plurality of limiting sensing assemblies configured for limiting an extension distance or retraction distance of the telescopic mechanism, judging whether the telescopic mechanism is extended or retracted in place, and transmitting a signal to the controller, and then controlling the lifting mechanism to perform the rising action or falling action by the controller.

3. The material transportation system according to claim 2, wherein the telescopic mechanism is provided with a supporting layer supporting the movable storage rack;
in a process of sending the movable storage rack out or in by the automatic lifting translation mechanism, the supporting layer goes through four positions:
a first position is an original position of the supporting layer;
a second position is a position that the supporting layer reaches above the original position;
a third position is a position that the supporting layer reaches above the top of the automatic transportation apparatus; and
a fourth position is a position that the supporting layer reaches below the top of the automatic transportation apparatus.

4. The material transportation system according to claim 3, wherein the process of sending out the movable storage rack by the automatic lifting translation mechanism comprises:
the controller controls the lifting mechanism to execute the rising action, and the supporting layer reaches the second position from the first position;
the controller controls the telescopic mechanism to perform the extending action, and the supporting layer reaches the third position from the second position;
the limiting sensing assemblies judge whether the telescopic mechanism is extended in place, and transmit the signal to the controller if yes;
the controller controls the lifting mechanism to execute the falling action, the supporting layer reaches the fourth position from the third position, and in the process that the supporting layer reaches the fourth position from the third position, the movable storage rack is supported after contacting the top of the automatic transportation apparatus; and the supporting layer is separated from the movable storage rack to move downwardly to the fourth position;
the controller controls the telescopic mechanism to execute the retracting action, and the supporting layer reaches the first position from the fourth position; and
the limiting sensing assemblies judge whether the telescopic mechanism (301) is retracted in place, and transmit the signal to the controller if yes.

5. The material transportation system according to claim 4, wherein the automatic lifting translation mechanism is nested in a fixed supporting body, and the fixed supporting body is configured for carrying the automatic lifting translation mechanism and for supporting the movable storage rack in a non-transportation process; and
in the process that the controller controls the lifting mechanism to execute the rising action, and the supporting layer reaches the second position from the first position, the supporting layer contacts the bottom of the movable storage rack and jacks up the movable storage rack, and the supporting layer supports the movable storage rack to move up to the second position.

6. The material transportation system according to claim 2, wherein the telescopic mechanism is provided with a telescopic driving assembly; the telescopic driving assembly is provided with a deformation driving mechanism and a deformable transportation component; the deformable transportation component is connected between the telescopic mechanism and the deformation driving mechanism; and
when the telescopic mechanism is extended and retracted, the deformation driving mechanism is controlled by the controller to drive the deformable transportation component to perform telescopic deformation so as to drive the telescopic mechanism to extend and retract.

7. The material transportation system according to claim 6, wherein the deformation driving mechanism is controlled by the controller to drive the deformable transportation component to perform bending deformation or to be restored from the deformation so as to drive the telescopic mechanism to retract or extend.

8. The material transportation system according to claim 3, wherein the process of sending back the movable storage rack by the automatic lifting translation mechanism comprises:
the controller controls the telescopic mechanism to execute the extending action, and the supporting layer reaches the fourth position from the first position;
the limiting sensing assemblies judge whether the telescopic mechanism is extended in place, and transmit the signal to the controller if yes;
the controller controls the lifting mechanism to execute the rising action, and the supporting layer reaches the third position from the fourth position; in the process that the supporting layer reaches the third position from the fourth position, the supporting layer contacts the bottom of the movable storage rack and jacks up the movable storage rack to continuously move up to the third position;

the controller controls the telescopic mechanism to perform the retracting action, and the supporting layer reaches the second position from the third position;

the limiting sensing assemblies judge whether the telescopic mechanism is retracted in place, and transmit the signal to the controller if yes; and the controller controls the lifting mechanism to execute the falling action, and the supporting layer reaches the first position from the second position.

9. The material transportation system according to claim 8, wherein the automatic lifting translation mechanism is nested in a fixed supporting body, and the fixed supporting body is configured for carrying the automatic lifting translation mechanism and for supporting the movable storage rack in a non-transportation process; and in the process that the controller controls the lifting mechanism to execute the falling action, and the supporting layer reaches the first position from the second position, the bottom of the movable storage rack contacts and is supported by the top of the fixed supporting body, and the supporting layer is separated from the bottom of the movable storage rack to move downwardly to the first position.

10. The material transportation system according to claim 2, wherein the material transportation system further comprises an automatic door; the automatic door is arranged in an outer wall of the material storage apparatus corresponding to the movable storage rack;

after detecting that the automatic transportation apparatus reaches the exterior of the movable storage rack, the first side wall sensor transmits the signal to the controller, and the controller controls the automatic lifting translation mechanism to execute the rising action while also controlling the automatic door to open; and after detecting that the automatic transportation apparatus leaves the material storage apparatus, the first side wall sensor transmits the signal to the controller, and the controller controls the automatic lifting translation mechanism to execute the falling action while also controlling the automatic door to close.

11. The material transportation system according to claim 1, wherein the top of the automatic transportation apparatus is also provided with a top sensor configured for detecting whether the top of the automatic transportation apparatus is empty and feeding back to the controller, and the controller controls the automatic lifting translation mechanism to start running according to a feedback result.

12. The material transportation system according to claim 11, wherein before the automatic lifting translation mechanism begins to send out the movable storage rack, and when detecting that the top of the automatic transportation apparatus is empty, the top sensor transmits the signal to the controller, and the controller controls the automatic lifting translation mechanism to begin to send out the movable storage rack; and before the automatic lifting translation mechanism begins to send back the movable storage rack, and when detecting that the top of the automatic transportation apparatus is not empty, the top sensor transmits the signal to the controller, and the controller controls the automatic lifting translation mechanism to begin to send back the movable storage rack.

13. A material transportation method adopting the material transportation system according to claim 1, comprising:
  step 01: detecting whether the automatic transportation apparatus reaches an external area of the movable storage rack or not; and executing step 02 if yes;
  step 02: raising the movable storage rack upwardly;
  step 03: sending the movable storage rack out of the material storage apparatus;
  step 04: moving the movable storage rack downwardly and disposing the same on the automatic transportation apparatus; and
  step 05: carrying, by the automatic transportation apparatus, the movable storage rack to move towards a target position,
  wherein the bottom of the movable storage rack is also provided with the automatic lifting translation mechanism; the automatic lifting translation mechanism supports the movable storage rack through a supporting layer; the supporting layer can go through four positions; a first position is an original position of the supporting layer; a second position is a position that the supporting layer reaches above the original position; a third position is a position that the supporting layer reaches above the top of the automatic transportation apparatus; and a fourth position is a position that the supporting layer reaches below the top of the automatic transportation apparatus;
  in the step 02, the automatic lifting translation mechanism raises the movable storage rack upwardly from the first position to the second position;
  in the step 03, the automatic lifting translation mechanism moves the movable storage rack outwardly from the second position to the third position;
  in the step 04, the automatic lifting translation mechanism lowers the movable storage rack downwardly; the supporting layer moves from the third position to the fourth position; and in this process, the movable storage rack contacts the top of the automatic transportation apparatus and is supported, and the supporting layer is separated from the movable storage rack to move downwardly to the fourth position; and
  in the step 05, the method further comprises retracting the automatic lifting translation mechanism from the fourth position to the first position.

14. The material transportation method according to claim 13, wherein a side wall of the material storage apparatus corresponding to the movable storage rack is further provided with an automatic door; in the step 02, the method further comprises opening the automatic door; and in the step 05, the method further comprises detecting whether the automatic transportation apparatus leaves the material storage apparatus, and closing the automatic door if yes.

15. The material transportation method according to claim 14, wherein the step 01 specifically comprises: detecting whether the automatic transportation apparatus reaches the external area of the movable storage rack, judging whether the top of the automatic transportation apparatus is empty, and executing the step 02 if both are yes.

16. The material transportation method according to claim 14, wherein in the step 05, the method further comprises: judging whether the automatic lifting translation mechanism is retracted in place; and closing the automatic door if detecting that the automatic transportation apparatus leaves the material storage apparatus and the automatic lifting translation mechanism is retracted in place.

* * * * *